US012777137B2

(12) United States Patent
Sawada et al.

(10) Patent No.: US 12,777,137 B2
(45) Date of Patent: Oct. 27, 2026

(54) DISPLAY TERMINAL, DISPLAYING METHOD, AND RECORDING MEDIUM

(71) Applicant: Ricoh Company, Ltd., Tokyo (JP)

(72) Inventors: Kyoya Sawada, Kanagawa (JP); Hidekuni Annaka, Saitama (JP); Daisuke Saitoh, Kanagawa (JP); Takeshi Homma, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/014,411

(22) Filed: Jan. 9, 2025

(65) Prior Publication Data

US 2025/0150565 A1 May 8, 2025

Related U.S. Application Data

(63) Continuation of application No. 18/116,326, filed on Mar. 2, 2023, now Pat. No. 12,238,257.

(30) Foreign Application Priority Data

Mar. 23, 2022 (JP) ................................ 2022-046997

(51) Int. Cl.

*H04N 9/87* (2006.01)
*H04N 13/111* (2018.01)
*H04N 13/194* (2018.01)

(52) U.S. Cl.

CPC ......... *H04N 13/111* (2018.05); *H04N 13/194* (2018.05)

(58) Field of Classification Search

CPC .... H04N 13/111; H04N 13/194; H04N 23/50; H04N 23/60; H04N 23/6812; H04N 23/698; H04N 23/90; H04N 23/55

See application file for complete search history.

(56) References Cited

U.S. PATENT DOCUMENTS

| | | | | |
|---|---|---|---|---|
| 11,924,291 | B2 * | 3/2024 | Ando | G06F 3/1454 |
| 2011/0043663 | A1 * | 2/2011 | Tsuchiya | H04N 23/66 348/222.1 |

(Continued)

FOREIGN PATENT DOCUMENTS

| | | | |
|---|---|---|---|
| JP | 2019-121857 | A | 7/2019 |
| JP | 2020025186 | A | 2/2020 |
| JP | 2022-186117 | A | 12/2022 |

OTHER PUBLICATIONS

Japanese Office Action issued Dec. 23, 2025 in corresponding Japanese patent application No. 2022-046997 (7 pages; with English translation).

*Primary Examiner* — Howard D Brown, Jr.
(74) *Attorney, Agent, or Firm* — XSENSUS LLP

(57) ABSTRACT

A display terminal includes: circuitry that receives an instruction to play back a wide-view image having a wide angle of view, the wide-view image being a moving image and having been recorded for distribution to a communication terminal; and in response to the instruction to play back the wide-view image, controls a display to display a predetermined-area image representing a predetermined area of the wide-view image, based on point-of-view information for specifying the predetermined area of the wide-view image being having been distributed and displayed at the communication terminal.

17 Claims, 41 Drawing Sheets

(56) References Cited

U.S. PATENT DOCUMENTS

| | | | | |
|---|---|---|---|---|
| 2014/0245367 | A1* | 8/2014 | Sasaki | H04N 21/2343<br>725/109 |
| 2014/0270692 | A1* | 9/2014 | Suzuki | H04N 23/698<br>386/230 |
| 2015/0233721 | A1* | 8/2015 | Kiso | G01C 21/367<br>345/629 |
| 2019/0208142 | A1* | 7/2019 | Kitaya | H04N 23/63 |
| 2020/0280671 | A1* | 9/2020 | Ando | H04L 67/56 |
| 2021/0405383 | A1* | 12/2021 | Yokoyama | G09G 5/38 |
| 2022/0103763 | A1* | 3/2022 | Annaka | H04N 21/21805 |
| 2022/0394178 | A1 | 12/2022 | Annaka et al. | |
| 2025/0150565 | A1* | 5/2025 | Sawada | H04N 13/111 |

* cited by examiner

SPHERICAL IMAGE CE

FIG. 14A

| DATA ID OF WIDE-VIEW IMAGE | DATA NAME | IMAGING START DATE AND TIME INFORMATION | IMAGING OPERATOR INFORMATION | IMAGE CAPTURING APPARATUS INFORMATION | IMAG-ING-TIME VIRTUAL ROOM ID | DATA STORAGE LOCATION INFORMATION OF WIDE-VIEW IMAGE | PARTICIPANT ID |
|---|---|---|---|---|---|---|---|
| 111 | BUILDING X UNDER CONSTRUCTION | 2021/10/12 9:00 | User110 | T111 | AAA | https://··· | User121, User122 |
| 222 | GROUP PHOTOGRAPH AT EVENT Y | 2021/10/12 10:00 | User210 | T222 | BBB | https://··· | User221, User222 |
| 333 | SURGERY Z | 2021/10/15 11:00 | User310 | T333 | CCC | https://··· | User321, User322 |
| 444 | ··· | ··· | ··· | ··· | ··· | ··· | ··· |

FIG. 14B

| DATA ID OF WIDE-VIEW IMAGE | DATA NAME | IMAGING START DATE AND TIME INFORMATION | IMAGING OPERATOR INFORMATION | IMAGE CAPTURING APPARATUS INFORMATION | IMAG-ING-TIME VIRTUAL ROOM ID | DATA STORAGE LOCATION INFORMATION OF WIDE-VIEW IMAGE | PARTICIPANT ID |
|---|---|---|---|---|---|---|---|
| 111 | BUILDING X (1) | 2021/10/12 9:00 | User110 | T111 | AAA | https://··· | User121, User122 |
| 222 | BUILDING X (2) | 2021/10/12 10:00 | User210 | T222 | AAA | https://··· | User221, User222 |
| 333 | SURGERY Z | 2021/10/15 11:00 | User310 | T333 | CCC | https://··· | User321, User322 |
| 444 | ··· | ··· | ··· | ··· | ··· | ··· | ··· |

FIG. 15A

VIRTUAL ROOM INFORMATION

| ITEM NAME | DEFINITION | EXAMPLE OF VALUE |
|---|---|---|
| VIRTUAL ROOM ID | IDENTIFICATION INFORMATION FOR IDENTIFYING VIRTUAL ROOM | AAA |
| VIRTUAL ROOM NAME | NAME FOR USER TO IDENTIFY VIRTUAL ROOM | CONSTRUCTION SITE A |
| DEVICE INFORMATION | IDENTIFICATION INFORMATION OF DEVICE ASSOCIATED WITH VIRTUAL ROOM | T111 |
| USER IN VIRTUAL ROOM | USER WHO IS CURRENTLY IN VIRTUAL ROOM AND AUTHORIZED TO VIEW WIDE-VIEW IMAGE | User111 (IP ADDRESS OF COMMUNICATION TERMINAL)<br>User222 (IP ADDRESS OF COMMUNICATION TERMINAL)<br>User111 (IP ADDRESS OF COMMUNICATION TERMINAL) |
| STORAGE | INFORMATION ON STORAGE ASSOCIATED WITH VIRTUAL ROOM | ADDRESS INFORMATION OF STORAGE X<br>INFORMATION ON FOLDER IN STORAGE X |

FIG. 15B

TENANT INFORMATION

| ITEM NAME | DEFINITION | EXAMPLE OF VALUE |
|---|---|---|
| TENANT ID | IDENTIFICATION INFORMATION FOR IDENTIFYING TENANT | T001 |
| TENANT NAME | NAME FOR USER TO IDENTIFY TENANT | COMPANY X |
| TENANT-REGISTERED VIRTUAL ROOM ID | IDENTIFICATION INFORMATION OF VIRTUAL ROOM REGISTERED IN TENANT | R001 (CONSTRUCTION SITE A)<br>R002 (CONSTRUCTION SITE B)<br>R003 (CONSTRUCTION SITE C) |
| TENANT-REGISTERED DEVICE | DEVICE REGISTERED IN TENANT | - IMAGE CAPTURING APPARATUS ID NAME, DESCRIPTION, VIRTUAL ROOM ID<br>- VR GOGGLES ID<br>......<br>- SMART GLASSES ID<br>...... |

FIG. 16
| DATA ID OF WIDE-VIEW IMAGE | PARTICIPANT ID | VIEWING START DATE AND TIME INFORMATION | STORAGE LOCATION INFORMATION OF POINT-OF-VIEW INFORMATION |
|---|---|---|---|
| 111 | User120 | 2021/10/12 9:00 | https://··· |
| 111 | User121 | 2021/10/12 9:05 | https://··· |
| 111 | User122 | 2021/10/15 9:10 | https://··· |
| ··· | ··· | ··· | ··· |
FIG. 17A
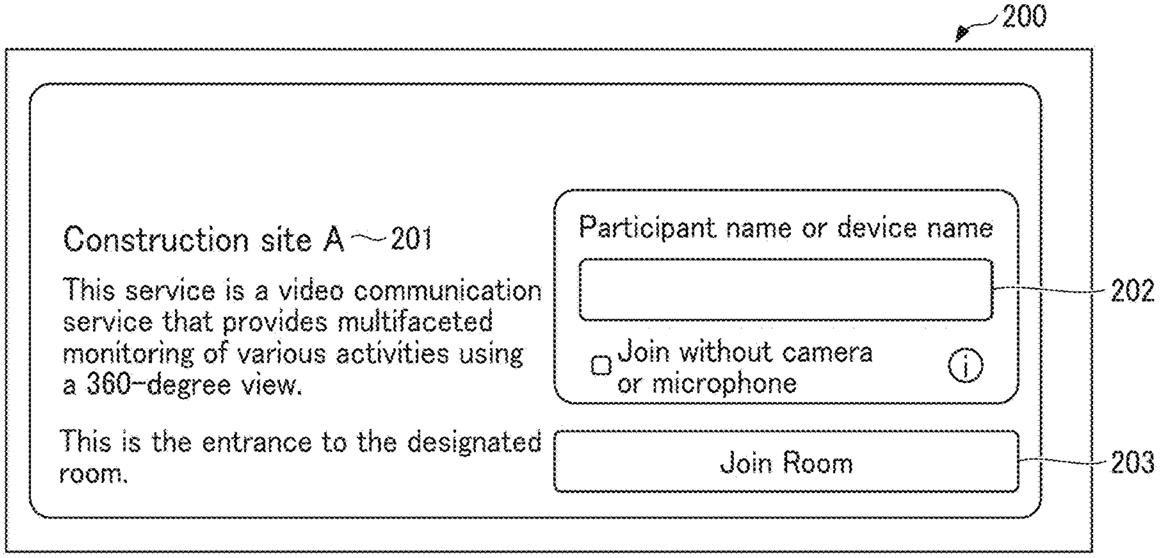
FIG. 17B
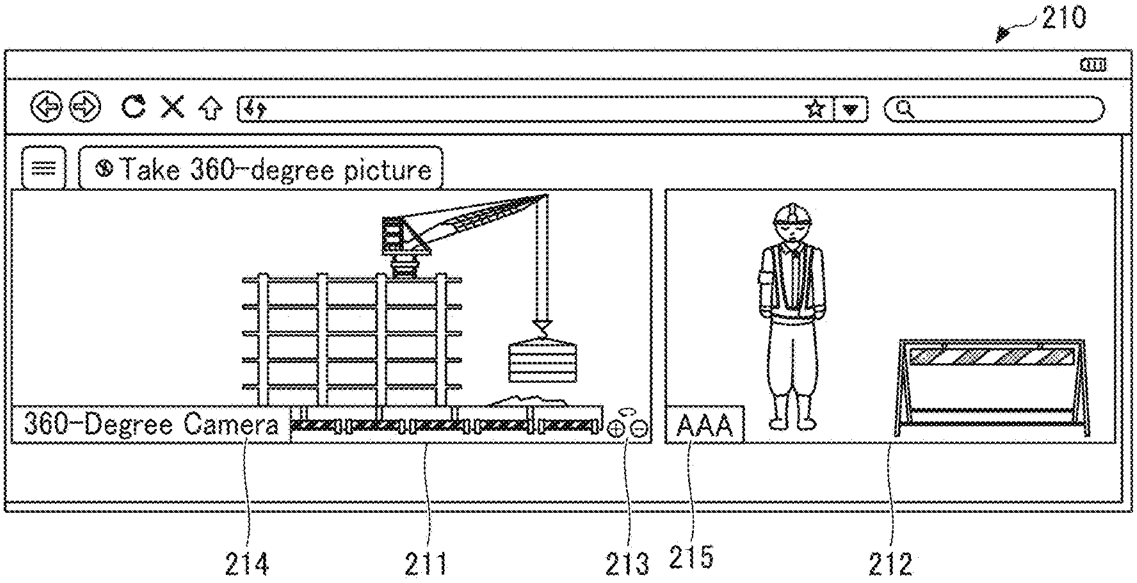

DISPLAY TERMINAL, DISPLAYING METHOD, AND RECORDING MEDIUM

CROSS-REFERENCE TO RELATED APPLICATIONS

This patent application is a continuation application of U.S. application Ser. No. 18/116,326, filed Mar. 2, 2023, which is based on and claims priority pursuant to 35 U.S.C. § 119 (a) to Japanese Patent Application No. 2022-046997, filed on Mar. 23, 2022, in the Japan Patent Office, the entire disclosure of each is hereby incorporated by reference herein.

BACKGROUND

Technical Field

The present disclosure relates to a display terminal, a displaying method, and a recording medium.

Related Art

A communication system transmits images and audio from one site to one or more other sites in real time to allow users at remote sites to perform remote communication using the images and audio. A known example of such an image is a wide-field-of-view image having a wide viewing angle and captured in a wide imaging range as an imaging range including even an area that is difficult for a normal angle of view to cover. The wide-field-of-view image is hereinafter referred to as a "wide-view image". Examples of the wide-view image include a 360-degree image that is a captured image of an entire 360-degree view. The 360-degree image is also referred to as a spherical image, an omnidirectional image, or an "all-around" image. A user operates a communication terminal to change a virtual point of view for a predetermined area in a wide-view image displayed on a display screen of the communication terminal. As a result, the user can view a different predetermined area in the wide-view image after changing the virtual point of view.

In the related art, a technique for clipping a more desirable predetermined area from the wide-view image without a complicated operation is disclosed.

SUMMARY

According to an embodiment of the present disclosure, a display terminal includes: circuitry that receives an instruction to play back a wide-view image having a wide angle of view, the wide-view image being a moving image and having been recorded for distribution to a communication terminal; and in response to the instruction to play back the wide-view image, controls a display to display a predetermined-area image representing a predetermined area of the wide-view image, based on point-of-view information for specifying the predetermined area of the wide-view image having been distributed and displayed at the communication terminal.

According to an embodiment of the present disclosure, a displaying method includes: receiving an instruction to play back a wide-view image having a wide angle of view, the wide-view image being a moving image and having been recorded for distribution to a communication terminal; and in response to the instruction to play back the wide-view image, displaying, on a display, a predetermined-area image representing a predetermined area of the wide-view image, based on point-of-view information for specifying the predetermined area of the wide-view image having been distributed and displayed at the communication terminal.

According to an embodiment of the present disclosure, a non-transitory recording medium stores a plurality of instructions which, when executed by one or more processors, cause the processors to perform a displaying method including: receiving an instruction to play back a wide-view image having a wide angle of view, the wide-view image being a moving image and having been recorded for distribution to a communication terminal; and in response to the instruction to play back the wide-view image, displaying, on a display, a predetermined-area image representing a predetermined area of the wide-view image, based on point-of-view information for specifying the predetermined area of the wide-view image having been distributed and displayed at the communication terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 14A and 14B are tables illustrating an example of image management information stored in an image management information storage unit;

FIGS. 15A and 15B are tables illustrating an example of virtual room information stored in a virtual room information storage unit and an example of tenant information stored in a tenant information storage unit, respectively;

FIG. 16 is a table illustrating an example of point-of-view related information stored in a point-of-view related information storage unit;

FIG. 17A is a view illustrating an example of a room entry screen;

FIG. 17B is a view illustrating an example of an image viewing screen displayed on the communication terminal in response to a user entering a virtual room;

Figure 1:
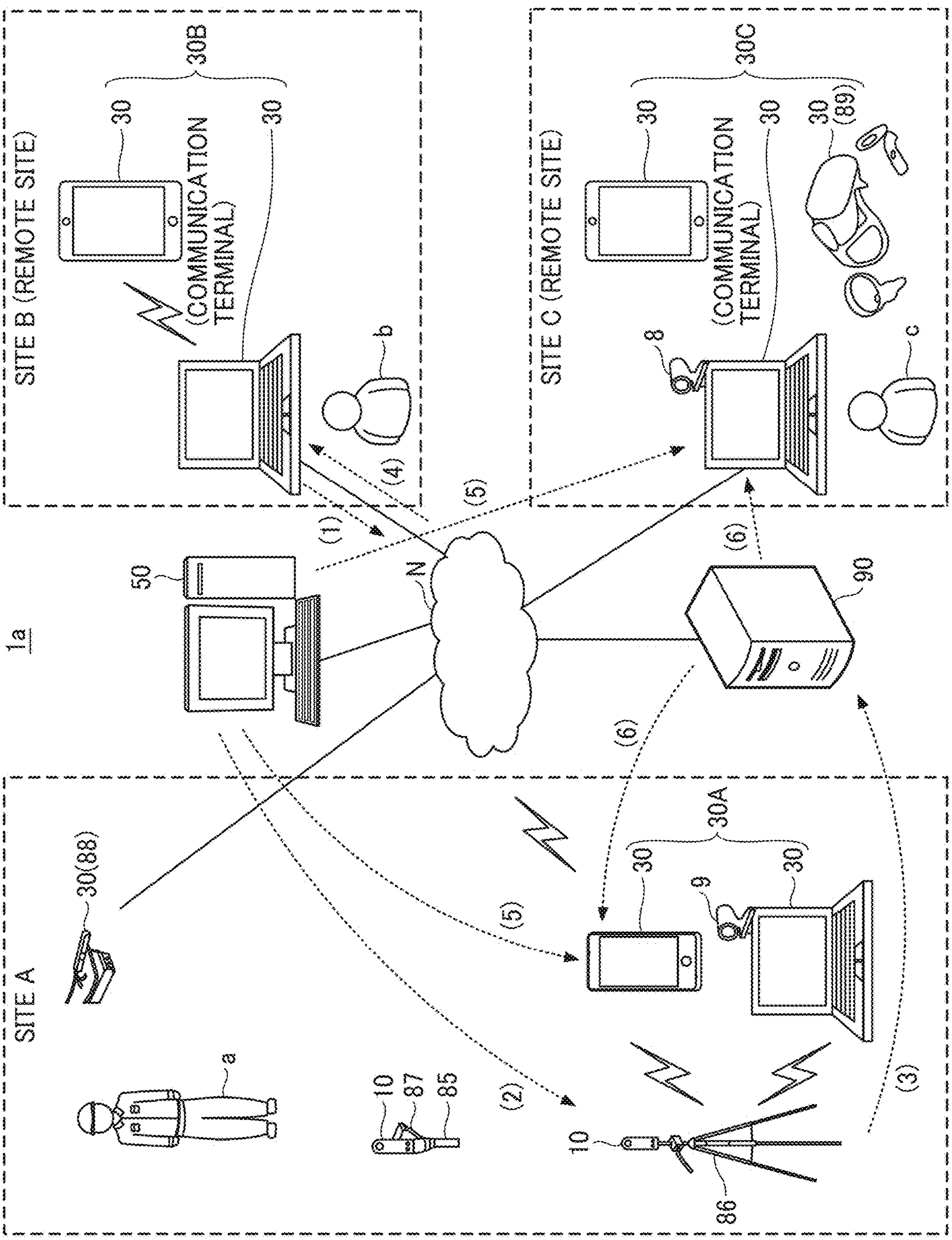
FIG. 1 is a diagram illustrating an example of remote communication using a wide-view image.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

A display terminal and a display method performed by the display terminal according to an embodiment of the present disclosure will be described hereinafter.

In some cases, a wide-view image in a moving image is distributed to predetermined sites. Users at the predetermined sites can individually change the desired predetermined areas and view the wide-view image. A wide-view image in a moving image obtained by capturing images of a work site or the like is recorded before the wide-view image is distributed to predetermined sites. Users at the predetermined sites can play back, display, and view the recorded wide-view image later. It is desirable that a user viewing a recorded wide-view image grasp which predetermined area in the wide-view image was being displayed on a predetermined communication terminal at a predetermined site at the time of recording. The user who grasps such a predetermined area can grasp which predetermined area in the wide-view image has attracted attention at the predetermined site, and can make decisions or take actions based on the information provided.

However, it has been difficult for the user who views the image being recorded, to know which area has been displayed at the communication terminal when recording the image. In view of this, the following provides a display terminal that displays a predetermined-area image representing a predetermined area of a wide-view image, which has been displayed at the communication terminal.

Example of Remote Communication

FIG. 1 is a diagram illustrating an example of remote communication using a wide-view image. In FIG. 1, communication takes place across three sites, namely, a site A, a site B, and a site C, via an information processing system 50. Three sites are merely an example, and communication may be performed across two sites or four or more sites.

In an example, the site A is a construction site. The sites B and C are any sites across which a wide-view image can be communicated. In an example, the sites B and C are offices. An image capturing apparatus 10 is placed at the site A. In an example, the image capturing apparatus 10 can capture an image of an object and surroundings to generate a wide-view image. Examples of the wide-view image include a wide-view image called a spherical image, and a wide-view image with a wide angle of view ranging from, for example, 180 degrees to 360 degrees in the vertical or horizontal direction. Such an image with a wide angle of view is hereinafter simply referred to as a “wide-view image”. Communication terminals 30A to 30C for viewing a wide-view image are placed at the sites A to C, respectively. Any communication terminal or communication terminals among the communication terminals 30A to 30C are hereinafter referred to as a “communication terminal 30” or “communication terminals 30”.

In the construction site, workers are involved in various constructions at various places. The image capturing apparatus 10 captures an image of the entire construction site to generate a wide-view image in which the construction site appears. A user a at the site A, a user b at the site B, and a user c at the site C can check any construction or work of interest to be viewed by the users a to c at the sites A to C by changing a virtual point of view as appropriate. The term “point of view”, as used here, refers to the center position or range of a predetermined area to be displayed on a display screen such as a display. The predetermined area is in the entire wide-view image.

In an example, the image capturing apparatus 10 is attached to a tripod 86. In another example, the image capturing apparatus 10 is attached to an arm 85 through a gimbal 87. A relay device is installed at the construction site. In FIG. 1, the communication terminal 30A also functions as the relay device. The communication terminal 30A receives a wide-view image from the image capturing apparatus 10 via a wire or wirelessly and transmits the received wide-view image to the information processing system 50. The communication terminal 30A may also function as a terminal for viewing the wide-view image. In an example, a camera 9 connected to (or incorporated in) the communication terminal 30A captures an image having a normal angle of view (or a wide-view image), and the captured image is transmitted to the information processing system 50. In another example, smart glasses 88 worn by the user a generates an image having a normal angle of view (or a wide-view image) by imaging an object, and the generated image is transmitted to the information processing system 50. The user a may be a worker. The smart glasses 88 are an information terminal having a display on which information acquired via the Internet is displayed with a field of view maintained. The smart glasses 88 may be placed at any site.

The communication terminal 30B, such as a personal computer (PC) or a smartphone, is placed at the site B. The communication terminal 30B is any device that can communicate with the information processing system 50. Other examples of the communication terminal 30B include a tablet terminal, a personal digital assistant (PDA), an electronic whiteboard, and a projector. A camera may be incorporated in or connected to the communication terminal 30B.

The communication terminal 30C, such as a PC, a smartphone, or virtual reality (VR) goggles 89, is placed at the site C. In FIG. 1, a camera 8 is incorporated in or connected to the communication terminal 30C. The VR goggles 89 are an information terminal for displaying a computer-based artificial world or a spherical image in accordance with the direction of movement of the neck or the body of the user wearing the VR goggles 89. The VR goggles 89 may be goggles attached to a smartphone for VR application. Examples of such goggles include an external VR scope, which is a VR scope that allows a user to easily enjoy VR by plugging a smartphone into an assembled body with a plastic lens. The camera 8 may be for a wide angle of view or a normal angle of view. The communication terminal 30C is any device that can communicate with the information processing system 50. Other examples of the communication terminal 30C include a tablet terminal, a PDA, an electronic whiteboard, and a projector. The VR goggles 89 may be placed in any site.

In this embodiment, communication between the image capturing apparatus 10 and the communication terminals 30 is managed using a communication group called a virtual room. The image capturing apparatus 10 is associated with the virtual room. Each of the communication terminals 30 (the user who operates each of the communication terminals 30) enters the virtual room and receives a wide-view image transmitted from the image capturing apparatus 10. As a result, the user can view the wide-view image. The smart glasses 88 and the VR goggles 89 can also be associated with the virtual room. Like the communication terminals 30, the cameras 8 and 9 also enter the virtual room.

The users a to c at the sites A to C can each change the point of view for the wide-view image, as desired, using the communication terminals 30A to 30C, respectively. Thus, the users a to c viewing the wide-view image in real time are likely to view images with different points of view. It may be difficult for the users a to c to mutually understand each other. In this embodiment, accordingly, information on a virtual point of view set for the communication terminal 30 at any one of the sites is shareable by the communication terminals 30 at the other sites. An overview of the sharing of information will be described. In the following description, in an example, a point of view designated by the user b at the site B is shared by the users a and c at the sites A and C.

(1) The communication terminals 30A to 30C share a wide-view image (an example of a first wide-view image). The wide-view image is generated by imaging an object with the image capturing apparatus 10. In response to the user b making a request to capture a wide-view image while viewing the wide-view image from any point of view on the communication terminal 30B, the communication terminal 30B (an example of a first communication terminal) transmits point-of-view information and the request to the information processing system 50.

(2) In response to the image capturing request, the information processing system 50 designates point-of-view information and transmits an image capturing request to the image capturing apparatus 10 to capture a still image or a moving image.

(3) The image capturing apparatus 10 captures a wide-view image (an example of a second wide-view image) in response to the image capturing request, and stores the wide-view image (an example of a second wide-view image) and the point-of-view information in association with a uniform resource locator (URL) transmitted from the information processing system 50. The URL is an example of storage location information and indicates a storage location in a storage 90 in FIG. 1. The wide-view image stored in the storage 90 can be downloaded and displayed by any communication terminal 30.

(4) The information processing system 50 transmits the URL to the communication terminal 30B.

(5) The information processing system 50 further transmits the URL to the communication terminals 30A and 30C (examples of a second communication terminal), which are in the same virtual room as that associated with the image capturing apparatus 10 and the communication terminal 30B, automatically or in response to a request from the user b.

(6) The communication terminals 30A and 30C access the URL and receive the point-of-view information and the wide-view image. Each of the communication terminals 30A and 30C sets and displays the point of view identified by the point-of-view information such that point of view matches the center of an image field. It should be noted that the point of view is not necessarily made to completely match the center of the image field. In an example, the point of view may be set and displayed so as to be included in a range near the center of the image field.

The same applies when the point of view of the user a at the site A is shared by the users b and c at the sites B and C and when the point of view of the user c at the site C is shared by the users a and b at the sites A and B.

As described above, in a communication system 1*a* according to this embodiment, even after a wide-view image is distributed, point-of-view information is shared without an instruction being given to shift a point of view for a wide-view image generated by capturing an image such that a predetermined area of interest at each site is displayed. This facilitates understanding among users at the respective sites.

In (3), the image capturing apparatus 10 may transmit the wide-view image itself to the information processing system 50. In (4), the information processing system 50 may transmit the wide-view image to the communication terminals 30A to 30C.

In the example illustrated in FIG. 1, the image capturing apparatus 10 is placed at a construction site. This embodiment is also applicable to VR education, event distribution, remote customer services, telemedicine services, and other suitable situations. In VR education, the image capturing apparatus 10 is placed at a site such as a study room or a laboratory. Students can view a blackboard, an instrument, a sample, an experimental result, or the like from remote sites while changing the points of view as appropriate. In event distribution, the image capturing apparatus 10 is placed in a venue of an event to be held on-site. Event participants such as an audience can view the details in the venue online from remote sites while changing the points of view as appropriate. The details in the venue include images of event performers, event participants, and event presenters, images of objects involved in the event, such as products and exhibits, images of materials involved in the event, and images of the venue. The event may be held indoor or outdoor, and examples of the venue of the event include venues such as sports stadiums, concert halls, and theaters. In remote customer services, for example, in customer services for a travel agency, the image capturing apparatus 10 is placed at each of travel destination sites. A customer can plan their itinerary from a remote site while changing the point of view as appropriate. In telemedicine services, in an example, the image capturing apparatus 10 is placed in a medical setting such as an operating room. Medical people such as doctors, medical students, and persons related to medical instruments can view the performance of a doctor(s) and a nurse(s) during on-site medical treatment, the arrangement of medical instruments, the state of a patient, vitals, and the like from remote sites while changing the points of view as appropriate.

The site at which an image is captured is not limited to any of the sites described above. An image may be captured in any space that a user (or viewer) at a viewing site desires to remotely grasp. Examples of such a space include a school, a factory, a warehouse, a building site, a server room, and a store.

Terminology

The term "tenant" refers to a group of users associated with a unit contract for receiving an image distribution service from a service provider (information processing system in this embodiment). Examples of the tenant include entities that have made the contract, such as a company, an organization, and an individual. Accordingly, a tenant may also be referred to as a user group. In one example, a user belongs to the tenant. In another example, a user may personally subscribe to the service. A user, an image capturing apparatus, a virtual room, and the like are registered in a tenant (user group).

The term "site" refers to a location where activity takes place. In this embodiment, a conference room is used as an example of a site. The conference room is a room to be used mainly for a conference. A conference is an event where people gather to discuss something and is also referred to as a meeting, a session, a gathering, an assembly, or the like.

The term "device" refers to an apparatus different from the communication terminal 30 for general purposes such as a PC or a smartphone. In an example, the device is an image capturing apparatus or an apparatus for viewing a wide-view image. In this embodiment, examples of the device include the image capturing apparatus 10, the smart glasses 88, and the VR goggles 89.

The term "point-of-view information" refers to parameter information that specifies which predetermined area in a wide-view image to be displayed on the display screen of the display is to be displayed on the display screen of the display. In this embodiment, in an example, the point-of-view information includes a radius vector, a polar angle, and an azimuth angle of the center of the wide-view image to be displayed on the display screen of the display. In another example, the point-of-view information may be specified by other parameter information such as the coordinates of diagonal vertices.

The term "wide-view image" refers to an image having a viewing angle in a wider range than a display range that can be displayed on the display screen (area where the wide-view image is to be displayed) of the display at a time in a predetermined display method. The wide-view image has a display range corresponding to a field of view up to 360 degrees (or 180 degrees) in the vertical direction and a field of view up to 360 degrees in the horizontal direction. In an example, the wide-view image is an image having a display range corresponding to a field of view of less than 360 degrees in the vertical and horizontal directions as long as the wide-view image has a viewing angle in a wider range than the display range that can be displayed on the display screen of the display at a time. In another example, the wide-view image is an image having a display range corresponding to a field of view of 160 degrees or more in the vertical and horizontal directions. Examples of the wide-view image include an image having a display range wider than a range that can be visually recognized at a time by a person looking at the range. Depending on the display method, an image that can be displayed on the display screen of the display at a time is also the wide-view image as long as the image has a viewing angle in a wide range in response to the display method being switched to a predetermined display method (such as a display mode or enlargement or reduction) or changed. In this embodiment, a spherical image in equirectangular projection format is used as an example of a wide-view image. Other examples of the wide-view image include an omnidirectional image, a hemispherical image, a three-dimensional (3D) panoramic image, a two-dimensional (2D) panoramic image, and a VR image. The wide-view image may be in cube mapping format or dome master format. The spherical image may be in format other than equirectangular projection format.

An image captured at a normal angle of view is not a wide-view image. In this embodiment, such an image is referred to as a non-wide-view image, that is, a planar image.

The term "communication group" refers to a group of users who share a wide-view image, that is, a group of users to whom a wide-view image is to be distributed. The communication group will be described with the term "virtual room" in the sense that in a typical space, the users in the same room can share a wide-view image. As used herein, the term "virtual" means being implemented by information processing via a network.

Users at respective sites perform remote communication across remote locations. The remote communication is a meeting, which is an online meeting, accessible from remote locations, or sites. The meeting means a gathering of people for consultation, discussion, or the like. Examples of the meeting include, but are not limited to, serving a customer, a conference, a gathering, an assembly, a study session, a class, a seminar, and a presentation. The remote communication is not necessarily bidirectional communication. Thus, the virtual room may be referred to as a virtual conference room.

Example Configuration of Communication System

Figure 2:
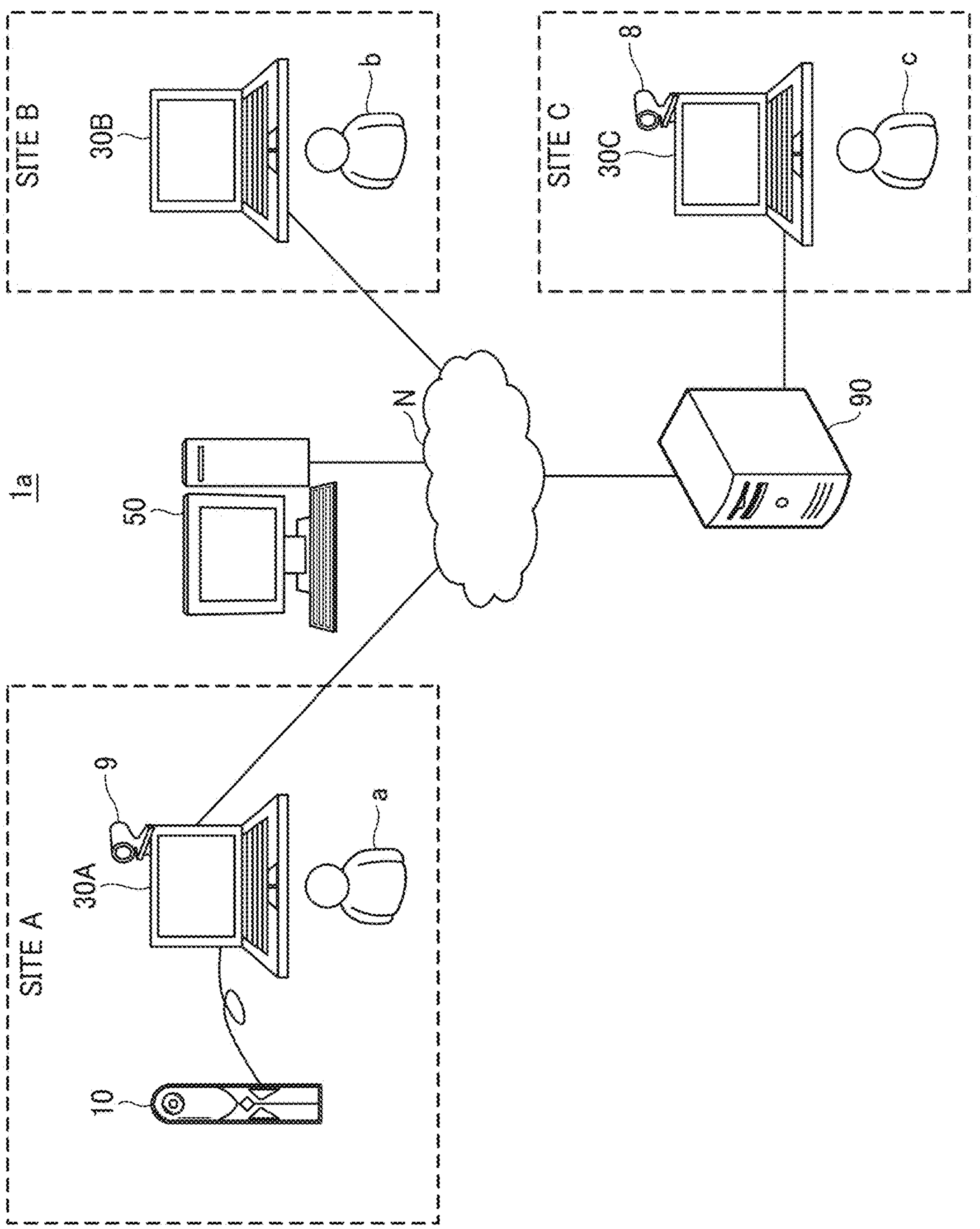
FIG. 2 is a diagram illustrating an example schematic configuration of a communication system.

FIG. 2 is a diagram illustrating an example schematic configuration of the communication system 1*a*. In FIG. 1, in an example, the communication system 1*a* illustrated in FIG. 2 is applied to remote communication with a construction site. The communication system 1*a* is a system for transmitting and receiving a wide-view image captured by the image capturing apparatus 10 or an image having a normal angle of view bidirectionally among a plurality of sites. In the communication system 1*a*, an image distributed from one of the sites is displayed at the other sites and is viewable by users at the other sites. In an example, a spherical image captured by the image capturing apparatus 10 is distributed as the wide-view image. In the communication system 1*a*, for example, a wide-view image captured at a predetermined site is remotely viewable at another site.

In the communication system 1*a*, as illustrated in FIG. 2, the image capturing apparatus 10 and the communication terminal 30A placed at the site A, the information processing system 50, and the communication terminals 30B and 30C placed at a plurality of sites, namely, the sites B and C, respectively, are communicably connected to each other.

In a case where the image capturing apparatus 10 has a communication function capable of directly connecting to a communication network N, the communication terminal 30A serving as a relay device (e.g., a router) is not used. In this case, the image capturing apparatus 10 is connected to the communication network N without intervening the communication terminal 30A. In a case where the communication terminal 30A is placed at the site A, the communication terminal 30A also functions as a relay device, and the user a can view a wide-view image in a manner similar to that of the communication terminals 30B and 30C. The image capturing apparatus 10 may additionally be placed at a site other than the site A, or a plurality of image capturing apparatuses 10 may be placed at the site A.

Each communication terminal 30 and the information processing system 50 can communicate with each other via the communication network N. The communication network N includes the Internet, a mobile communication network, and a local area network (LAN), for example. The communication network N may include a wired communication network and a wireless communication network. The wireless communication network may be based on a wireless communication standard such as third generation (3G), fourth generation (4G), fifth generation (5G), Wireless Fidelity (Wi-Fix), Worldwide Interoperability for Microwave Access (WiMAX), or Long Term Evolution (LTE).

In an example, the image capturing apparatus 10 will be described as a digital camera that can capture an image of an object or surroundings such as scenery to obtain two hemispherical images, from which a spherical image is generated, as described below. The digital camera is an example of an image capturing apparatus capable of capturing a wide-view image. The wide-view image obtained by the image capturing apparatus 10 may be a moving image or a still image, or may include both of a moving image and a still image. Further, the captured image may be video including audio together with an image.

The communication terminal 30 is a computer such as a PC to be operated by a user at each site. The communication terminal 30 displays an image obtained by imaging an object at the site where the communication terminal 30 is placed, and a wide-view image (still image and/or moving image) and an image having a normal angle of view, which are distributed from other sites. For example, the communication terminal 30 acquires a wide-view image, which is captured by the image capturing apparatus 10, via the communication network N. The communication terminal 30 has installed therein software for executing image processing, such as Open Graphics Library for Embedded Systems (OpenGL ES), and can display an image based on point-of-view information that specifies a partial area in the wide-view image. OpenGL ES is an example of software for executing image processing. Any other software may be used. In an example, the communication terminal 30 does not have installed therein software for executing image processing, and executes image processing by using software received from the outside or receives a result of image processing executed by external software to display an image. That is, the communication terminal 30 can display a predetermined area, which is part of the wide-view image.

The communication terminal 30 can change the point of view for the display range of the wide-view image, as desired, in response to the user's operation. The communication terminal 30 shifts the virtual point of view in response to a user operation input (such as key input, dragging, or scrolling) on a touch panel, a direction button, a mouse, a keyboard, a touch pad, or the like to change and display a visual field range (predetermined area) based on point-of-view information corresponding to a point of view obtained by shifting the virtual point of view. In an example, the communication terminal 30 is a communication terminal to be worn by the user, such as VR goggles. In response to a change in the movement of the user wearing the communication terminal 30, position information of the communication terminal 30 is changed. In response to detection of the change in the position information, the virtual point of view is shifted in accordance with the detected position information to change a visual field range (predetermined area), based on point-of-view information corresponding to the shifted point of view, and the changed visual field range (predetermined area) is displayed.

The communication terminal 30A acquires a wide-view image from the image capturing apparatus 10 via a wired cable such as a Universal Serial Bus (USB) cable connected to an input/output interface (I/F) 116 described below. The communication terminal 30A distributes the acquired wide-view image to the communication terminal 30 at another site via the information processing system 50. The connection between the image capturing apparatus 10 and the communication terminal 30A may be either a wired connection using a wired cable or a wireless connection using short-range wireless communication, for example. A plurality of communication terminals 30A may be placed at the site A.

In an example, the user a at the site A wears the smart glasses 88, and the smart glasses 88 are connected to the communication network N. An image captured by the smart glasses 88 is transmitted to the information processing system 50 via the communication network N, and the information processing system 50 can distribute the image to the communication terminal 30 at each site.

The communication terminal 30B is placed at the site B where the user b is located, and the communication terminal 30C is placed at the site C where the user c is located. A plurality of communication terminals 30B may be placed at the site B, and a plurality of communication terminals 30C may be placed at the site C. The users b and c may carry the communication terminals 30B and 30C, respectively.

Each of the communication terminals 30A to 30C at the sites A to C can be internally or externally provided with the camera 8 or 9. The cameras 8 and 9 are examples of an imaging device. Each of the communication terminals 30A to 30C can distribute an image of the corresponding one of the sites A to C, which is captured by the camera 8 or 9 thereof, to the other sites. Any device may be placed at each of the sites A to C.

The arrangement of the terminals and apparatus (i.e., the communication terminals 30 and the image capturing apparatus 10) and the users a to c illustrated in FIG. 2 is an example. Any other arrangement may be used. The communication terminal 30 is not limited to a PC and may be, for example, a tablet terminal, a smartphone, a PDA, a wearable terminal (including smart glasses or VR goggles), a projector (PJ), an Interactive White Board (IWB), which is an electronic whiteboard with mutual communication capability, a telepresence robot, or the like. The communication terminal 30 is any computer on which a web browser or an application dedicated to an image distribution service operates.

In an example, the image capturing apparatus 10 includes a display and displays an image distributed from another site on the display.

The information processing system 50 includes one or more information processing apparatuses. The information processing system 50 manages and controls communication among the image capturing apparatus 10 and the communication terminals 30 at the respective sites and manages a wide-view image to be transmitted and received. The information processing system 50 provides a platform on which a function of providing an image distribution service for distributing a wide-view image is available. The platform may be made available to a person, a company, or any other service provider that desires to provide an image distribution service, under contract. A service provider that provides an image distribution service to a user by using a contracted platform is hereinafter referred to as a platform contractor to distinguish the service provider from a tenant who receives the image distribution service.

The information processing system 50 may publish an application programming interface (API) as a platform, and the platform contractor may use the API to provide various image distribution services. The platform contractor mainly develops software such as an application for calling the API or the screen to be displayed on the communication terminal 30. That is, the functions to be provided by the API, such as image distribution, do not have to be developed from scratch.

The information processing system 50 may be implemented by a single computer or a plurality of computers such that the components (functions or means) of the information processing system 50 are divided into and assigned to the plurality of computers as appropriate. All or some of the functions of the information processing system 50 may be implemented by a server computer residing in a cloud environment or a server computer residing in an on-premise environment.

The storage 90 is a storage device that stores data such as a wide-view image. In an example, the storage 90 is an external storage separate from the information processing system 50. The external storage may be a cloud or on-premise storage. In another example, the storage 90 is a storage included in the information processing system 50.

Example Hardware Configuration

Next, the hardware configurations of each apparatus or terminal included in the communication system 1*a* according to this embodiment will be described with reference to FIGS. 3 and 4. In the hardware configurations illustrated in FIGS. 3 and 4, certain hardware elements may be added or deleted as appropriate.

Hardware Configuration of Image Capturing Apparatus

First, the hardware configuration of the image capturing apparatus 10 will be described with reference to FIG. 3. FIG. 3 is a diagram illustrating an example hardware configuration of the image capturing apparatus 10. In the following description, the image capturing apparatus 10 is a spherical (omnidirectional) image capturing apparatus including two imaging elements. However, the image capturing apparatus 10 may include one imaging element or three or more imaging elements. In one example, the image capturing apparatus 10 is not dedicated to omnidirectional image capturing, and an external omnidirectional image capturing unit is attached to a general-purpose digital camera or a smartphone to implement functions that are substantially the same as those of the image capturing apparatus 10.

Figure 3:
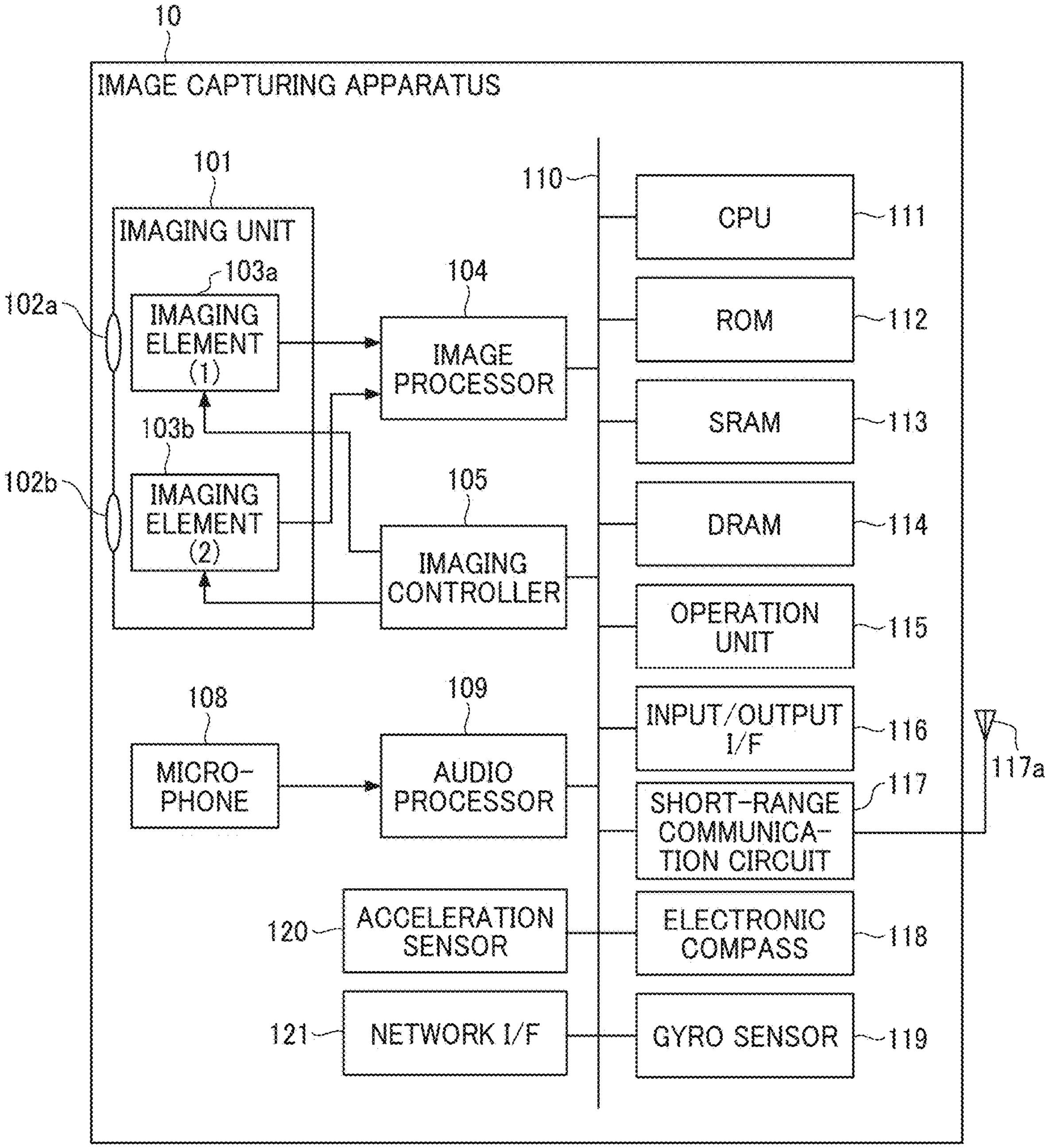
FIG. 3 is a diagram illustrating an example hardware configuration of an image capturing apparatus.

As illustrated in FIG. 3, the image capturing apparatus 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna 117*a* for the short-range communication circuit 117, an electronic compass 118, a gyro sensor 119, an acceleration sensor 120, and a network I/F 121.

The imaging unit 101 includes two wide-angle lenses (so-called fish-eye lenses) 102*a* and 102*b* (collectively referred to as lenses 102 unless distinguished), each having an angle of view of equal to or greater than 180 degrees so as to form a hemispherical image. The imaging unit 101 further includes two imaging elements 103*a* and 103*b* corresponding to the lenses 102*a* and 102*b* respectively. Each of the imaging elements 103*a* and 103*b* includes an image sensor such as a complementary metal oxide semiconductor (CMOS) sensor or a charge-coupled device (CCD) sensor, a timing generation circuit, and a group of registers. The image sensor converts an optical image formed by the lens 102*a* or 102*b* into an electric signal and outputs image data. The timing generation circuit generates horizontal or vertical synchronization signals, pixel clocks, and the like for the image sensor. In the group of registers, various commands, parameters, and the like for an operation of the imaging element 103*a* or 103*b* are set. As a non-limiting example, the imaging unit 101 includes two wide-angle lenses. The imaging unit 101 may include one wide-angle lens or three or more wide-angle lenses.

Each of the imaging elements 103*a* and 103*b* of the imaging unit 101 is connected to the image processor 104 via a parallel I/F bus. Further, each of the imaging elements 103*a* and 103*b* of the imaging unit 101 is connected to the imaging controller 105 via a serial I/F bus such as an inter-integrated circuit (I2C) bus. The image processor 104, the imaging controller 105, and the audio processor 109 are connected to the CPU 111 via a bus 110. The ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires respective items of image data output from the imaging elements 103*a* and 103*b* via the parallel I/F buses and performs predetermined processing on the items of image data. Thereafter, the image processor 104 combines the items of image data to generate data of an equirectangular projection image (an example of a wide-view image) described below.

The imaging controller 105 usually functions as a master device while each of the imaging elements 103*a* and 103*b* usually functions as a slave device. The imaging controller 105 sets commands and the like in the group of registers of each of the imaging elements 103*a* and 103*b* via the I2C bus. The imaging controller 105 receives various commands from the CPU 111. The imaging controller 105 further acquires status data and the like of the group of registers of each of the imaging elements 103*a* and 103*b* via the I2C bus. The imaging controller 105 sends the obtained status data and the like to the CPU 111.

The imaging controller 105 instructs the imaging elements 103*a* and 103*b* to output the image data at the time when a shutter button of the operation unit 115 is pressed. In one example, the image capturing apparatus 10 displays a preview image or a moving image (movie) on a display. Examples of the display include a display of a smartphone or any other external terminal that performs short-range communication with the image capturing apparatus 10 through the short-range communication circuit 117. In the case of displaying movie, image data are continuously output from the imaging elements 103*a* and 103*b* at a predetermined frame rate (frames per minute).

The imaging controller 105 operates in cooperation with the CPU 111 to synchronize the time when the imaging element 103*a* outputs image data and the time when the imaging element 103*b* outputs the image data. In this embodiment, the image capturing apparatus 10 does not include a display unit (or display). In some embodiments, the image capturing apparatus 10 may include a display unit. The microphone 108 converts sound to audio data (signal). The audio processor 109 acquires the audio data output from the microphone 108 via an I/F bus and performs predetermined processing on the audio data.

The CPU 111 controls entire operation of the image capturing apparatus 10 and performs predetermined processing. The ROM 112 stores various programs for execution by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation keys, a power switch, a shutter button, a touch panel having both the display and operation functions, and the like. The user operates the operation unit 115 to input various image capturing modes or image capturing conditions.

The input/output I/F 116 collectively refers to an interface circuit such as a USB I/F that allows the image capturing apparatus 10 to communicate with an external medium such as a Secure Digital (SD) card or an external personal computer. The input/output I/F 116 may be either wired or wireless. The data of the equirectangular projection image, which is stored in the DRAM 114, is stored in the external medium via the input/output I/F 116 or transmitted to an external terminal (apparatus) via the input/output I/F 116, as desired.

The short-range communication circuit 117 communicates with the external terminal (apparatus) via the antenna 117*a* of the image capturing apparatus 10 by short-range wireless communication technology such as near field communication (NFC), Bluetooth®, or Wi-Fi®. The short-range communication circuit 117 can transmit the data of the equirectangular projection image to the external terminal (apparatus).

The electronic compass 118 calculates an orientation of the image capturing apparatus 10 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data.

The gyro sensor 119 detects a change in tilt (roll, pitch, and yaw) of the image capturing apparatus 10 with movement of the image capturing apparatus 10. The change in tilt is one example of related information (metadata) in compliance with Exif. This information is used for image processing such as image correction of a captured image.

The acceleration sensor 120 detects acceleration in three axial directions. The image capturing apparatus 10 calculates the position of the image capturing apparatus 10 (e.g., the tilt of the image capturing apparatus 10 relative to the direction of gravity), based on the acceleration detected by the acceleration sensor 120. The gyro sensor 119 and the acceleration sensor 120 of the image capturing apparatus 10 improve the accuracy of image correction.

The network I/F 121 is an interface for performing data communication using the communication network N, such as the Internet, via a router or the like. The hardware elements of the image capturing apparatus 10 are not limited to the illustrated ones as long as the functional configuration of the image capturing apparatus 10 can be implemented. At least some of the hardware elements described above may reside on the communication network N.

Hardware Configuration of Communication Terminal

Figure 4:
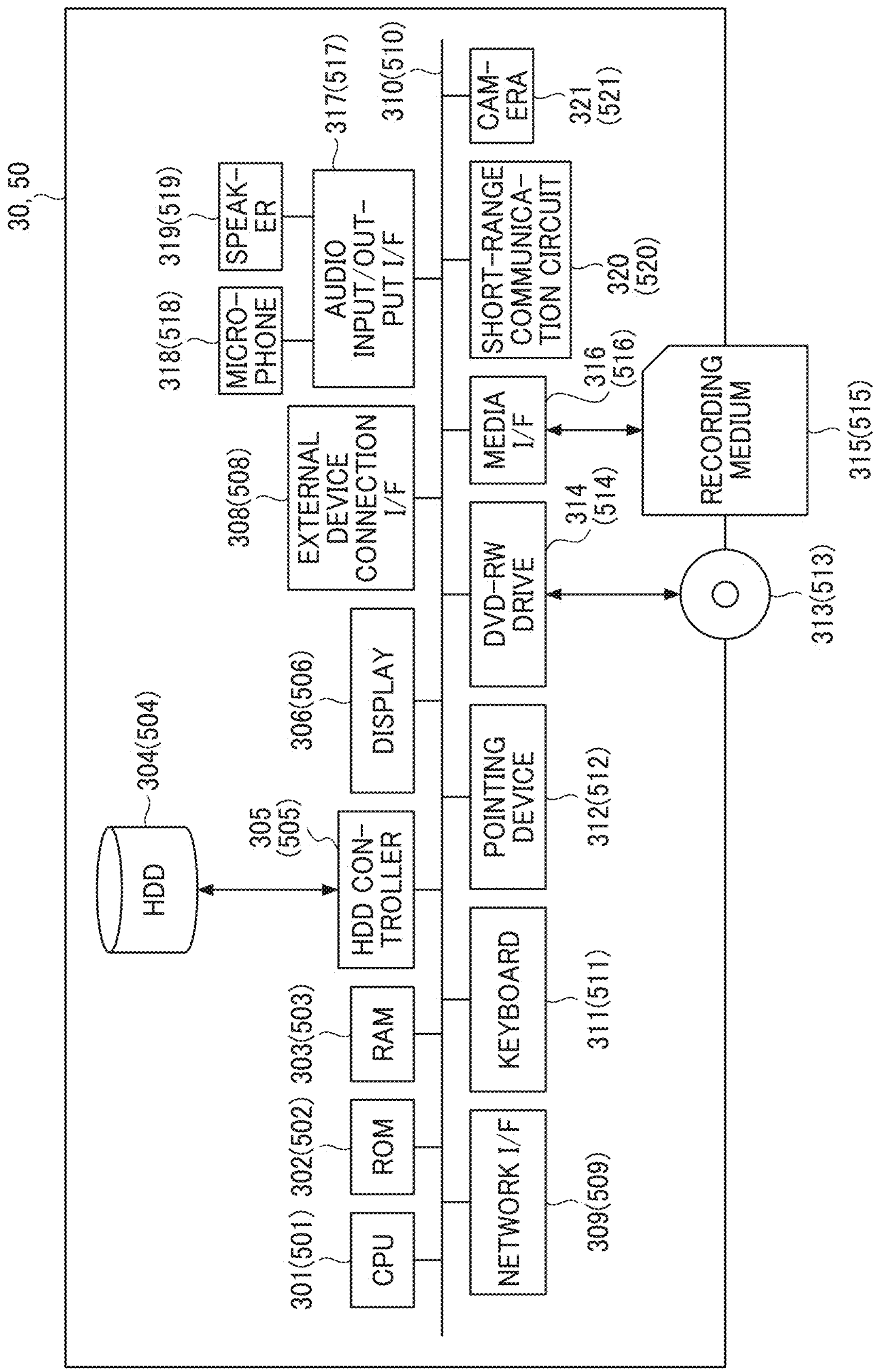
FIG. 4 is a diagram illustrating an example hardware configuration of a communication terminal and an information processing system.

FIG. 4 is a diagram illustrating an example hardware configuration of the communication terminal 30 and the information processing system 50. First, the communication terminal 30 will be described. Each hardware element of the communication terminal 30 is denoted by a reference numeral in 300 series. The communication terminal 30 is implemented by one or more computers. As illustrated in FIG. 4, the communication terminal 30 includes a CPU 301, a ROM 302, a RAM 303, a hard disk drive (HDD) 304, an HDD controller 305, a display 306, an external device connection I/F 308, a network I/F 309, a bus line 310, a keyboard 311, a pointing device 312, a digital versatile disc rewritable (DVD-RW) drive 314, a media I/F 316, an audio input/output I/F 317, a microphone 318, a speaker 319, a short-range communication circuit 320, and a camera 321.

The CPU 301 controls entire operation of the communication terminal 30. The ROM 302 stores a control program such as an initial program loader (IPL) for driving the CPU 301. The RAM 303 is used as a work area for the CPU 301. The HDD 304 stores a program and various data. The HDD controller 305 controls reading or writing of various data from or to the HDD 304 under control of the CPU 301.

The display 306 displays various kinds of information such as a cursor, a menu, a window, characters, and an image. In one example, the display 306 is a touch panel display provided with an input means. The display 306 is an example of a display unit. Examples of the display unit include a display of the communication terminal 30, an external display attached to the communication terminal 30, a display of another communication terminal different from the communication terminal 30, and a screen (including an object to be displayed using projection mapping) projected by a projector.

The external device connection I/F 308 is an interface for connecting to various external devices. The external devices include, but are not limited to, a USB memory and a printer. The network I/F 309 is an interface for performing data communication using the communication network N. The bus line 310 is an address bus or a data bus for electrically connecting the hardware elements illustrated in FIG. 4, such as the CPU 301, to each other. The HDD 304 and the HDD controller 305 are each an example of a storage that stores a program, data, and the like, and may be a solid state drive (SSD) and an SSD controller, respectively.

The keyboard 311 is an example of an input means including a plurality of keys for inputting characters, numerical values, various instructions, and the like. The pointing device 312 is an example of an input means used for selecting or executing various instructions, selecting a target for processing, or moving a cursor being displayed. The input means are not limited to the keyboard 311 and the pointing device 312 and may be a touch panel, a voice input device, or the like. The DVD-RW drive 314 controls reading or writing of various data from or to a DVD-RW 313, which is an example of a removable recording medium. A digital versatile disc recordable (DVD-R) disc, a Blu-ray Disc®, or any other recording medium may be used instead of the DVD-RW 313. The media I/F 316 controls reading or writing (storing) of data from or to a recording medium 315 such as a flash memory. The microphone 318 is an example of a built-in sound collecting means for receiving input sounds. The audio input/output I/F 317 is a circuit for controlling input and output of audio signals between the microphone 318 and the speaker 319 under control of the CPU 301. The short-range communication circuit 320 communicates with the external terminal (apparatus) by short-range wireless communication technology such as NFC, Bluetooth®, or Wi-Fi®. The camera 321 is an example of a built-in image capturing means for capturing an image of an object to obtain image data. In one example, the microphone 318, the speaker 319, and the camera 321 are devices external to the communication terminal 30 in alternative to built-in devices.

The hardware elements of the communication terminal 30 are not limited to the illustrated ones as long as the functional configuration of the communication terminal 30 can be implemented. At least some of the hardware elements described above may reside on the communication network N.

Hardware Configuration of Information Processing System

As illustrated in FIG. 4, each hardware element of the information processing system 50 is denoted by a reference numeral in 500 series in parentheses. The information processing system 50 is implemented by one or more computers and has substantially the same configuration as that of the communication terminal 30 illustrated in FIG. 4, and thus the description of the hardware configuration of the information processing system 50 will be omitted.

The hardware elements of the information processing system 50 are not limited to the illustrated ones as long as the functional configuration of the information processing system 50 can be implemented. At least some of the hardware elements described above may reside on the communication network N.

Each of the programs described above may be recorded as a file in a format installable or executable on a computer-readable recording medium for distribution. Examples of the recording medium include a compact disc recordable (CD-R), a digital versatile disc (DVD), a Blu-ray Disc®, an SD card, and a USB memory. The recording medium may be provided in the form of a program product to users within a certain country or outside that country. For example, in the communication terminal 30, a program according to an embodiment of the present disclosure is executed to implement a display method according to an embodiment of the present disclosure.

Wide-View Image and Point-of-View Information

A method for generating a wide-view image (spherical image) will be described hereinafter with reference to FIGS. 5A to 12.

Figure 5A:
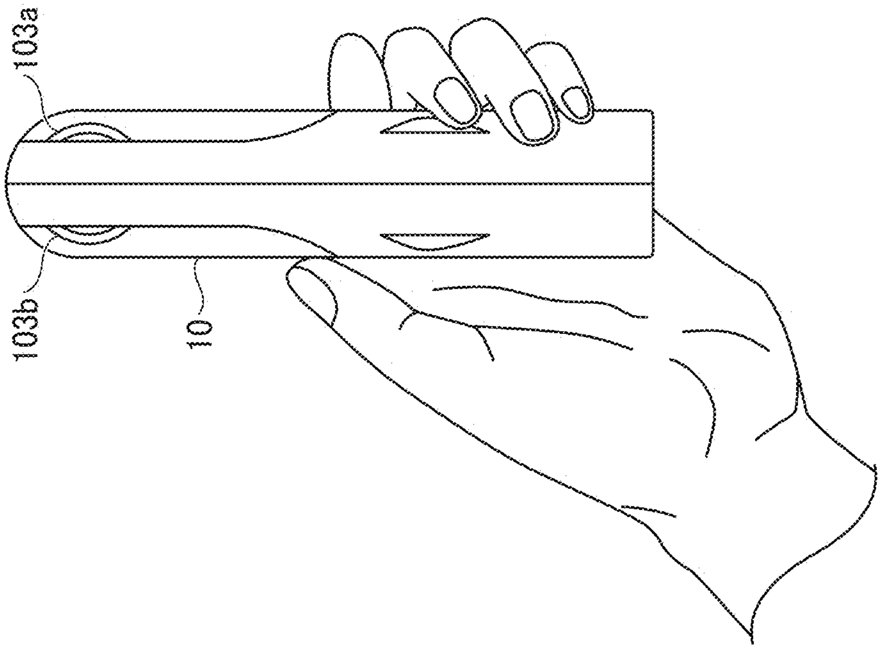
FIGS. 5A, 5B, and 5C are a left side view, a front view, and a plan view of the image capturing apparatus according to an embodiment of the present disclosure, respectively.
Figure 5B:
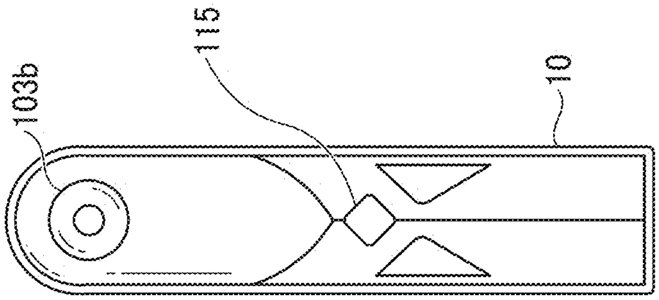
Figure 5C:
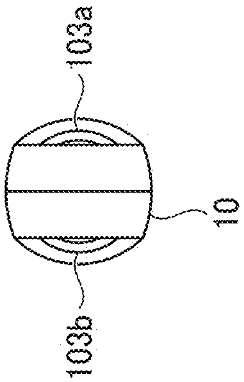

First, the external appearance of the image capturing apparatus 10 will be described with reference to FIGS. 5A to 5C. The image capturing apparatus 10 is a digital camera for capturing images from which a 360-degree spherical image is generated. FIG. 5A is a left side view of the image capturing apparatus 10. FIG. 5B is a front view of the image capturing apparatus 10. FIG. 5C is a plan view of the image capturing apparatus 10. The illustrated external view of the image capturing apparatus 10 is merely an example. The image capturing apparatus 10 may have any other external appearance.

As illustrated in FIG. 5A, the image capturing apparatus 10 has a size such that a person can hold the image capturing apparatus 10 with one hand. The illustrated shape of the image capturing apparatus 10 is an example. The image capturing apparatus 10 may have any other shape. As illustrated in FIGS. 5A, 5B, and 5C, the imaging element 103*a* and the imaging element 103*b* are disposed in an upper portion of the image capturing apparatus 10 such that the imaging element 103*a* is disposed on the front side and the imaging element 103*b* is disposed on the back side. The imaging elements (image sensors) 103*a* and 103*b* are used in combination with optical members (e.g., the lenses 102*a* and 102*b* described above), each being configured to capture a hemispherical image having an angle of view of equal to or greater than 180 degrees. As illustrated in FIG. 5B, the operation unit 115, such as a shutter button, is disposed on the back surface of the image capturing apparatus 10. As described above, the image capturing apparatus 10 may include one imaging element or three or more imaging elements.

Figure 6:
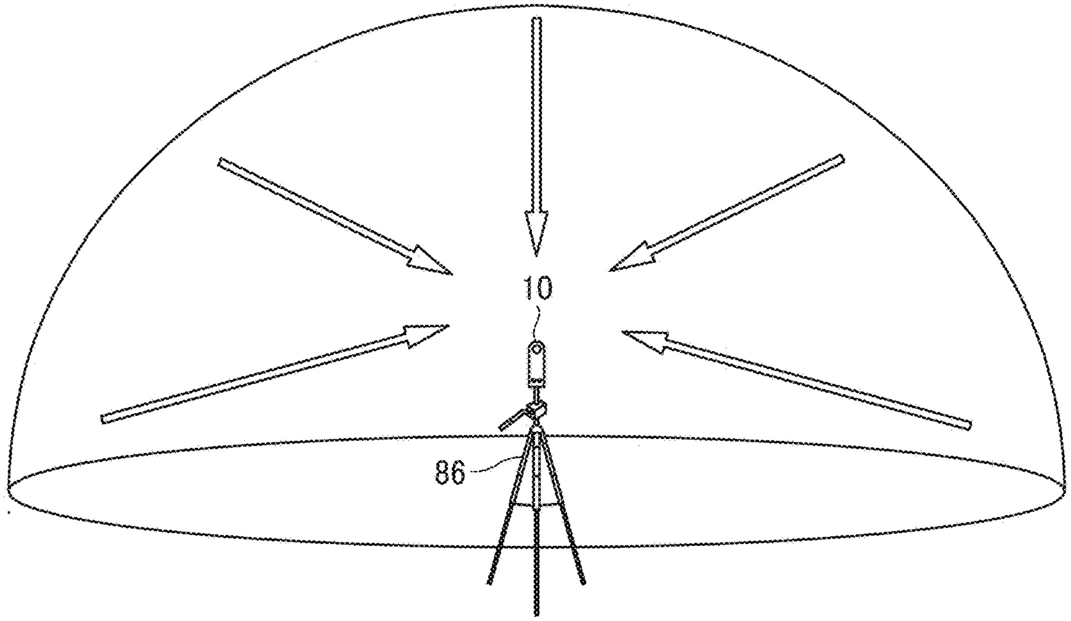
FIG. 6 is an illustration for explaining how a user uses the image capturing apparatus, according to an embodiment of the present disclosure.

Next, a situation where the image capturing apparatus 10 is used will be described with reference to FIG. 6. FIG. 6 is an illustration for explaining how a user uses the image capturing apparatus 10. As illustrated in FIG. 6, for example, the image capturing apparatus 10 is used for capturing an image of objects surrounding the image capturing apparatus 10. Each of the imaging elements 103*a* and 103*b* illustrated in FIGS. 5A to 5C captures an image of the objects surrounding the image capturing apparatus 10. As a result, two hemispherical images are obtained.

Figure 7A:
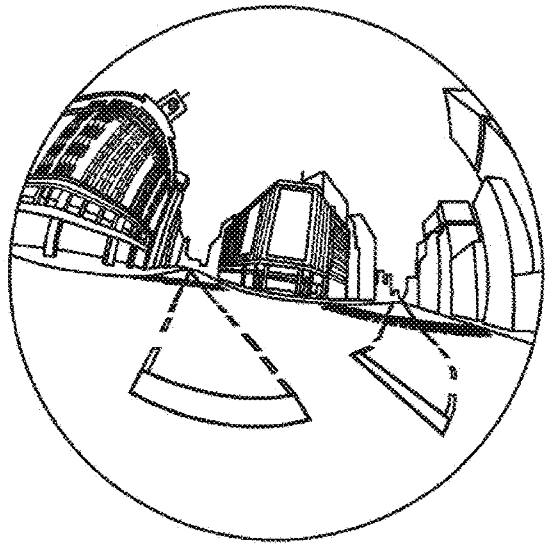
FIGS. 7A, 7B, and 7C are views illustrating a hemispherical image (front side) captured by the image capturing apparatus, a hemispherical image (back side) captured by the image capturing apparatus, and an image in equirectangular projection, respectively, according to an embodiment of the present disclosure.
Figure 7B:
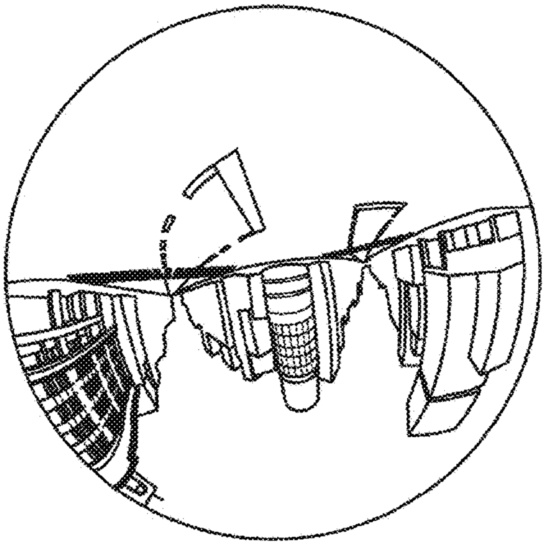
Figure 7C:
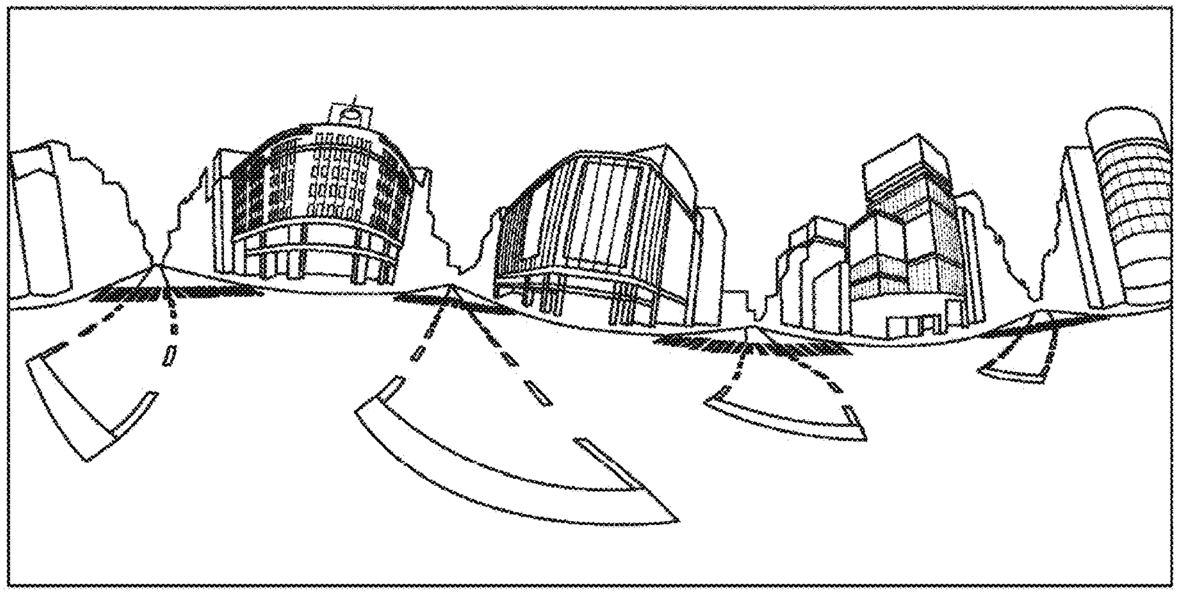
Figure 8A:
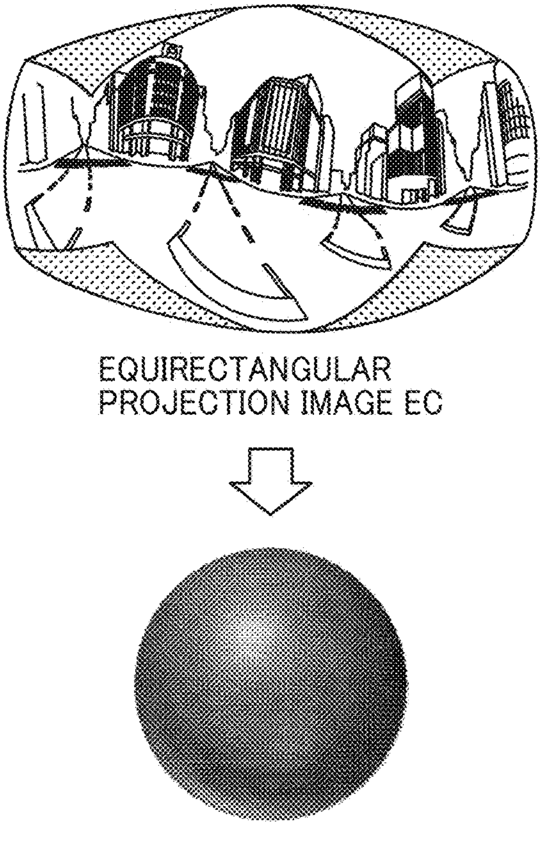
FIG. 8A is a conceptual diagram illustrating an example of how the image in equirectangular projection is mapped to a surface of a sphere.
Figure 8B:
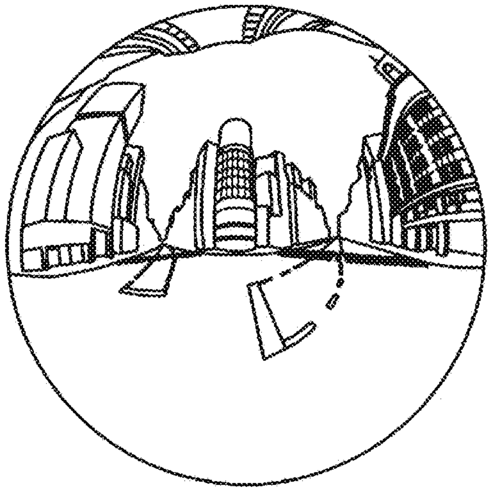
FIG. 8B is a view illustrating a spherical image, according to an embodiment of the present disclosure.

Next, an overview of a process for generating a spherical image from the images captured by the image capturing apparatus 10 will be described with reference to FIGS. 7A to 7C and FIGS. 8A and 8B. FIG. 7A is a view illustrating a hemispherical image (front side) captured by the image capturing apparatus 10. FIG. 7B is a view illustrating a hemispherical image (back side) captured by the image capturing apparatus 10. FIG. 7C is a view illustrating an image in equirectangular projection (hereinafter referred to as an "equirectangular projection image" or an "equidistant cylindrical projection image"). FIG. 8A is a conceptual diagram illustrating how the equirectangular projection image is mapped to a surface of a sphere. FIG. 8B is a view illustrating a spherical image. The term "equirectangular projection image" refers to a spherical image in equirectangular projection format, which is an example of the wide-view image described above.

As illustrated in FIG. 7A, an image obtained by the imaging element 103*a* is a curved hemispherical image (front side) captured through the lens 102*a* described above. As illustrated in FIG. 7B, an image captured by the imaging element 103*b* is a curved hemispherical image (back side) captured through the lens 102*b* described above. The image capturing apparatus 10 combines the hemispherical image (front side) and the hemispherical image (back side), which are flipped by 180 degrees, to create an equirectangular projection image EC as illustrated in FIG. 7C.

The image capturing apparatus 10 uses software such as OpenGL ES to map the equirectangular projection image EC so as to cover a surface of a sphere as illustrated in FIG. 8A, to generate a spherical image (or spherical panoramic image) CE as illustrated in FIG. 8B. That is, the spherical image CE is represented as the equirectangular projection image EC, which corresponds to a surface facing the center of the sphere. OpenGL ES is a graphics library used for visualizing 2D and 3D data. OpenGL ES is an example of software for executing image processing. Any other software may be used to create the spherical image CE. The spherical image CE may be either a still image or a moving image. As a non-limiting example, the image capturing apparatus 10 generates a spherical image. In another example, the information processing system 50 or the communication terminal 30 executes similar image processing or some steps of the image processing.

Since the spherical image CE is an image mapped so as to cover the surface of the sphere, part of the image may look distorted when viewed by a user, providing a strange feeling. To overcome the strange feeling, the image capturing apparatus 10 or the communication terminal 30 displays an image of a predetermined area T, which is part of the spherical image CE, as a flat image having fewer curves to make the user feel comfortable when viewing the image. The image of the predetermined area T is referred to as a "predetermined-area image". The display of the predetermined-area image will be described with reference to FIGS. 9 and 10A to 10D.

Figure 9:
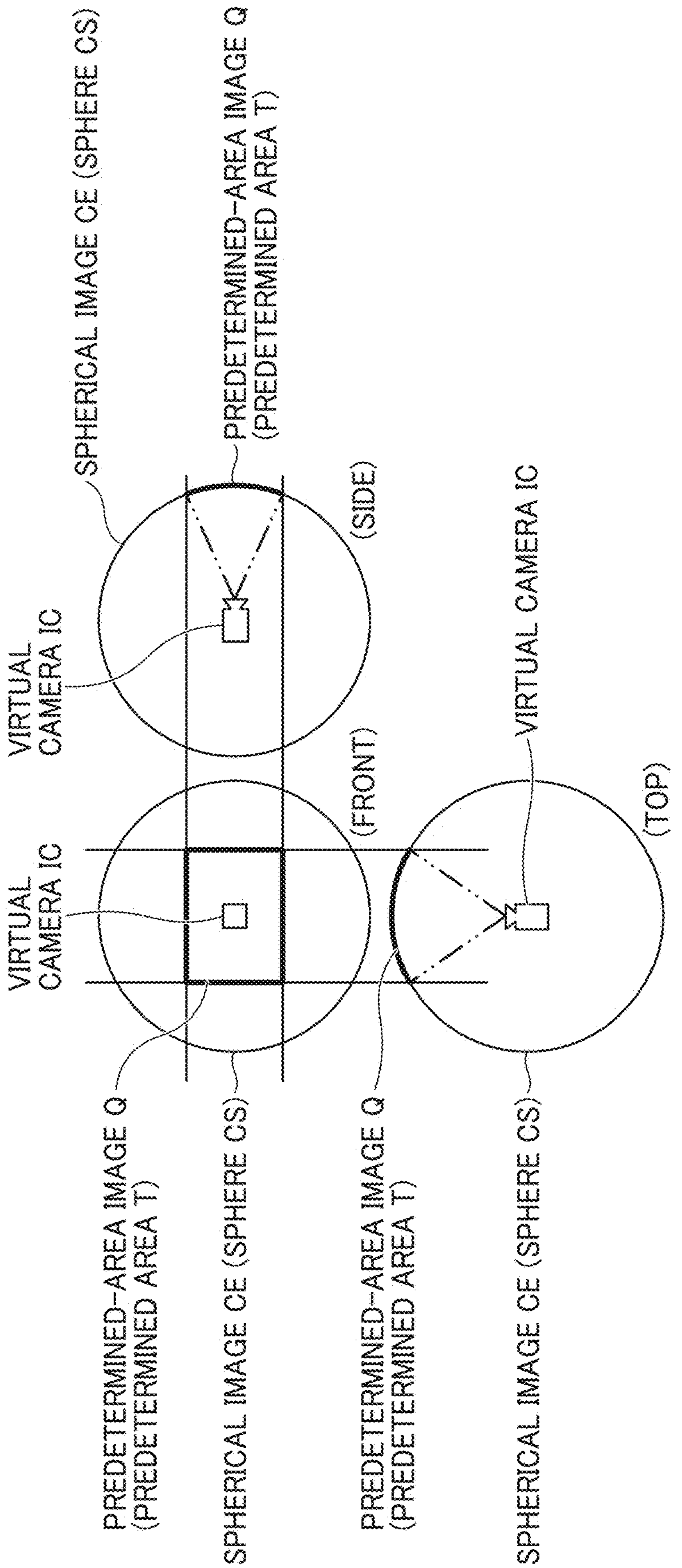
FIG. 9 is a view illustrating positions of a virtual camera and a predetermined area in a case where the spherical image is of a three-dimensional sphere according to an embodiment of the present disclosure.
Figure 10A:
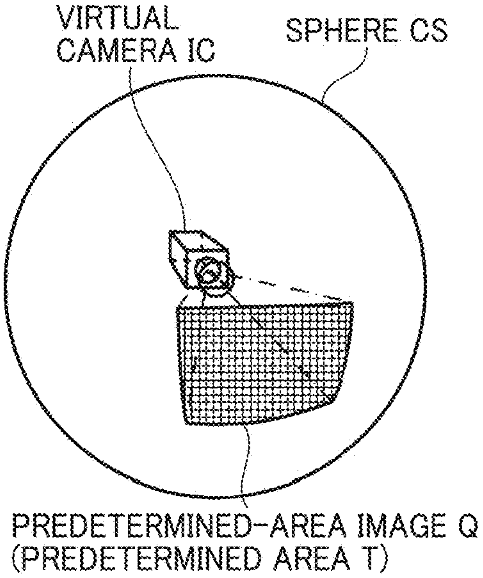
FIG. 10A is a perspective view of the virtual camera and the predetermined area illustrated in FIG. 9 according to an embodiment of the present disclosure.
Figure 10B:
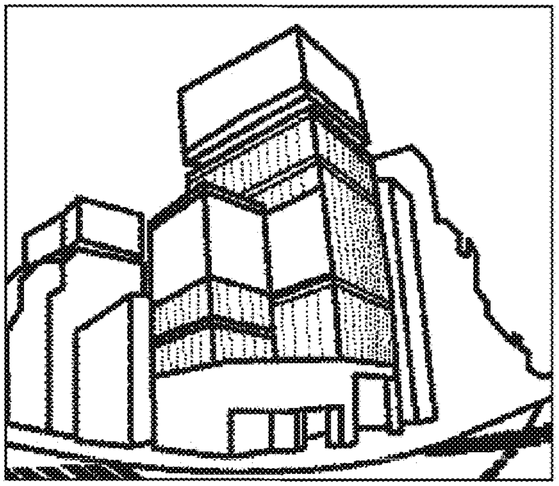
FIG. 10B is a view illustrating a predetermined-area image obtained in the state illustrated in FIG. 10A and displayed on a display according to an embodiment of the present disclosure.
Figure 10C:
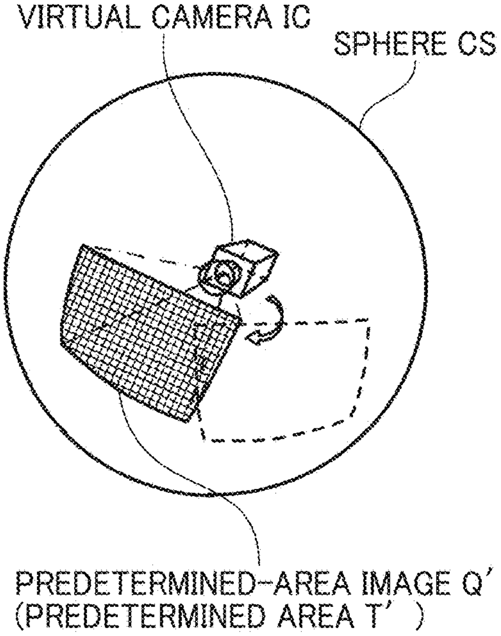
FIG. 10C is a view of a predetermined area obtained by changing the point of view of the virtual camera illustrated in FIG. 10A according to an embodiment of the present disclosure.
Figure 10D:
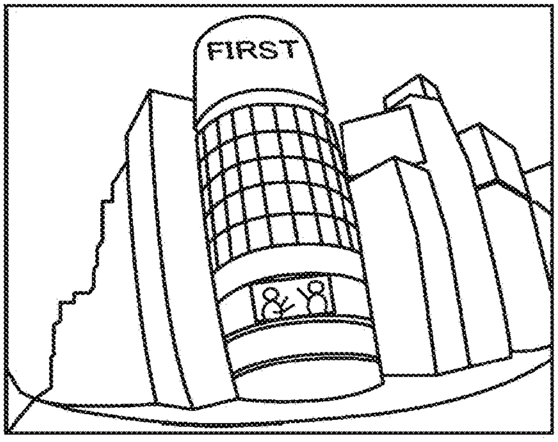
FIG. 10D is a view illustrating a predetermined-area image obtained in the state illustrated in FIG. 10C and displayed on the display according to an embodiment of the present disclosure.

FIG. 9 is a view illustrating the position of a virtual camera IC and the position of the predetermined area T in a case where the spherical image CE is of a three-dimensional sphere CS. The position of the virtual camera IC corresponds to the position of a virtual point of view of a user who is viewing the spherical image CE represented as a surface area of the three-dimensional sphere CS. FIG. 10A is a perspective view of the virtual camera IC and the predetermined area T illustrated in FIG. 9. FIG. 10B is a view illustrating a predetermined-area image obtained in the state illustrated in FIG. 10A and displayed on a display. FIG. 10C is a view of a predetermined area obtained by changing the point of view of the virtual camera IC illustrated in FIG. 10A. FIG. 10D is a view illustrating a predetermined-area image obtained in the state illustrated in FIG. 10C and displayed on the display.

Assuming that the spherical image CE generated in the way described above is a surface area of the sphere CS, the virtual camera IC is inside the spherical image CE as illustrated in FIG. 9. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. Zooming in or out of the predetermined area T can be implemented by bringing the virtual camera IC closer to or farther away from the spherical image CE. A predetermined-area image Q is the image of the predetermined area T in the spherical image CE. The predetermined area T is defined by an angle of view α of the virtual camera IC and a distance f from the virtual camera IC to the spherical image CE (see FIG. 11).

The predetermined-area image Q illustrated in FIG. 10A is displayed on a predetermined display as an image of the imaging area of the virtual camera IC, as illustrated in FIG. 10B. The image illustrated in FIG. 10B is a predetermined-area image represented by predetermined-area information that is set by default. A description will be made using the imaging direction (ea, aa) and the angle of view (α) of the virtual camera IC. In another example, the predetermined area T is not defined by the angle of view α and the distance f, and the imaging area of the virtual camera IC, which is the predetermined area T, is identified by position coordinates (X, Y, Z).

As illustrated in FIG. 10C, in response to the shift (also referred to as "change") of the point of view of the virtual camera IC to the right (i.e., to the left from the viewer's perspective) from the state illustrated in FIG. 10A, the predetermined area T in the spherical image CE is shifted to a predetermined area T'. Accordingly, the predetermined-area image Q displayed on the predetermined display is changed to a predetermined-area image Q'. As a result, the display displays the image illustrated in FIG. 10D instead of the image illustrated in FIG. 10B.

Figure 11:
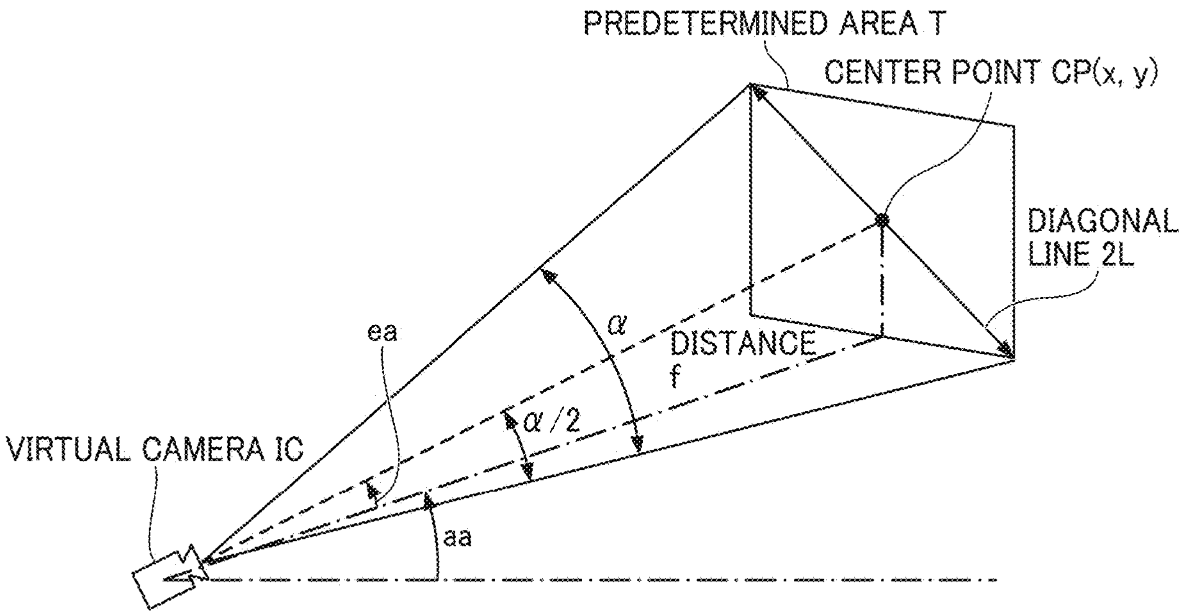
FIG. 11 is a view illustrating a relationship between predetermined-area information and an image of the predetermined area according to an embodiment of the present disclosure.

Next, a relationship between the predetermined-area information and the image of the predetermined area T will be described with reference to FIG. 11. FIG. 11 is a view illustrating a relationship between the predetermined-area information and the image of the predetermined area T. As illustrated in FIG. 11, "ea" denotes an elevation angle, "aa" denotes an azimuth angle, and "α" denotes an angle of view of the virtual camera IC. The position of the virtual camera IC is adjusted such that the point of gaze of the virtual camera IC, indicated by the imaging direction (ea, aa), matches a center point CP (x, y) of the predetermined area T serving as the imaging area of the virtual camera IC. As illustrated in FIG. 11, the center point CP (x, y) of the predetermined area T, whose diagonal angle of view is represented by the angle of view α of the virtual camera IC and is denoted by α, is used as a parameter (x, y) of the predetermined-area information. The predetermined-area image Q is the image of the predetermined area T in the spherical image CE. The distance f is a distance from the virtual camera IC to the center point CP (x, y) of the predetermined area T. The distance between the center point CP (x, y) and a given vertex of the predetermined area T is denoted by "L" (2L is a diagonal line). In FIG. 11, a trigonometric function generally expressed by Equation (1) below holds.

$$\frac{L}{f} = \tan\left(\frac{\alpha}{2}\right) \qquad \text{Equation (1)}$$

The image capturing apparatus 10 described above is an example of an image capturing apparatus that can acquire a wide-view image. The spherical image CE is an example of a wide-view image. The wide-view image is generally an image taken with a wide-angle lens such as a lens capable of taking a range wider than a range that the human eye can perceive.

Figure 12:
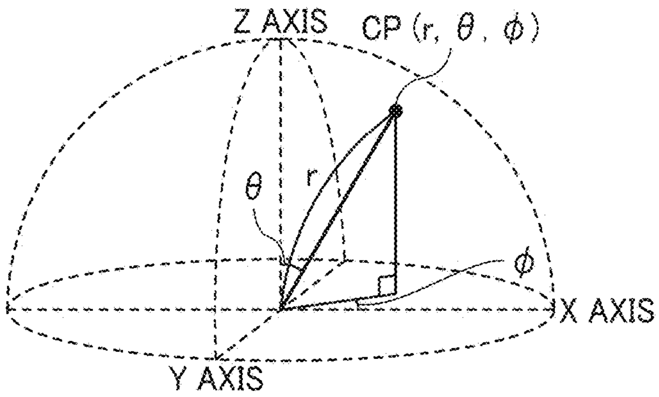
FIG. 12 is a view illustrating a point in a three-dimensional Euclidean space defined in spherical coordinates, according to an embodiment of the present disclosure.

FIG. 12 is a view illustrating the relationship illustrated in FIG. 11 using a point in a three-dimensional Euclidean space defined in spherical coordinates. The center point CP illustrated in FIG. 11 is represented by a spherical polar coordinate system to obtain position coordinates (r, θ, φ). The position coordinates (r, θ, φ) represent a radius vector, a polar angle, and an azimuth angle. The radius vector r is a distance from the origin of the three-dimensional virtual space including the spherical image CE to the center point CP. Accordingly, the radius vector r is equal to the distance f illustrated in FIG. 11. FIG. 12 illustrates the relationship illustrated in FIG. 11. In the following description, the position coordinates (r, θ, φ) of the virtual camera IC are used as an example of point-of-view information. As described above, the point-of-view information is any parameter information that can define the predetermined area T (the predetermined-area image Q) displayed on the predetermined display illustrated in FIG. 10A as the image of the imaging area of the virtual camera IC. The point-of-view information includes the coordinates of the diagonal vertices of the predetermined area T. In an example, the point-of-view information includes information indicating the angle of view α of the virtual camera IC and information indicating the center point CP (x, y), which have been described with reference to FIG. 11. In another example, the point-of-view information includes information indicating the angle of view α of the virtual camera IC and information indicating the azimuth angle aa, which have been described with reference to FIG. 11. Examples of the point-of-view information include position coordinate information in the form of spherical coordinates, position coordinate information in the form of orthogonal coordinates, and a difference value between the predetermined-area information that is set by default and the coordinates. Other examples of the point-of-view information include information other than coordinate information, such as an angle and a distance, as illustrated in FIG. 11. In FIGS. 11 and 12, the center point CP of the predetermined area Tis used as a reference. In another example, the predetermined area T may be defined by parameter information with any one of the vertices of the predetermined area T as a reference. In the foregoing description of the point-of-view information, as a non-limiting example, the wide-view image is a spherical image. In any other wide-view image, information that defines the predetermined area T in the other wide-view image is point-of-view information.

The point-of-view information may include parameter information such as the height and width of the predetermined area T or parameter information such as the magnification factor of the virtual camera IC by zooming in or out. In an example, the point-of-view information is parameter information such as the direction and the angle of view of the virtual camera IC in a case where the position of each pixel in the equirectangular projection image EC illustrated in FIG. 7C is associated with the coordinates of the corresponding position on the surface of the sphere (e.g., coordinates on two axes, namely, latitude and longitude). In another example, the point-of-view information includes information such as latitude and longitude. As described above, the point-of-view information is not limited to information indicating a point.

Functions

Figure 13:
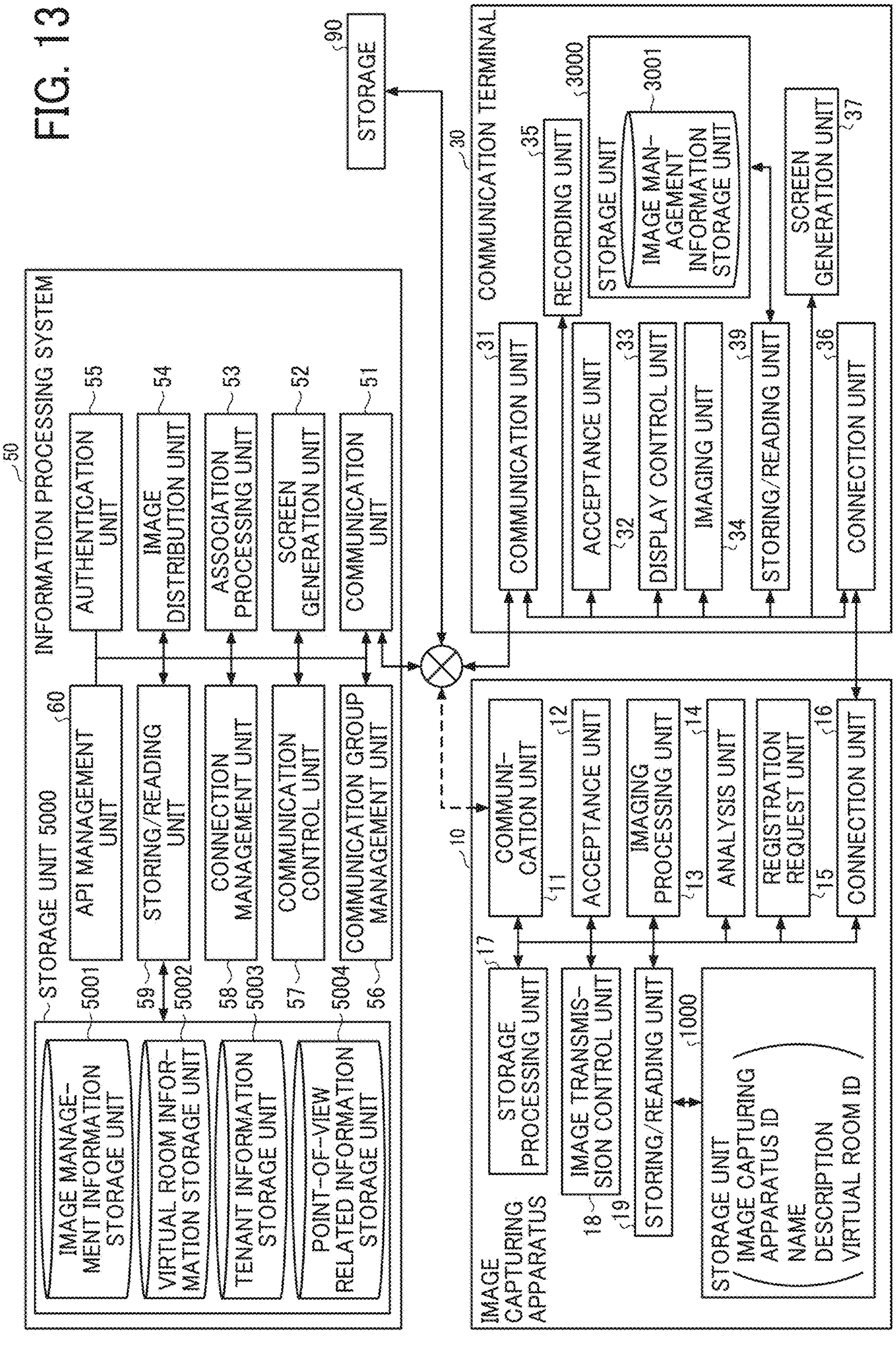
FIG. 13 is a diagram illustrating an example functional configuration of the communication system.

Next, the functional configuration of the communication system 1*a* according to this embodiment will be described with reference to FIG. 13. FIG. 13 is a diagram illustrating an example functional configuration of the communication system 1*a* according to this embodiment. FIG. 13 illustrates functions, related to processes or operations described below, of the terminals, the apparatus, and the server illustrated in FIG. 1.

Functional Configuration of Image Capturing Apparatus

First, the functional configuration of the image capturing apparatus 10 will be described with reference to FIG. 13. The image capturing apparatus 10 includes a communication unit 11, an acceptance unit 12, an imaging processing unit 13, an analysis unit 14, a registration request unit 15, a connection unit 16, a storage processing unit 17, an image transmission control unit 18, and a storing/reading unit 19. Each of these units is a function or means that is implemented by any one of the hardware elements illustrated in FIG. 3 operating in accordance with instructions from the CPU 111 according to the program loaded onto the SRAM 113 or the DRAM 114. The image capturing apparatus 10 further includes a storage unit 1000. The storage unit 1000 is implemented by the ROM 112 and the like illustrated in FIG. 3.

The communication unit 11 is mainly implemented by the short-range communication circuit 117 operating in accordance with instructions from the CPU 111. The communication unit 11 is a function of connecting to the communication network N by using wireless communication technology such as Wi-Fi® to transmit and receive various data or information to and from another apparatus. In this embodiment, the connection unit 16 transmits a wide-view image acquired by the imaging processing unit 13 to the information processing system 50. In some embodiments, the communication unit 11 may transmit the wide-view image to the information processing system 50.

The acceptance unit 12 is mainly implemented by the operation unit 115 operating in accordance with instructions from the CPU 111. The acceptance unit 12 is a function of accepting an operation input to the image capturing apparatus 10 from the user. The acceptance unit 12 accepts the operation of turning on or off the power, turning on or off a shutter button (start or stop of transmission of the wide-view image), an operation input to a touch panel, a button, or the like from the user.

The imaging processing unit 13 is mainly implemented by the image processor 104 operating in accordance with instructions from the CPU 111. The imaging processing unit 13 captures an image of an object or surroundings such as scenery and acquires (generates) a captured image. The captured image acquired by the imaging processing unit 13 may be either or both of a moving image and a still image. In another example, the captured image may include an image and audio. Further, for example, the imaging processing unit 13 captures an image of a two-dimensional code (see FIG. 20B) displayed on the display 306 of the communication terminal 30. The imaging processing unit 13 may execute the image processing described with reference to FIGS. 7A to 8B on the captured image to generate a wide-view image.

The analysis unit 14 is mainly implemented in accordance with instructions from the CPU 111. The analysis unit 14 analyzes the two-dimensional code, of which the image is captured by the imaging processing unit 13, to extract information included in the two-dimensional code. The extracted information includes a URL for registering the image capturing apparatus 10 in the tenant, a temporary ID, and a password.

The registration request unit 15 is mainly implemented in accordance with instructions from the CPU 111. The registration request unit 15 transmits a request to the information processing system 50 via the communication unit 11 to register the image capturing apparatus 10 in the tenant in the information processing system 50, by using the information included in the two-dimensional code read by the analysis unit 14.

The connection unit 16 is mainly implemented by the input/output I/F 116 operating in accordance with instructions from the CPU 111. The connection unit 16 is a function of receiving a supply of power from the communication terminal 30A and performing data communication.

The storage processing unit 17 is mainly implemented in accordance with instructions from the CPU 111. The storage processing unit 17 performs a process of storing a wide-view image captured in response to an image capturing request from any site in a URL (e.g., a URL that specifies the storage 90) transmitted from the information processing system 50.

The image transmission control unit 18 is mainly implemented in accordance with instructions from the CPU 111. The image transmission control unit 18 is a function of controlling transmission of the wide-view image to the information processing system 50. For example, the image transmission control unit 18 transmits a captured image acquired by the imaging processing unit 13 to the information processing system 50 periodically or in response to a user operation when the captured image is a still image, or at a predetermined frame per second (FPS) when the captured image is a moving image. The image transmission control unit 18 also performs switching between the communication unit 11 and the connection unit 16.

The storing/reading unit 19 is mainly implemented in accordance with instructions from the CPU 111. The storing/reading unit 19 is a function of storing various data in the storage unit 1000 or reading various data from the storage unit 1000. The storage unit 1000 stores captured image data acquired by the imaging processing unit 13, an image capturing apparatus ID, and the like. The captured image data stored in the storage unit 1000 may be deleted when a predetermined amount of time has elapsed after the captured image data was acquired by the imaging processing unit 13, or the data transmitted to the information processing system 50 may be deleted.

The image capturing apparatus 10 has installed therein an application (also referred to as a plug-in) for supporting the communication system 1*a*. The application is used to associate the image capturing apparatus 10 with the virtual room or to accept external control. Some of the functions illustrated in FIG. 13, such as the registration request unit 15, are implemented by the application. The application for supporting the communication system 1*a* may reside on the communication network N, and a web browser or the like included in the image capturing apparatus 10 may access the application to implement similar functions.

Functional Configuration of Communication Terminal

Next, the functional configuration of the communication terminal 30 will be described with reference to FIG. 13. The communication terminal 30 includes a communication unit 31, an acceptance unit 32, a display control unit 33, an imaging unit 34, a recording unit 35, a storing/reading unit 39, a connection unit 36, and a screen generation unit 37. Each of these units is a function or means that is implemented by any one of the hardware elements illustrated in FIG. 4 operating in accordance with instructions from the CPU 301 according to the program (either the web browser or a dedicated application) loaded onto the RAM 303. The communication terminal 30 further includes a storage unit 3000, which is implemented by the ROM 302 or the recording medium 315 illustrated in FIG. 4.

The communication unit 31 is implemented by the network I/F 309 operating in accordance with instructions from the CPU 301. The communication unit 31 is a function of connecting to the communication network N and transmitting or receiving various data or information to or from any other device.

The acceptance unit 32 is mainly implemented by the keyboard 311 and the pointing device 312 operating in accordance with instructions from the CPU 301. The acceptance unit 32 is a function of accepting various selection or operation inputs to the communication terminal 30. The display control unit 33 is a function of displaying a wide-view image, an image having a normal angle of view, and various screens on the display 306 of the communication terminal 30. In an example, the communication terminal 30 may include a touch panel or an interface for gesture or voice input. In this example, the communication terminal 30 may accept various selections or operation inputs in accordance with a touch input, a gesture, or a voice input.

The display control unit 33 is mainly implemented in accordance with instructions from the CPU 301. For example, the display control unit 33 causes the display 306 to display a two-dimensional code transmitted from the information processing system 50. In an example, the two-dimensional code is QR Code®, DataMatrix (DataCode), MaxiCode, or Portable Document Format (PDF). In another example, the two-dimensional code is a barcode.

The imaging unit 34 is implemented by the camera 321 operating in accordance with instructions from the CPU 301. The imaging unit 34 captures an image of an object and surroundings.

The recording unit 35 is implemented in accordance with instructions from the CPU 301. The recording unit 35 records data of a wide-view image in a moving image distributed from the information processing system 50 after the data of the wide-view image is received by the communication unit 31 to store recorded image data in the storage unit 3000 through the storing/reading unit 39.

The connection unit 36 is mainly implemented by the short-range communication circuit 320 operating in accordance with instructions from the CPU 301. The connection unit 36 is a function of supplying power to the image capturing apparatus 10 and performing data communication.

The screen generation unit 37 is implemented by a viewing application in accordance with instructions of the CPU 301. The screen generation unit 37 generates (creates) a thumbnail image of a predetermined-area image indicated by each item of point-of-view information. In an example, the viewing application is not installed in advance, and the communication terminal 30 may have a function equivalent to that of the screen generation unit 37 in advance. In another example, the communication terminal 30 may receive a program having a function equivalent to that of a viewing application having the function of the screen generation unit 37 from the information processing system 50 or any other server at the time of entry into the virtual room and implement the function of the screen generation unit 37. The viewing application of the communication terminal 30 may be implemented by a web browser.

The storing/reading unit 39 is mainly implemented in accordance with instructions from the CPU 301. The storing/reading unit 39 is a function of storing various data in the storage unit 3000 or reading various data from the storage unit 3000. The storage unit 3000 includes an image management information storage unit 3001. The image management information storage unit 3001 will be described in the description of the information processing system 50.

Functional Configuration of Information Processing System

Next, the functional configuration of the information processing system 50 will be described. The information processing system 50 includes a communication unit 51, a screen generation unit 52, an association processing unit 53, an image distribution unit 54, an authentication unit 55, a communication group management unit 56, a communication control unit 57, a connection management unit 58, a storing/reading unit 59, and an API management unit 60. Each of these units is a function or means that is implemented by any one of the hardware elements illustrated in FIG. 4 operating in accordance with instructions from the CPU 501 according to the program loaded onto the RAM 503. The information processing system 50 further includes a storage unit 5000. The storage unit 5000 is implemented by the ROM 502, the HDD 504, or the recording medium 515 illustrated in FIG. 4.

The communication unit 51 is mainly implemented by the network I/F 509 operating in accordance with instructions from the CPU 501. The communication unit 51 is a function of transmitting or receiving various data or information to or from any other device via the communication network N.

The screen generation unit 52 is mainly implemented in accordance with instructions from the CPU 501. The screen generation unit 52 generates screen information to be displayed on the communication terminal 30. The screen information is created by Hypertext Markup Language (HTML), Extensible Markup Language (XML), Cascade Style Sheet (CSS), JavaScript® (registered trademark), or any other language for a web application to be executed by the communication terminal 30. For a native application to be executed by the communication terminal 30, the screen information is held by the communication terminal 30, and the information to be displayed is transmitted in XML or the like. The screen generation unit 52 generates screen information in which a wide-view image or the like to be distributed by the image distribution unit 54 through the communication unit 51 is arranged.

The association processing unit 53 is mainly implemented in accordance with instructions from the CPU 501. The association processing unit 53 performs control related to association and sharing of the point-of-view information of the wide-view image. In response to receipt of point-of-view information and an image capturing request from the communication terminal 30, the association processing unit 53 performs a process of associating the point-of-view information with a wide-view image acquired from the image capturing apparatus 10 in response to an image capturing request. The wide-view image and point-of-view information, which are associated with each other, are stored in an image management information storage unit 5001 by the storing/reading unit 59. Further, the association processing unit 53 transmits storage location information (e.g., URLs) to the communication terminal 30 as information indicating storage locations where the associated wide-view image and point-of-view information are to be stored. In an example, the information processing system 50 does not simultaneously receive the point-of-view information and the image capturing request from the communication terminal 30. The information processing system 50 separately receives the point-of-view information and the image capturing request and performs association processing. The URL is an example of storage location information indicating a storage location. The storage location information may be in any other format such as a uniform resource identifier (URI).

The image distribution unit 54 is mainly implemented in accordance with instructions from the CPU 501. The image distribution unit 54 distributes, to the communication terminal 30 operated by a user who is in the virtual room, an image such as a wide-view image transmitted from the image capturing apparatus 10 associated with the same virtual room, through the communication unit 51. An image having a normal angle of view captured by a camera included in the communication terminal 30 or the camera 8 or 9 connected to the communication terminal 30 is also distributed in a similar manner. The image to be distributed includes streaming video, a moving image, and a still image.

The authentication unit 55 is mainly implemented in accordance with instructions from the CPU 501. The authentication unit 55 is a function of authenticating a request source in response to an authentication request received by the communication unit 51. For example, the authentication unit 55 determines whether authentication information (a user ID and a password) included in the authentication request received by the communication unit 51 matches authentication information held in advance to perform user authentication. The authentication information may be the card number of an integrated circuit (IC) card, biometric authentication information such as a face, a fingerprint, or a voiceprint, a device ID, a passcode, an access token, a security key, or a ticket. The authentication unit 55 may perform authentication using an external authentication system or an authentication method such as Open Authorization (Oauth). The authentication unit 55 may authenticate a device such as an image capturing apparatus, instead of a user.

The communication group management unit 56 is mainly implemented in accordance with instructions from the CPU 501. The communication group management unit 56 manages the entry of the communication terminal 30 or the user into the virtual room, association between the virtual room and a device, and the like. Upon successful authentication of the user by the authentication unit 55, the communication group management unit 56 registers the user ID and the Internet protocol (IP) address of the communication terminal 30 in a virtual room information storage unit 5002 or associates the image capturing apparatus 10 with the virtual room.

The communication control unit 57 is mainly implemented in accordance with instructions from the CPU 501. The communication control unit 57 manages the start, establishment, and end of communication with the image capturing apparatus 10 associated with each virtual room. The communication control unit 57 also manages the start, establishment, and end of communication for distributing a wide-view image or audio in response to the communication terminal 30 entering or leaving the virtual room.

The connection management unit 58 is mainly implemented in accordance with instructions from the CPU 501. The connection management unit 58 manages communication (connection) established with the information processing system 50 by the communication terminal 30 and the image capturing apparatus 10 in association with the virtual room.

The API management unit 60 is mainly implemented in accordance with instructions from the CPU 501. The API management unit 60 manages an API to be used by a platform contractor to provide an image distribution service of a wide-view image. In the use of the API, the platform contractor develops software for calling the API. The software to be developed may operate on a server or may operate on a client such as a communication terminal. Any of the functions of the information processing system 50, such as the image distribution unit 54, the association processing unit 53, and the communication control unit 57, can be provided as an API. Any function added to the information processing system 50 later may be provided as an API. To determine whether to provide a function as an API, a communication terminal operated by the platform provider accesses the information processing system 50 and accepts the public settings of the API. As a result, the API management unit 60 can control the API based on the public settings. The API management unit 60 may perform an authentication process for checking whether software operating on a request source that makes a request to call the API is software developed by an authorized platform contractor. The authentication process can be performed by comparing information registered and stored in advance in the storage unit 5000 as information on the platform contractor with information transmitted from the software operating on the request source.

In a specific example of the authentication process, the information processing system 50 receives, from the software operating on the request source, an application ID issued to the software developed by the platform contractor in advance by the API management unit 60. If the API management unit 60 determines that the application ID matches an application ID stored in the storage unit 5000, the API management unit 60 performs control to give permission to provide an API since the software developed by the platform contractor is determined as being valid. If the software developed by the platform contractor is not determined as being valid, the API management unit 60 performs control not to give permission to provide an API.

The application ID is an example of authentication information for determining validity. The API management unit 60 may use authentication information issued in advance by the API management unit 60 of the information processing system 50 or by an external system to check the validity of the request source. Examples of such authentication information include an access token, a ticket, a security key, a password, and a personal identification (PIN) code. In this embodiment, while the use of a function of the information processing system 50 as an API is not described, the same process flow is performed, except that software such as an application developed by a platform contractor uses a function of the information processing system 50 through a determination made by the API management unit 60.

The storing/reading unit 59 is mainly implemented in accordance with instructions from the CPU 501. The storing/reading unit 59 is a function of storing various data in the storage unit 5000 or reading various data from the storage unit 5000.

Image Management Information Storage Unit 5001

The storage unit 5000 includes the image management information storage unit 5001. FIG. 14A is a table illustrating image management information stored in the image management information storage unit 5001. The image management information storage unit 5001 stores image management information as illustrated in FIG. 14A. The image management information is information for managing wide-view images captured in response to image capturing requests. In response to a user transmitting an image capturing request from the communication terminal 30, image management information for one record is generated. The items contained in the image management information will be described.

The item "data ID of wide-view image" is identification information that identifies data of a wide-view image. The information processing system 50 numbers each data ID. ID is an abbreviation for identification and means an identifier or identification information. ID is any one or a combination of two or more of a name, a symbol, a character string, and a numerical value that are used for uniquely identifying a specific object from among a plurality of objects. Each data ID may be associated with a wide-view image or an image captured at a normal angle of view by the image capturing apparatus 10 associated with the virtual room.

The item "data name" is the name of the wide-view image set by the user of the communication terminal 30. Each data name may be set by the user or automatically.

The item "imaging start date and time information" is information that specifies the date and time of starting capturing an image such as a wide-view image. Examples of the imaging start date and time include the date and time when the user input an image capturing request to the communication terminal 30, and the date and time when the image capturing apparatus 10 captured an image such as a wide-view image. The imaging start date and time information may be time stamp information of a captured image such as a wide-view image.

The item "imaging operator information" is identification information (including a user ID and a user name) of a user (imaging operator) who has input an image capturing request to the communication terminal 30. Since a user inputs an image capturing request to the communication terminal 30 after entering the virtual room, a user registered in the imaging operator information is identified by authentication to the information processing system 50 or the virtual room. The imaging operator information is transmitted to the information processing system 50 together with an image capturing request. In an example, an image capturing request and imaging operator information are not transmitted to the information processing system 50 at the same time, and are transmitted to the information processing system 50 at different timings.

The item "image capturing apparatus information" is identification information (image capturing apparatus ID) of the image capturing apparatus 10 that has captured the wide-view image. The information processing system 50 numbers each image capturing apparatus ID and shares the image capturing apparatus ID with the image capturing apparatus 10. The image capturing apparatus ID may be information unique to the image capturing apparatus 10, such as a media access control (MAC) address or a serial number. The image capturing apparatus ID is transmitted to the information processing system 50 together with the associated wide-view image. In an example, the image capturing apparatus ID and the associated wide-view image are not transmitted to the information processing system 50 at the same time, and are transmitted to the information processing system 50 at different timings.

The item "imaging-time virtual room ID" is identification information of a virtual room associated with the image capturing apparatus 10.

The item "data storage location information of wide-view image" is information indicating a location where the wide-view image is stored. The data storage location information is represented by a URL, a file path, or the like. In an example, the storage location identified by the storage location information may be information indicating a predetermined folder. The folder may be a folder associated with a virtual room at an imaging time. The folder may be a folder associated with identification information (additional information such as a name) indicating any one or a combination of two or more of categories such as the imaging date and time, the image capturing apparatus, the imaging operator, and the imaging-time virtual room ID. In another example, the data storage location information may be used in combination with information such as a data ID and a data name to identify a data storage location.

The item "participant ID" is an example of user identification information for identifying a user who has participated in the virtual room identified by the virtual room ID at an imaging time.

FIG. 14B is a table illustrating image management information as a modification of the image management information illustrated in FIG. 14A. In FIG. 14B, wide-view images having the same imaging-time virtual room ID are stored. In this manner, image management information may be classified in units of virtual rooms.

Virtual Room Information Storage Unit 5002

The storage unit 5000 includes the virtual room information storage unit 5002. FIG. 15A is a table illustrating virtual room information stored in the virtual room information storage unit 5002. The virtual room information storage unit 5002 stores virtual room information as illustrated in FIG. 15A. The virtual room information is information related to a virtual room. The virtual room information is held for each virtual room. The items contained in the virtual room information will be described. In an example, the virtual room is registered in a tenant. In another example, the virtual room is not registered in a tenant, and information on a temporarily created virtual room or a virtual room to be shared for use is also stored in the virtual room information storage unit 5002.

The item "virtual room ID" is identification information that identifies the virtual room. In this embodiment, each virtual room can be created by a user as appropriate.

The item "virtual room name" is a name for the user to identify the virtual room. Each virtual room name can be set by a user as appropriate. The virtual room ID and the virtual room name may be the same information.

The item "device information" is identification information (device ID) of a device including the image capturing apparatus 10 associated with the virtual room.

The item "user in virtual room" is the user ID of a user who has entered and is currently in the virtual room. The user is a user authorized to view an image such as a wide-view image distributed to persons present in the virtual room. The method for entering a virtual room will be described below. The user ID may be associated with the Internet Protocol (IP) address of the communication terminal 30 operated by the user. The user ID may be stored in association with a user name.

Tenant Information Storage Unit 5003

The storage unit 5000 includes a tenant information storage unit 5003. FIG. 15B is a table illustrating tenant information stored in the tenant information storage unit 5003. The tenant information storage unit 5003 stores tenant information as illustrated in FIG. 15B. The tenant information is information related to a tenant (user group). The tenant information is held for each tenant. The items contained in the tenant information will be described. The tenant information includes various kinds of information other than that illustrated in FIG. 15B, such as user information. FIG. 15B illustrates part of the tenant information.

The item "tenant ID" is identification information that identifies the tenant.

The item "tenant name" is a name for the user to identify the tenant. The tenant ID and the tenant name may be the same information.

The item "tenant-registered virtual room ID" is identification information of a virtual room registered in the tenant.

The item "tenant-registered device" is information related to a device registered in the tenant.

The tenant information storage unit, the tenant ID, the tenant name, the tenant-registered virtual room ID, and the tenant-registered device may also be referred to as a user group information storage unit, a user group ID, a user group name, a user-group-registered virtual room ID, and a user-group-registered device, respectively.

Point-of-View Related Information Storage Unit 5004

The storage unit 5000 includes a point-of-view related information storage unit 5004. FIG. 16 is a table illustrating an example of point-of-view related information stored in the point-of-view related information storage unit 5004. The point-of-view related information is associated with a data ID of a wide-view image, a participant ID, viewing start date and time information, and storage location information of point-of-view information. The data ID of the wide-view image and the participant ID have the same meaning as that of the corresponding items of the image management information illustrated in FIG. 14A or 14B.

The item "viewing start date and time information" indicates the date and time when a new predetermined-area image was started to be viewed in response to a change of a default (initially set) predetermined-area image viewed at each site in the wide-view image distributed at the recording time. In an example, information indicating the elapsed time for playback of one moving image may be used in place of the viewing start date and time.

The item "storage location information of point-of-view information" is information indicating a location where point-of-view information for specifying a predetermined area viewed at the date and time indicated by the viewing start date and time information of the same record is stored. The storage location information is represented by a URL, a file path, or the like.

The point-of-view related information illustrated in FIG. 16 makes it possible to leave a record indicating, for a predetermined wide-view image, when and at which site the communication terminal 30 (user) changed a desired predetermined-area image (i.e., the default predetermined-area image) to a desired predetermined-area image and displayed (viewed) the desired predetermined wide-view image.

Entry of Communication Terminal into Virtual Room

Next, a process in which the user b enters the virtual room will be described with reference to FIGS. 17A, 17B, and 18. In the illustrated example, the image capturing apparatus 10 has already been associated with a virtual room, and the communication terminal 30A has transmitted a wide-view image and an image having a normal angle of view to the information processing system 50. The association of the image capturing apparatus 10 with the virtual room and the like will be described with reference to FIG. 19 and the subsequent figures. In the following description, no distinction is made between the entry of the user b into the virtual room and the entry of the communication terminal 30B, which is operated by the user b, into the virtual room.

FIGS. 17A and 17B illustrate examples of a screen displayed on the communication terminal 30B when the user b is to enter the virtual room. FIG. 17A illustrates an example of a room entry screen 200. Prior to the display of the room entry screen 200, the user b logs into the information processing system 50. Upon the login of the user b, the tenant to which the user b belongs is identified. Virtual rooms are associated with the tenant. A list of virtual rooms associated with the tenant is displayed on the communication terminal 30B (see FIG. 22), and the user b selects a virtual room that the user b is to enter from the list. FIG. 17A illustrates the room entry screen 200 for the virtual room selected by the user b. A temporarily created virtual room or a shared virtual room, which is not associated with the tenant, may be displayed on the screen illustrated in FIG. 17A.

Alternatively, the creator of the virtual room may request the information processing system 50 to issue a URL corresponding to the virtual room, and the URL may be transmitted to the user b via email or any other suitable means. In response to the user b clicking on the URL displayed on the communication terminal 30B, the communication terminal 30B displays the room entry screen 200 illustrated in FIG. 17A.

The room entry screen 200 includes a virtual room name 201, a participant name input field 202, and a room entry button 203. The virtual room name 201 is the same as that stored in the virtual room information storage unit 5002. The participant name input field 202 is a field for entering a user name to be displayed in the virtual room. The user name may be a name such as a nickname of the user b. Upon the login of the user b, a user name associated with the user ID of the user b may be identified. The identified user name may be automatically displayed. The room entry button 203 is a button for the user b to send a request to enter the virtual room.

At the time of entry into the virtual room, authentication for entering the virtual room may be requested separately from the login to the tenant.

FIG. 17B illustrates an image viewing screen 210 displayed on the communication terminal 30B upon the user b entering the virtual room. The image viewing screen 210 illustrated in FIG. 17B indicates that the image capturing apparatus 10 has already started distributing a wide-view image via the information processing system 50 and that the communication terminal 30A has already started distributing an image having a normal angle of view. The image viewing screen 210 includes a first image field 211 and a second image field 212. The first image field 211 displays the wide-view image, and the second image field 212 displays the image having a normal angle of view. In an example, images are transmitted from three or more sites. The image viewing screen 210 is divided into a number of portions corresponding to the number of sites from which images are transmitted.

The first image field 211 displays a wide-view image mark 213. The wide-view image mark 213 is set by the screen generation unit 52 of the information processing system 50 upon determination that the image to be displayed in the first image field 211 is a wide-view image. The determination may be made by the communication terminal 30B, and the communication terminal 30B may display the wide-view image mark 213. The wide-view image mark 213 allows the user b to know that a wide-view image for which the point of view can be changed has been distributed. The first image field 211 also displays a device name 214. The device name 214 is transmitted from the image capturing apparatus 10 together with the wide-view image. The device name 214 is information set by the user a or the like (see FIGS. 20A and 20B), as described below.

The second image field 212 displays a participant name 215. The participant name 215 is a user name. The participant name of a user who has already entered the virtual room is displayed in the participant name input field 202. In the illustrated example, since the user a has already entered the virtual room, "AAA", which is entered by the user a in the participant name input field 202, is displayed in the participant name input field 202.

Figure 18:
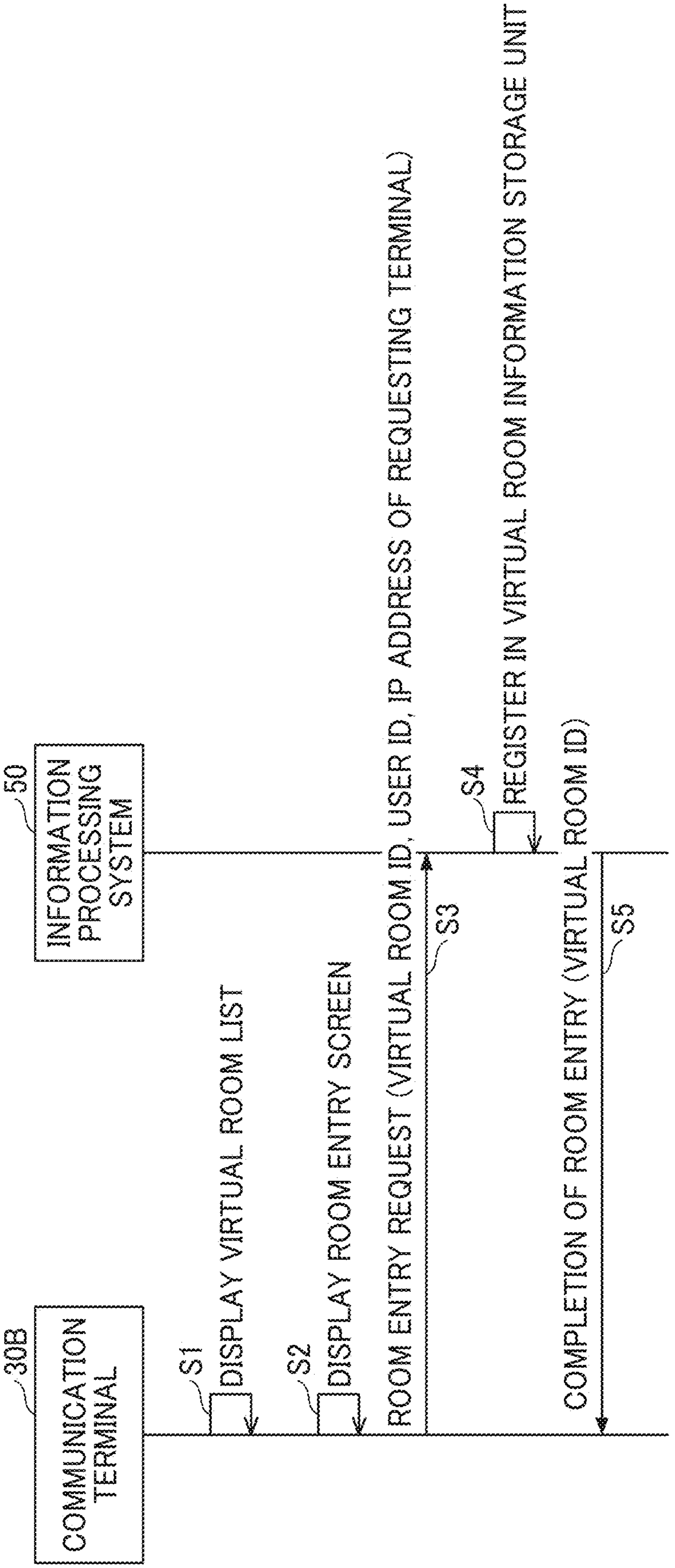
FIG. 18 is a sequence diagram illustrating an example process in which the user (or the communication terminal) enters the virtual room.

FIG. 18 is a sequence diagram illustrating a process in which the user b (or the communication terminal 30B) enters the virtual room.

S1: First, the user b at the site B performs an operation of displaying a virtual room list screen. The communication terminal 30B accesses the information processing system 50 in advance in response to an operation performed by the user b, and receives, from the information processing system 50, information on the virtual rooms stored in the virtual room information storage unit 5002 to display a virtual room list screen. At this time, the communication terminal 30B may transmit authentication information used for login or the like to the information processing system 50 and may be authenticated by the authentication unit 55 of the information processing system 50. The authentication information may be authentication information associated with the user b or authentication information associated with the communication terminal 30B. The virtual rooms displayed in the virtual room list screen may be virtual rooms registered in the tenant associated with the user b or virtual rooms registered in the tenant associated with the communication terminal 30B. In response to the acceptance unit 32 accepting the operation of displaying the virtual room list screen, the display control unit 33 of the communication terminal 30B causes the display 306 to display a selection screen.

S2: In response to the user b selecting a selection button for one of the virtual rooms, the acceptance unit 32 of the communication terminal 30B accepts the selection of the virtual room. The display control unit 33 of the communication terminal 30B causes the display 306 to display the room entry screen 200 illustrated in FIG. 17A.

S3: The user b completes the items and then presses the room entry button 203. In response to the acceptance unit 32 accepting the pressing of the room entry button 203, the communication unit 31 of the communication terminal 30B transmits a request to the information processing system 50 to enter the virtual room. The request for entering the virtual room includes information such as a virtual room ID indicating the virtual room selected in step S2, the user ID of the user b authenticated by login or the like, and the IP address of the communication terminal 30B from which the request is transmitted. Then, the communication unit 51 of the information processing system 50 receives the request for entering the virtual room.

S4: The communication group management unit 56 registers the IP address and the user ID authenticated by login or the like in the virtual room information identified by the virtual room ID in the virtual room information storage unit 5002.

S5: The communication unit 51 of the information processing system 50 transmits, to the communication terminal 30B, a response indicating that the communication terminal 30B has already entered the virtual room. Then, the communication unit 31 of the communication terminal 30B receives the response indicating that the communication terminal 30B has already entered the virtual room. After step S5, the display control unit 33 of the communication terminal 30B receives information on a screen generated by the screen generation unit 52 of the information processing system 50 and information on the image distributed by the image distribution unit 54, and causes the image viewing screen 210 illustrated in FIG. 17B to be displayed based on the received information.

Association of Image Capturing Apparatus with Room

Next, an association of the image capturing apparatus 10 with a virtual room will be described with reference to FIGS. 19 to 26. In an example, the user a at the site A associates the image capturing apparatus 10 with a virtual room. In another example, a system administrator, a tenant administrator, or the like associates the image capturing apparatus 10 with a virtual room.

Figure 19:
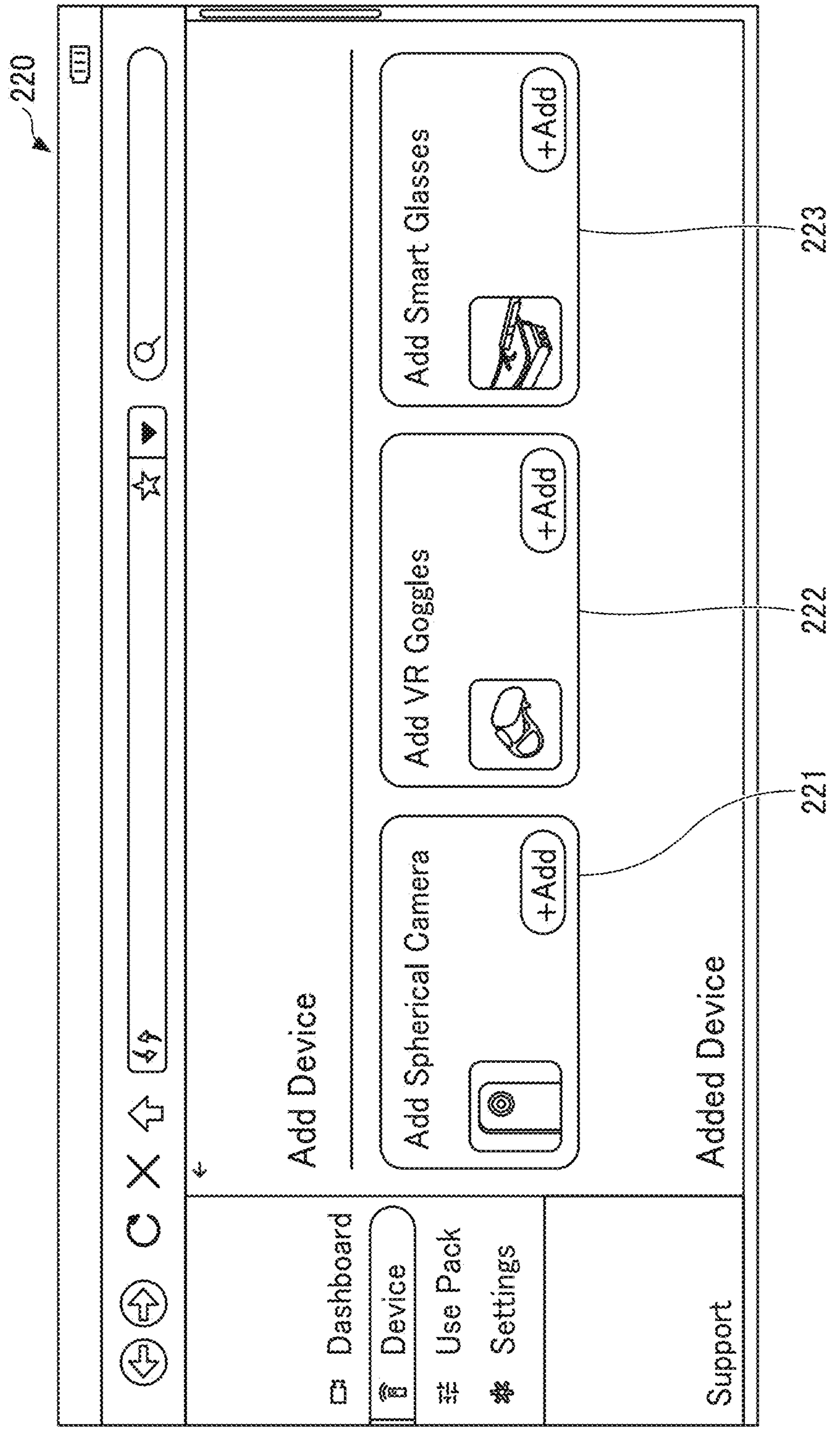
FIG. 19 is a view illustrating an example of a device registration screen displayed on the communication terminal.

FIG. 19 illustrates an example of a device registration screen 220 displayed on the communication terminal 30A. The user a has been authenticated by the information processing system 50 by login or the like. Upon the login of the user a, the tenant to which the user a belongs is identified. The user a requests the information processing system 50 to display the device registration screen 220. The communication terminal 30A displays the device registration screen 220 received from the information processing system 50. First, a device is registered in the tenant on the device registration screen 220.

The device registration screen 220 includes an image capturing apparatus registration button 221, a VR goggles registration button 222, and a smart glasses registration button 223. Buttons are provided for the respective types of devices because the devices are different in the presence or absence of a camera, information used for registration, or the like. Since devices are registered on a per-type basis, the information processing system 50 can also grasp the types of the devices.

The image capturing apparatus registration button 221 is a button for the user a to register the image capturing apparatus 10. The VR goggles registration button 222 is a button for the user a to register the VR goggles 89. The smart glasses registration button 223 is a button for the user a to register the smart glasses 88.

Figure 20A:
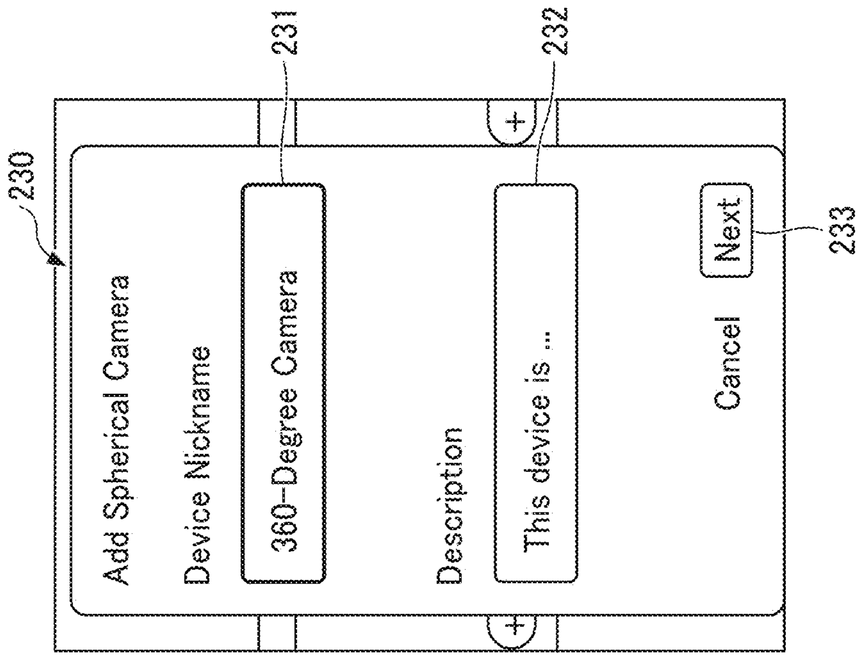
FIG. 20A is a view illustrating an example of an image capturing apparatus registration dialog.
Figure 20B:
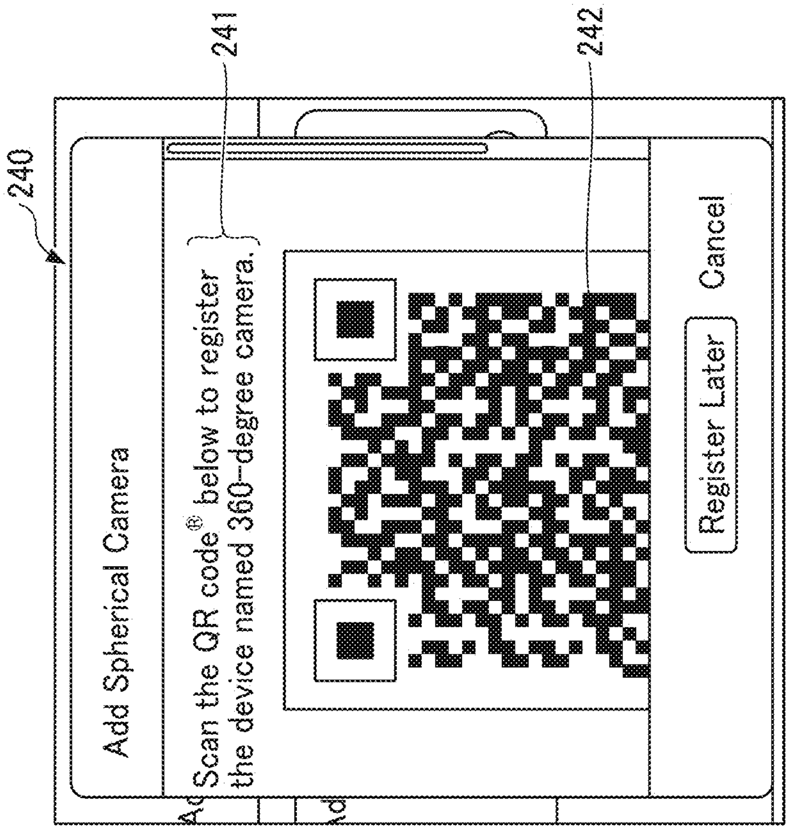
FIG. 20B is a view illustrating an example of a two-dimensional code screen.

FIGS. 20A and 20B illustrate an example of screens displayed in response to the pressing of the image capturing apparatus registration button 221. FIG. 20A illustrates an image capturing apparatus registration dialog 230. The image capturing apparatus registration dialog 230 includes a name field 231 for the image capturing apparatus 10, a description field 232 for the image capturing apparatus 10, and a next button 233. The user a sets any name in the name field 231 for the image capturing apparatus 10 and sets a description in the description field 232 for the image capturing apparatus 10 such that the image capturing apparatus 10 to be registered can be identified.

In response to the user a pressing the next button 233, the communication terminal 30A requests a two-dimensional code from the information processing system 50. The communication terminal 30A displays the two-dimensional code.

FIG. 20B illustrates an example of a two-dimensional code screen 240 displayed on the communication terminal 30A. The two-dimensional code screen 240 includes a message 241 and a two-dimensional code 242. The message 241 indicates "Scan the two-dimensional code below to register the device named xxx (xxx is the name entered in the name field 231)". The user a captures an image of the two-dimensional code 242 with the image capturing apparatus 10 to be registered. The two-dimensional code 242 includes a URL to which the image capturing apparatus 10 connects to register the image capturing apparatus 10, and authentication information used for registration, such as a temporary ID and a password.

In response to the user a capturing the two-dimensional code 242 with the image capturing apparatus 10, the image capturing apparatus 10 connects to the URL and is authenticated using the temporary ID and the password. If the authentication is successful, the temporary ID is replaced with a formal image capturing apparatus ID, and the name, the description, and the image capturing apparatus ID of the image capturing apparatus 10 are registered in the tenant. The image capturing apparatus 10 also holds the image capturing apparatus ID, the name, and the description. The image capturing apparatus 10 registered in the tenant is associated with the virtual room in response to an operation performed by the user a described below. The two-dimensional code 242 is an example of code information and has embedded therein similar authentication information. In another example, the two-dimensional code 242 is any other form of code such as a barcode.

Figure 21:
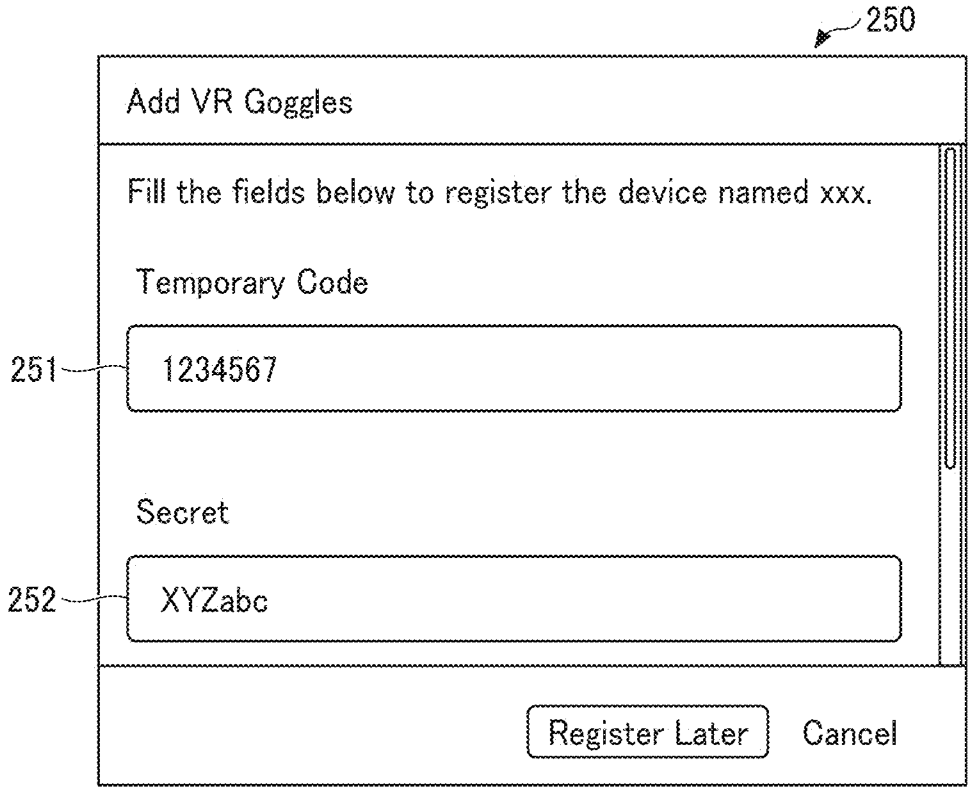
FIG. 21 is a view illustrating an example of a virtual reality (VR) goggles registration screen displayed in response to the pressing of a VR goggles registration button.

Next, an example method for registering a communication terminal such as the VR goggles 89 or the smart glasses 88 in a tenant will be described with reference to FIG. 21. FIG. 21 illustrates an example of a VR goggles registration screen 250 displayed in response to the pressing of the VR goggles registration button 222. The VR goggles registration screen 250 includes a temporary code input field 251 and a secret input field 252.

Without a camera, it is difficult for the VR goggles 89 to capture an image of a two-dimensional code. A temporary code (temporary ID) and a secret (password) may be output from (displayed on) the VR goggles 89, and the user a may enter the temporary code and the secret to the temporary code input field 251 and the secret input field 252, respectively. The communication terminal 30A transmits the temporary code and the secret to the information processing system 50 to register the VR goggles 89 in the tenant. The VR goggles 89 connect to the information processing system 50 and transmit the temporary code and the secret. As a result, the VR goggles 89 are authenticated by the information processing system 50. If the authentication is successful, the temporary code is replaced with a formal VR goggles ID, and the VR goggles ID is registered in the tenant. The VR goggles 89 also hold the VR goggles ID. The VR goggles 89 registered in the tenant are associated with a virtual room in response to an operation performed by the user a described below. The smart glasses 88 can also be registered by the user a in a manner similar to that for the image capturing apparatus 10 or the VR goggles 89, which will be described in detail. The temporary code and the secret are an example of authentication information. Other information may be used as authentication information. The image capturing apparatus ID, the VR goggles ID, and the smart glasses ID are each an example of a device ID and may also be referred to as device IDs. A device other than the image capturing apparatus 10, VR goggles, and smart glasses may be registered by using a device ID for associating the device with a virtual room or a tenant in a similar procedure. The device ID may be identification information associated with the owner of the device.

Figure 22:
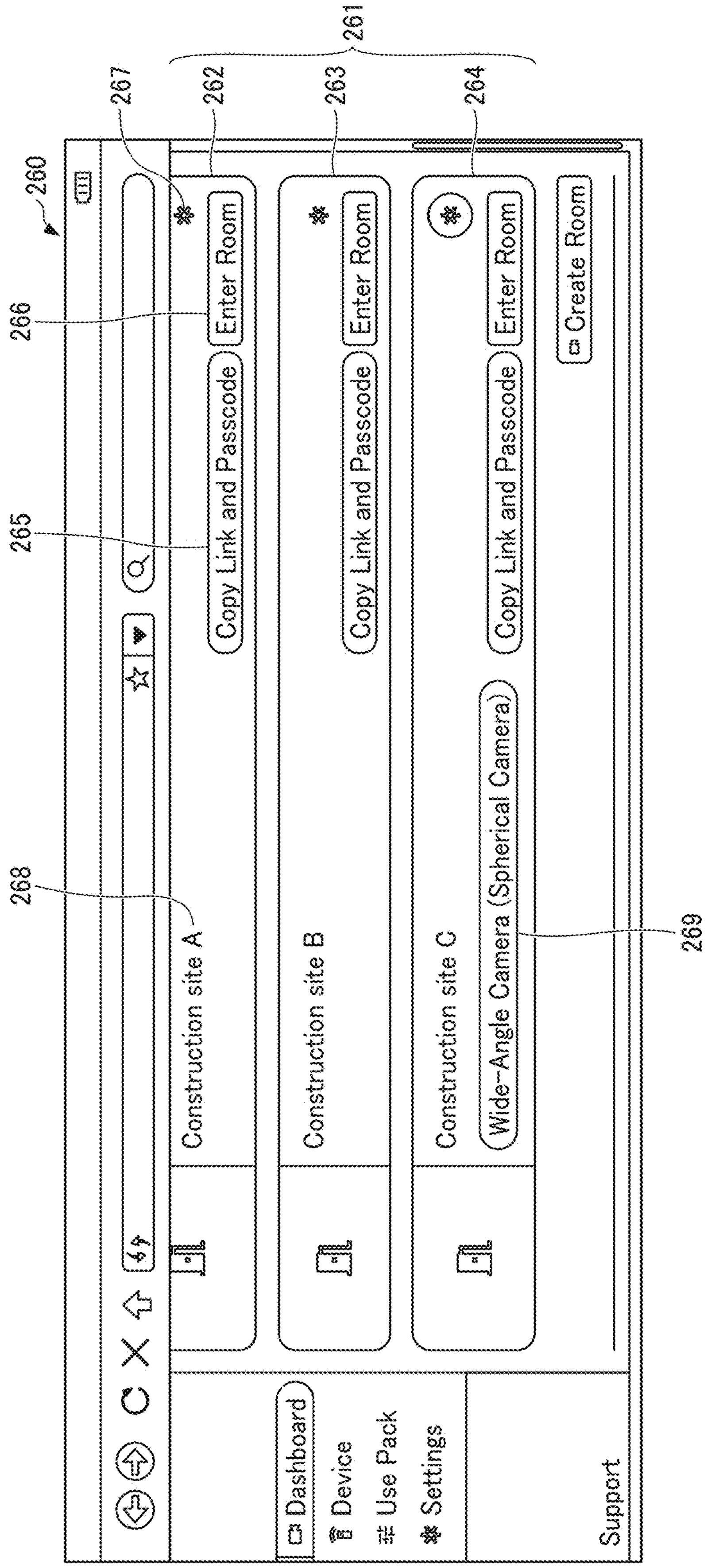
FIG. 22 is a view illustrating an example of a first virtual room association screen for associating an image capturing apparatus with a virtual room.

FIG. 22 illustrates an example of a first virtual room association screen 260 for associating the image capturing apparatus 10 with a virtual room. The same screen configuration may be used for the VR goggles 89 and the smart glasses 88. The first virtual room association screen 260 includes a virtual room list 261. The virtual room list 261 displays individual virtual room fields 262 to 264, based on virtual rooms created in the tenant. Each of the individual virtual room fields 262 to 264 includes a link issuance button 265, a room entry button 266, a settings button 267, and a virtual room name 268. The link issuance button 265 is a button for issuing a link (a URL for invitation) to the corresponding virtual room and a passcode. The room entry button 266 is a button for the user a to enter the virtual room. The settings button 267 is a button for associating the image capturing apparatus 10 with the virtual room. The virtual room name 268 is the same as that stored in the virtual room information storage unit 5002. The user a presses the settings button 267. In response to the pressing of the settings button 267, the communication terminal 30A displays a second virtual room association screen 270.

If a device has already been associated with the virtual room, a name 269 of the device is displayed in the individual virtual room field (in FIG. 22, the individual virtual room field 264).

Figure 23:
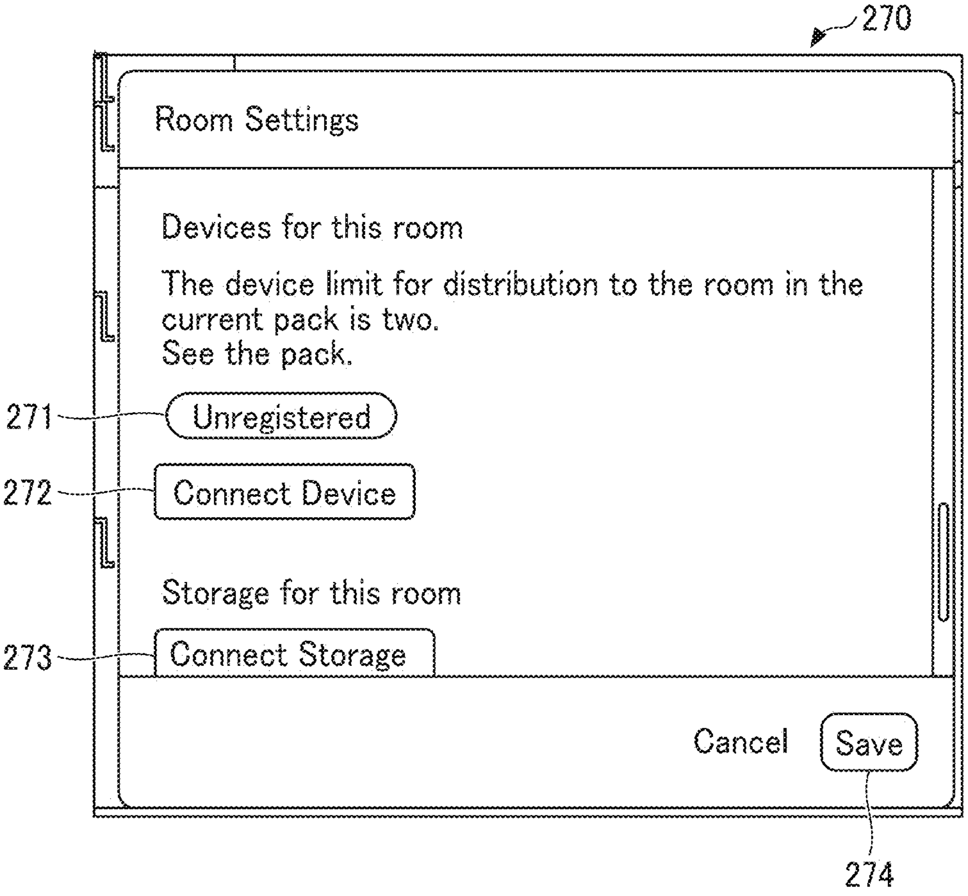
FIG. 23 is a view illustrating an example of a second virtual room association screen.

FIG. 23 illustrates an example of the second virtual room association screen 270. The second virtual room association screen 270 is displayed as a pop-up on the first virtual room association screen 260. In an example, the screen transition from the first virtual room association screen 260 to the second virtual room association screen 270 is not made through the information processing system 50. In another example, the screen transition from the first virtual room association screen 260 to the second virtual room association screen 270 is made through the information processing system 50.

The second virtual room association screen 270 includes a name 271 of the image capturing apparatus 10 that is currently (or has already been) associated with the virtual room, a connection button 272, and a storage button 273. In FIG. 23, the name 271 is set unregistered because the image capturing apparatus 10 is not registered yet. The connection button 272 is a button for displaying a list of devices registered in the tenant as candidates to be associated with the virtual room to associate a device with the virtual room. The storage button 273 is a button for displaying a list of storages 90 to store an image having a normal angle of view or a wide-view image captured by the image capturing apparatus 10 associated with the virtual room. Examples of the list of storages 90 may include a list of storages 90 to be associated with the virtual room and a list of specific storage locations such as folders in the storages 90. The user a selects a predetermined storage 90 or a specific storage location such as a folder in the storage 90 to associate the storage 90 with the virtual room. Information on the storage 90 associated with the virtual room in the way described above can be stored in the virtual room information storage unit 5002 in association with the virtual room ID. Examples of the information on the storage 90 include address information for accessing the storage 90 and a storage location such as a folder in the storage 90. In response to the pressing of the connection button 272, the communication terminal 30A displays a third virtual room association screen.

The communication terminal 30A transmits a virtual room ID to the information processing system 50 and acquires the name (or ID) of a device registered in the tenant for which the virtual room is generated and the name (or ID) of a device associated with the virtual room.

Figure 24:
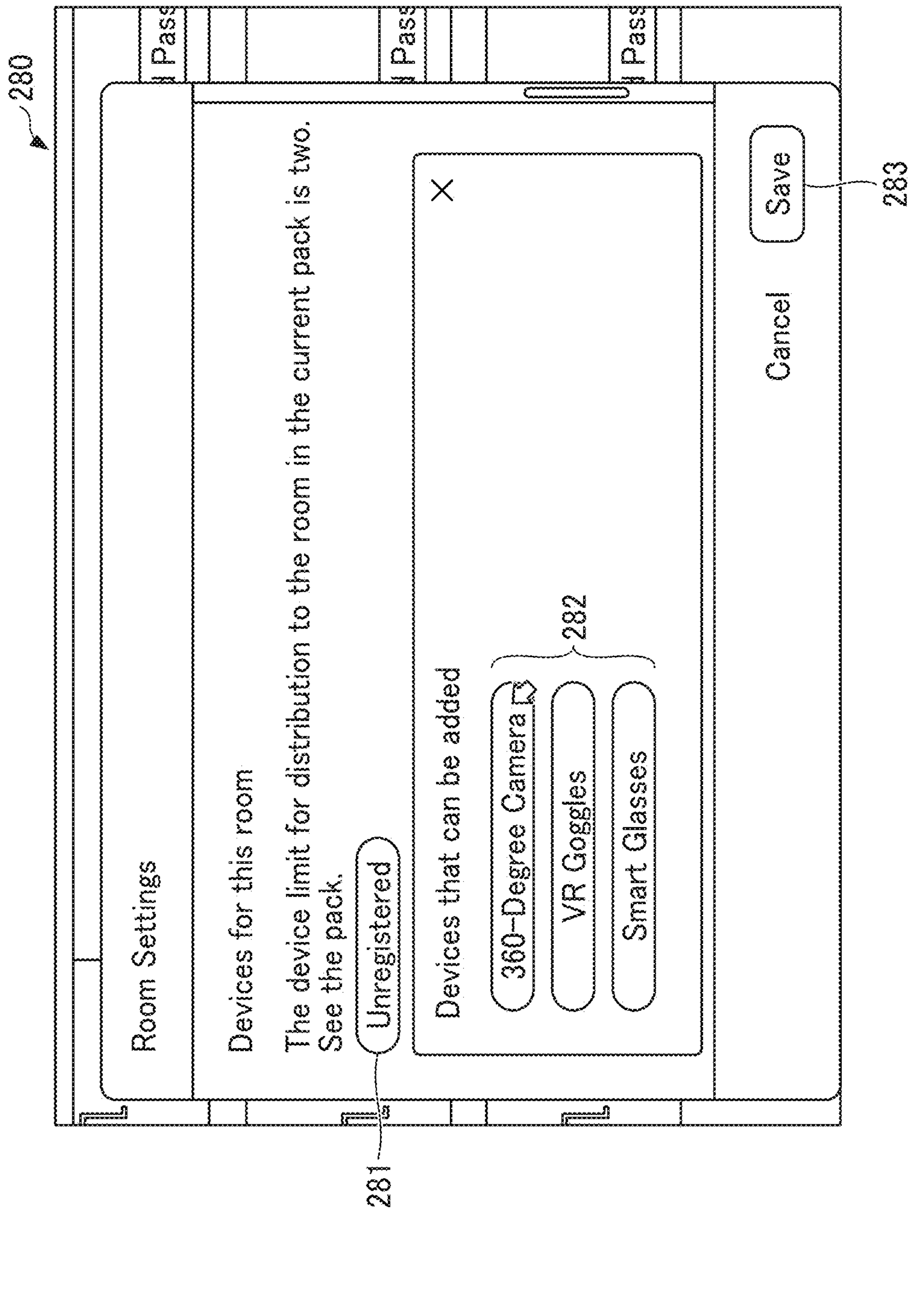
FIG. 24 is a view illustrating an example of a third virtual room association screen.

FIG. 24 illustrates an example of a third virtual room association screen 280. The third virtual room association screen 280 includes a name 281 of the image capturing apparatus 10 that is currently (or has already been) associated with the virtual room, a list of devices 282 that can be added, and a save button 283. The user a selects a device to be additionally associated with the virtual room from the list of devices 282 that can be added and then presses the save button 283. As a result, the selected device is associated with the virtual room. That is, a device ID such as an image capturing apparatus ID is registered in the virtual room information storage unit 5002. As illustrated in FIG. 24, the number of image capturing apparatuses to be associated with the virtual room may be limited. In an example, the upper limit is two. In this case, the number of image capturing apparatus IDs that have already been registered in the virtual room information storage unit 5002 may be referred to, and the remaining number of devices that can be additionally registered may be displayed on the third virtual room association screen 280.

Process for Starting Transmitting Wide-View Image to Image Capturing Apparatus

In the way described above, a device such as the image capturing apparatus 10 is associated with the virtual room. The user a operates the device to start transmitting an image.

For the VR goggles 89 and the smart glasses 88, the user a operates the device main body to turn on or off the transmission of an image. This is because no application dedicated to the communication system 1*a* is currently operating on the VR goggles 89 or the smart glasses 88. If an application dedicated to the communication system 1*a* operates on the VR goggles 89 and the smart glasses 88, the user a can also remotely turn on or off the transmission of an image.

For the image capturing apparatus 10, when the application is enabled, the user a can turn on or off the transmission of the wide-view image from the menu of the application after entering the virtual room.

Figure 25A:
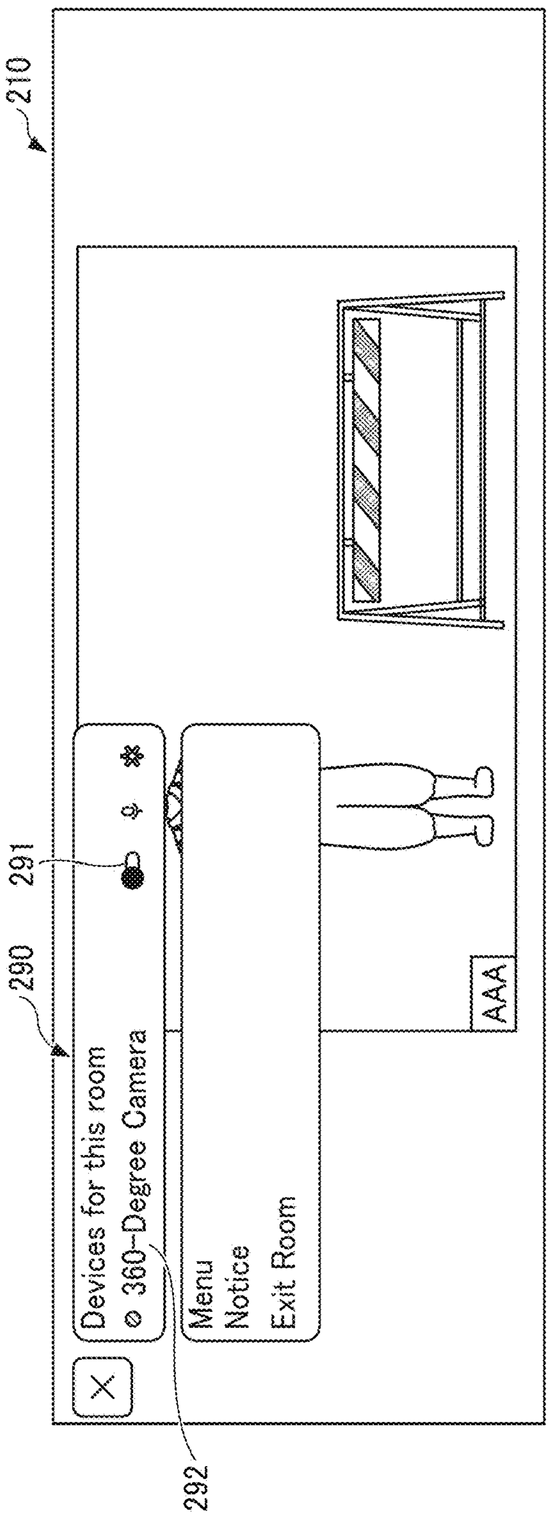
FIGS. 25A and 25B are views illustrating examples of a wide-view image transmission control dialog displayed on the communication terminal.
Figure 25B:
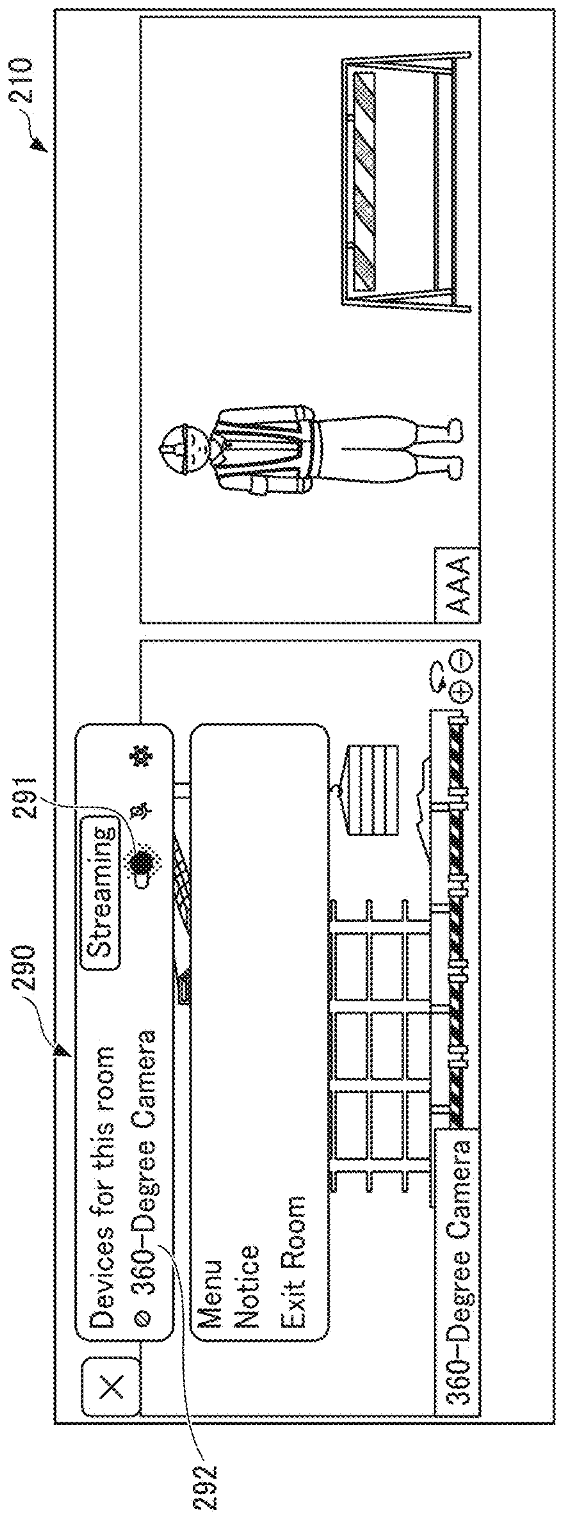

FIGS. 25A and 25B illustrate examples of a wide-view image transmission control dialog 290 displayed on the communication terminal 30A. The wide-view image transmission control dialog 290 is displayed as a pop-up on the image viewing screen 210. In the illustrated example, the user a has operated the communication terminal 30A and entered a virtual room associated with the image capturing apparatus 10. The wide-view image transmission control dialog 290 displays a name 292 of the image capturing apparatus 10 associated with the virtual room. A toggle button 291 is displayed near the name 292. The user a can operate the toggle button 291 to set the transmission of the wide-view image captured by the image capturing apparatus 10 to on (start of transmission) or off (stop of transmission). The setting of on or off using a toggle button is an example. The start or stop of transmission of the wide-view image may be set in accordance with an input of a user operation. In an example, the start or stop of transmission of the wide-view image may be set in response to selection of a radio button or a predetermined icon or in response to a menu operation. In another example, the transmission of the wide-view image is started automatically, without the user's operation, after the image capturing apparatus 10 enters the room. In another example, a predetermined condition such as the date and time, the number of users who have entered the room, or the participation of a specific user is determined in advance, and the transmission of the wide-view image is started in response to a determination that the predetermined condition is satisfied.

The communication terminal 30A transmits transmission control setting information, which is set in response to an operation of the toggle button 291, to the information processing system 50. The information processing system 50 transmits a transmission start request or a transmission stop request corresponding to the transmission control setting information to the image capturing apparatus 10.

FIG. 25A illustrates the "off" setting of the toggle button 291. In FIG. 25A, thus, the wide-view image is not displayed. By contrast, the image having a normal angle of view captured by the camera 9 of the communication terminal 30A is displayed in the image viewing screen 210 in FIG. 25A since the image having a normal angle of view has already been shared at the time of entry of the communication terminal 30A into the virtual room.

FIG. 25B illustrates the "on" setting of the toggle button 291. The information processing system 50 transmits a transmission start request to the image capturing apparatus 10 in response to the toggle button 291 being turned on, and the image capturing apparatus 10 starts transmitting the wide-view image. Since two images are shared in one virtual room, the image viewing screen 210 is divided into two areas. Upon the setting being changed from the "on" setting to the "off" setting, the communication terminal 30A transmits "off" setting information to the information processing system 50. The information processing system 50 transmits a transmission stop request to the image capturing apparatus 10 in response to receipt of the "off" setting information, and the image capturing apparatus 10 stops the transmission of the wide-view image.

Figure 26:
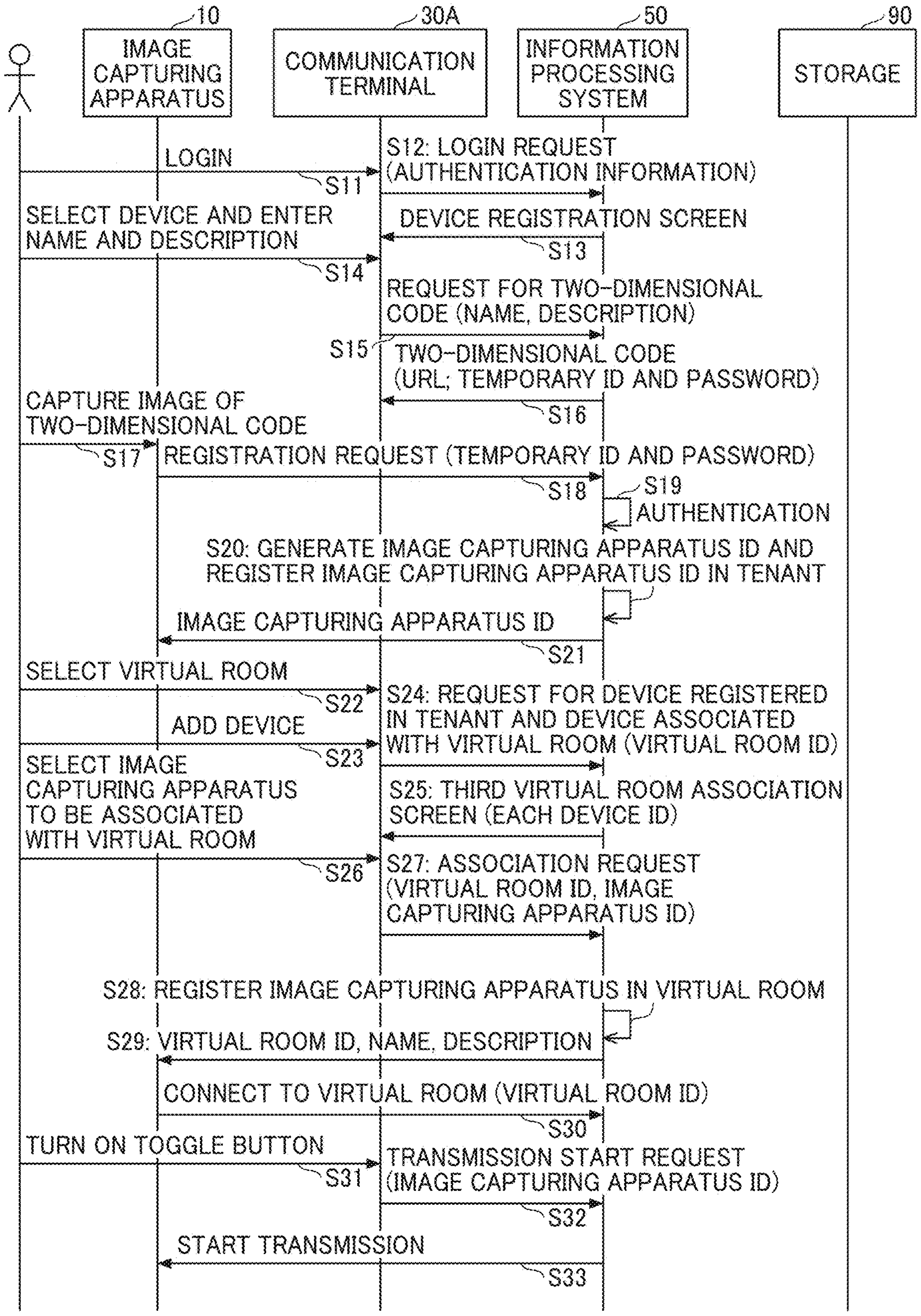
FIG. 26 is a sequence diagram illustrating an example procedure in which the user registers the image capturing apparatus in a virtual room.

As described with reference to FIG. 26, a user who is even on site can perform a simple operation such as capturing an image of code information with the image capturing apparatus 10 to associate the image capturing apparatus 10 with the virtual room. In some cases, a user who is on site does not carry a PC or the like. It is useful that such a user who is on site can perform the association process on-site by using the image capturing apparatus 10 and code information issued in advance. In an example, if the user performs the association process in advance, the user can connect the image capturing apparatus 10 to a predetermined virtual room without selecting the virtual room or performing any additional operation. In addition, the user can give an instruction to start or stop transmission from a remote site. This can reduce the burden on the user who desires to concentrate on work on-site. Accordingly, even in a preparation process, it is possible to provide a system that enables efficient communication between on-site and remote users.

Procedure for Registering Image Capturing Apparatus in Virtual Room

Next, a procedure for registering the image capturing apparatus 10 in the virtual room illustrated in the series of screen transitions in FIGS. 19 to 25B will be described with reference to FIG. 26. FIG. 26 is a sequence diagram illustrating an example procedure in which the user a registers the image capturing apparatus 10 in the virtual room.

S11: First, the user a connects the communication terminal 30A to the information processing system 50 and enters authentication information (such as a user ID and a password) to send a login request. The acceptance unit 32 of the communication terminal 30A accepts the operation.

S12: The communication unit 31 of the communication terminal 30A designates the authentication information and transmits the login request to the information processing system 50. The communication unit 51 of the information processing system 50 receives the login request, and the authentication unit 55 performs authentication based on the designated authentication information. It is assumed that the authentication is successful. At this time, the information processing system 50 refers to the tenant information storage unit 5003 to identify the tenant ID associated with the authenticated user ID.

S13: The screen generation unit 52 of the information processing system 50 generates the device registration screen 220 in response to the user operation, and the communication unit 51 transmits screen information of the device registration screen 220 to the communication terminal 30A.

S14: The communication unit 31 of the communication terminal 30A receives the screen information of the device registration screen 220, and the display control unit 33 displays the device registration screen 220 illustrated in FIG. 19. The user a selects the type of the device (in the illustrated example, the image capturing apparatus 10 (e.g., a spherical camera)). Then, as illustrated in FIG. 20A, the user a enters the name and description of the image capturing apparatus 10. The acceptance unit 32 accepts the entered information.

S15: The communication unit 31 of the communication terminal 30A designates the name and description entered by the user a and transmits a request for code information (e.g., a two-dimensional code) to the information processing system 50.

S16: The communication unit 51 of the information processing system 50 receives the request for code information (e.g., a two-dimensional code). The communication group management unit 56 generates a URL (connection destination for registration) in association with the name and the description, and generates code information (e.g., a two-dimensional code) including the URL, a temporary ID, and a password. The communication unit 51 of the information processing system 50 transmits the code information (e.g., a two-dimensional code) to the communication terminal 30A. The communication unit 31 of the communication terminal 30A receives the code information (e.g., a two-dimensional code). Then, the display control unit 33 displays the code information (e.g., a two-dimensional code), as illustrated in FIG. 20B.

S17: The user a operates the image capturing apparatus 10 to be associated with the virtual room to capture an image of the code information (e.g., a two-dimensional code). The acceptance unit 12 of the image capturing apparatus 10 accepts the operation.

S18: The imaging processing unit 13 of the image capturing apparatus 10 performs an imaging process on an imaging target including the code information (e.g., a two-dimensional code) to generate image data, and the analysis unit 14 analyzes the image data to extract the URL, the temporary ID, and the password. Accordingly, the registration request unit 15 connects to the URL via the connection unit 16, designates the temporary ID and the password, and transmits a request for registering the image capturing apparatus 10 to the information processing system 50. In the registration method using the registration screen illustrated in FIG. 21, an image of the code information is not captured. Thus, the image capturing apparatus 10 is replaced with a communication terminal such as the VR goggles 89 or the smart glasses 88, and the steps S15 to S17 can be omitted.

S19: The communication unit 51 of the information processing system 50 receives the temporary ID and the password, and the authentication unit 55 determines whether the received temporary ID and password match the temporary ID and password associated with the connected URL. It is assumed that a match is found.

S20: Since a request for registering the image capturing apparatus 10 has been made, the communication group management unit 56 of the information processing system 50 generates an image capturing apparatus ID as an example of a device ID and registers the image capturing apparatus ID in the tenant corresponding to the tenant ID identified at the time of the login of the user a. The image capturing apparatus ID is associated with a name and a description. Specifically, the communication group management unit 56 refers to the tenant information storage unit 5003 and additionally registers the image capturing apparatus ID in the tenant-registered device associated with the identified tenant ID. In the illustrated example, the communication group management unit 56 generates and registers an image capturing apparatus ID. In another example, the communication group management unit 56 registers an image capturing apparatus ID received from the image capturing apparatus 10. In the registration of, instead of the image capturing apparatus 10, a communication terminal such as the VR goggles 89 or the smart glasses 88 in the tenant, a device ID corresponding to the communication terminal can be registered in the tenant information storage unit 5003 in a similar procedure.

S21: The communication unit 51 of the information processing system 50 transmits the image capturing apparatus ID to the image capturing apparatus 10. The connection unit 16 of the image capturing apparatus 10 receives the image capturing apparatus ID and stores the image capturing apparatus ID in the storage unit 1000.

S22: The communication terminal 30A is notified of the completion of the registration by the communication unit 51 of the information processing system 50, and the user a can start associating the image capturing apparatus 10 with the virtual room in response to the notification. The user a selects, from the first virtual room association screen 260 displayed on the communication terminal 30A, a virtual room with which the user a desires to associate the image capturing apparatus 10 registered in the tenant. The acceptance unit 32 of the communication terminal 30A accepts an operation input indicating selection. Specifically, in response to the acceptance unit 32 of the communication terminal 30A accepting an operation input from the user a, the display control unit 33 causes the first virtual room association screen 260 to be displayed. At this time, the communication unit 31 may transmit a screen update request to the communication unit 51 of the information processing system 50. In response to receipt of the screen update request, the information processing system 50 refers to the tenant information storage unit 5003 and identifies a virtual room ID registered in the tenant associated with the authenticated user ID. The information processing system 50 further refers to the virtual room information storage unit 5002 and acquires the virtual room name associated with the identified virtual room ID. The communication unit 51 of the information processing system 50 transmits information on the identified virtual room ID and a virtual room name corresponding to the identified virtual room ID (or information on a screen generated by the screen generation unit 52 based on such information) to the communication terminal 30A. The communication unit 31 of the communication terminal 30A receives the information on the virtual room ID and the virtual room name. The display control unit 33 can update and display the first virtual room association screen 260 in accordance with the received information. Such information, which can be identified based on the user ID, may be received in step S13 after the authentication. The acceptance unit 32 accepts an operation input indicating selection from the user a on the displayed first virtual room association screen 260. As a result, the communication terminal 30A can identify the virtual room ID that has been selected.

S23: The user a presses, on the second virtual room association screen 270 displayed on the communication terminal 30A, the connection button 272 to additionally associate a device with the virtual room. The acceptance unit

32 of the communication terminal 30A accepts an operation input indicating the pressing of the connection button 272. Specifically, the display control unit 33 of the communication terminal 30A displays the second virtual room association screen 270 corresponding to the selected virtual room ID identified in step S22. Further, the acceptance unit 32 accepts, from the user a, an instruction to additionally associate a device with the virtual room (the pressing of the connection button 272).

S24: In response to the operation input in step S23, the communication unit 31 of the communication terminal 30A requests the information processing system 50 to provide information on devices registered in the tenant, which are candidate devices to be associated with the virtual room, and devices that have already been associated with the virtual room ID selected in step S22.

S25: The communication unit 51 of the information processing system 50 receives the request for the information on the devices registered in the tenant and the devices associated with the selected virtual room ID, and the screen generation unit 52 generates the third virtual room association screen 280 including the device IDs of the devices registered in the tenant and the devices associated with the selected virtual room ID. The communication unit 51 of the information processing system 50 transmits screen information of the third virtual room association screen 280 to the communication terminal 30A.

S26: The communication unit 31 of the communication terminal 30A receives the screen information of the third virtual room association screen 280, and the display control unit 33 causes the third virtual room association screen 280 to be displayed. The user a selects a device to be associated with the virtual room. In an example, the user a selects the image capturing apparatus 10. The acceptance unit 32 of the communication terminal 30A accepts the selection, and the image capturing apparatus ID is identified as the device ID of the selected device.

S27: The communication unit 31 of the communication terminal 30A designates the virtual room ID selected in step S22 and the device ID (e.g., the image capturing apparatus ID) selected in step S26, and transmits an association request to the information processing system 50.

S28: The communication unit 51 of the information processing system 50 receives the association request, and the communication group management unit 56 registers the device (e.g., the image capturing apparatus 10) in the virtual room. That is, the communication group management unit 56 refers to the virtual room information storage unit 5002 and registers the device ID (e.g., the image capturing apparatus ID) in association with the virtual room ID designated in the request sent in step S27.

S29: Since the device ID (e.g., the image capturing apparatus ID) is associated with the virtual room, the communication unit 51 of the information processing system 50 transmits the virtual room ID, the name, and the description to the image capturing apparatus 10. The information processing system 50 may transmit the virtual room ID, the name, and the description to the image capturing apparatus 10 by using a push notification or by using polling, which is performed by the image capturing apparatus 10. The connection unit 16 of the image capturing apparatus 10 receives the virtual room ID, the name, and the description and stores the virtual room ID, the name, and the description in the storage unit 1000. Accordingly, the image capturing apparatus 10 can add the image capturing apparatus ID, the virtual room ID, the name, the description, and the like to a wide-view image to be transmitted. A device other than the image capturing apparatus 10 can also be associated with the virtual room in a similar procedure. Then, the communication unit 51 of the information processing system 50 may transmit a notification indicating completion of the association to the communication terminal 30A. After step S29, the device (the image capturing apparatus 10) registered in association with the virtual room can connect to the associated virtual room. In the illustrated example, the image capturing apparatus 10 designates the virtual room ID received in step S29 and transmits a virtual room connection request to the information processing system 50, thereby connecting to the virtual room. The timing at which the image capturing apparatus 10 connects to the virtual room can be changed in accordance with an operation performed by the user.

S30: The communication terminal 30A and the information processing system 50 perform the room entry process illustrated in FIG. 18 to allow the communication terminal 30A to enter the virtual room associated with the device (the image capturing apparatus 10).

S31: After entry into the virtual room, the user a turns on the toggle button 291, on the image viewing screen 210, for the image capturing apparatus 10 associated with the virtual room. The acceptance unit 32 of the communication terminal 30A accepts the turn-on operation.

S32: The communication unit 31 of the communication terminal 30A designates the device ID (image capturing apparatus ID) and transmits, to the information processing system 50, a request for starting transmission of the wide-view image. The user a may directly operate a button of the image capturing apparatus 10 to start transmitting the wide-view image. In response to an operation performed by the user a, the communication unit 31 of the communication terminal 30A may transmit a transmission stop request to the information processing system 50.

S33: The communication unit 51 of the information processing system 50 receives the transmission start request and requests the image capturing apparatus 10 identified by the device ID (image capturing apparatus ID) to start transmission. The information processing system 50 may use a push notification or use polling, which is performed by the image capturing apparatus 10. The connection unit 16 of the image capturing apparatus 10 receives the transmission start request, and the imaging processing unit 13 starts capturing a wide-view image. The image transmission control unit 18 repeatedly transmits the wide-view image with a determined FPS or an FPS corresponding to a band via the connection unit 16. As a result, the communication terminal 30 that has entered the virtual room can display the state of the site A on the image viewing screen 210 in real time.

Distribution of Wide-View Image and Others

Figure 27:
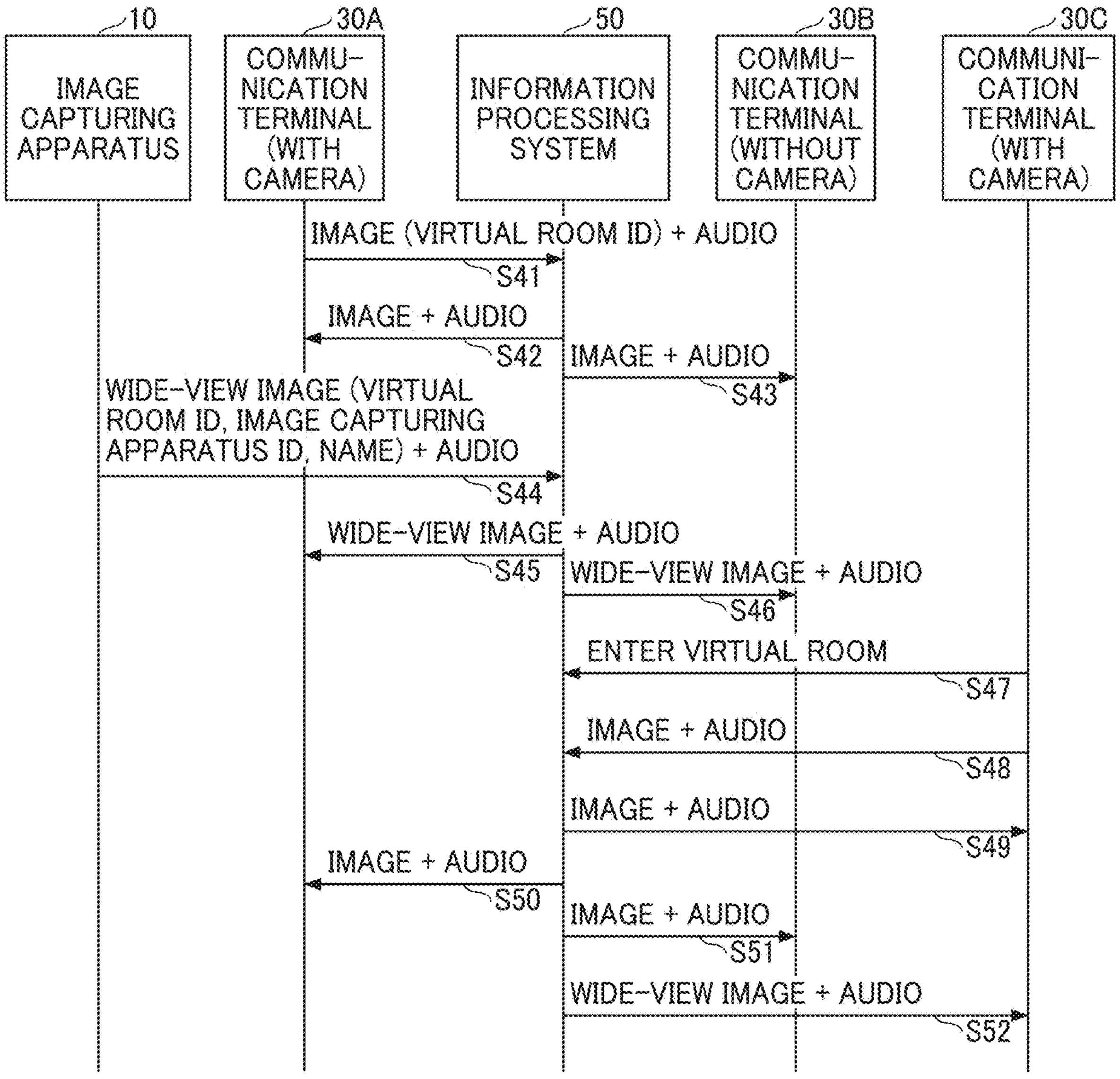
FIG. 27 is a sequence diagram illustrating an example process for sharing a wide-view image.

A process for sharing a wide-view image or an image having a normal angle of view will be described with reference to FIG. 27. FIG. 27 is a sequence diagram illustrating an example process for sharing a wide-view image. In FIG. 27, the communication terminals 30A and 30B have entered the virtual room by executing the room entry process described with reference to FIG. 18. The communication terminal 30A includes the camera 9 having a normal angle of view, and an image captured by the camera 9 is shared with the communication terminal 30B. An image captured by the smart glasses 88 associated with the virtual room, instead of the camera 9 of the communication terminal 30A, may be shared. In FIG. 27, the image capturing apparatus 10 has already connected to the same virtual room in accordance with the registration procedure illustrated in FIG. 26.

S41: The imaging unit 34 of the communication terminal 30A captures an image, and the communication unit 31 designates the virtual room ID of the virtual room that the communication unit 31 is in and transmits video including the captured image and audio to the information processing system 50.

S42 and S43: In response to the communication unit 51 of the information processing system 50 receiving the video including the image and the audio, the image distribution unit 54 acquires the IP addresses of the communication terminals 30A and 30B, which are in the same virtual room, from the virtual room information storage unit 5002, and transmits the video including the image and the audio via the communication unit 51. In FIG. 27, an image having a normal angle of view is received by the communication unit 31 of the communication terminal 30A from the information processing system 50 and is displayed. In another example, an image having a normal angle of view is not received from the information processing system 50, but an image having a normal angle of view is captured by the imaging unit 34 and is displayed.

S44: In response to a transmission start request based on the settings for starting transmission, the imaging processing unit 13 of the image capturing apparatus 10 captures a wide-view image, and the image transmission control unit 18 designates the virtual room ID of the virtual room in which the image capturing apparatus 10 is registered, the image capturing apparatus ID, and the name and the description of the image capturing apparatus 10 and transmits video including the wide-view image and audio to the information processing system 50 via the connection unit 16.

S45 and S46: In response to the communication unit 51 of the information processing system 50 receiving the video including the wide-view image and the audio, the image distribution unit 54 acquires the IP addresses of the communication terminals 30A and 30B, which are in the same virtual room, from the virtual room information storage unit 5002, and transmits the video including the wide-view image and the audio via the communication unit 51.

S47: The communication terminal 30C including the camera 9 executes the room entry process illustrated in FIG. 18 and newly enters the virtual room.

S48: The communication unit 31 of the communication terminal 30C transmits video including an image having a normal angle of view and audio to the information processing system 50.

S49 to S51: The communication unit 51 of the information processing system 50 receives the video including the image having a normal angle of view and the audio from the communication terminal 30C, and the image distribution unit 54 acquires the IP addresses of the communication terminals 30A to 30C, which are in the same virtual room, from the virtual room information storage unit 5002, and transmits the video including the image having a normal angle of view and the audio.

S52: The communication unit 51 of the information processing system 50 also transmits the video including the wide-view image and the audio to the communication terminal 30C, which is in the same virtual room.

As described above, the users a and b, who are in the same virtual room, can share, in real time, the video including the wide-view image captured by the image capturing apparatus 10 associated with the virtual room. The order of transmission of the images illustrated in FIG. 27 is an example. In another example, the wide-view image may be shared first, or the image having a normal angle of view may be shared first.

A supplementary description will now be given of the smart glasses 88 and the VR goggles 89. The smart glasses 88 have a camera having a normal angle of view and a display function. The camera of the smart glasses 88 captures an image having a normal angle of view, and the captured image having a normal angle of view is distributed in a manner similar to that for the cameras 8 and 9. The display function of the smart glasses 88 is implemented by a flat screen, like that of an ordinary display. Thus, part of the wide-view image is displayed from a point of view designated by the user. The VR goggles 89 have a display function. In an example, the VR goggles 89 may also include a camera having a normal angle of view. The display function of the VR goggles 89 projects a wide-view image with a point of view determined by the orientation of the head of the user wearing the VR goggles 89. Thus, the predetermined-area image Q of the predetermined area T in the wide-view image is displayed from a point of view corresponding to the orientation of the head of the user. While viewing a wide-view image with the smart glasses 88 or the VR goggles 89, the user can transmit, to the information processing system 50, an image capturing request that designates point-of-view information of the wide-view image being viewed.

Recording with Image Capturing Apparatus in Response to Instruction from Communication Terminal Next, a process in which the image capturing apparatus 10 performs recording in response to an instruction from any communication terminal 30 will be described with reference to FIGS. 29 to 34.

First, a description will be given of a screen on which a user gives a recording request to the image capturing apparatus 10 by operating the communication terminal 30 in the sharing of a wide-view image. Any user can give a recording instruction. In the illustrated example, the user b gives a recording instruction. In the sharing of a wide-view image, to be exact, the image capturing apparatus 10 performs an “image capturing operation” in real time. The recording request in the sharing of a wide-view image is a request for recording a wide-view image for storage. In simple real-time distribution of a wide-view image, the wide-view image is not stored and is difficult to check at a later time. That is, a certain scene is not optionally stored.

Figure 29:
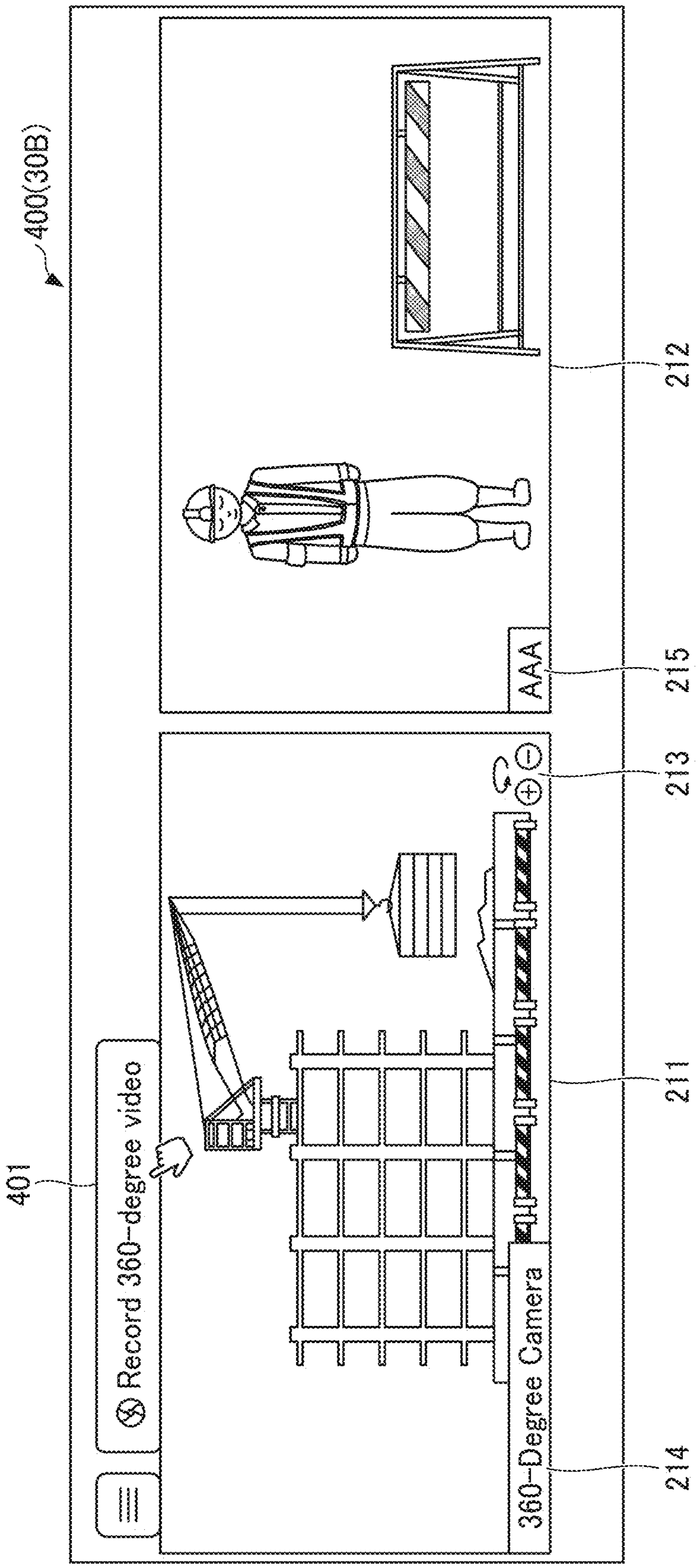
FIG. 29 is a view illustrating an example of an image viewing screen displayed on the communication terminal.

FIG. 29 illustrates an example of an image viewing screen 400 displayed on the communication terminal 30B. In the description of FIG. 29, differences from FIG. 25B will mainly be described. The communication terminals 30A and 30B display the video including the wide-view image distributed in real time. The communication terminals 30A and 30B also display the video including the image having a normal angle of view captured by the camera 9 of the communication terminal 30A. In the video including the wide-view image, the virtual point of view (see FIG. 11) can be changed as desired by operation of each of the users a and b at the sites A and B to change the predetermined area T (see FIGS. 9 to 10D) in the wide-view image to be displayed. As a result, even part of the on-site situation that is difficult to view at a normal angle of view is also visible.

As illustrated in FIG. 29, the first image field 211 in which the wide-view image is displayed displays a recording button 401. The recording button 401 is a button for the communication terminal 30B to transmit a recording request to the image capturing apparatus 10 by using point-of-view information for specifying a predetermined area of the video including the wide-view image displayed in the first image field 211. In FIG. 29, the recording button 401 is given the description “Record 360-degree video”. The recording button 401 illustrated in FIG. 29 is an example of a button for recording video of a spherical image, which is an example of a wide-view image. In another example, the recording button 401 may be a button given any other description, or a button represented by an image such as an icon without description. In another example, the recording button 401 may be a button for instructing recording of a wide-view image other than a spherical image. The recording button 401 is not limited to that in the example illustrated in FIG. 29 as long as the recording button 401 is a component of a graphical user interface (GUI) that can be used to give a recording instruction.

Figure 30:
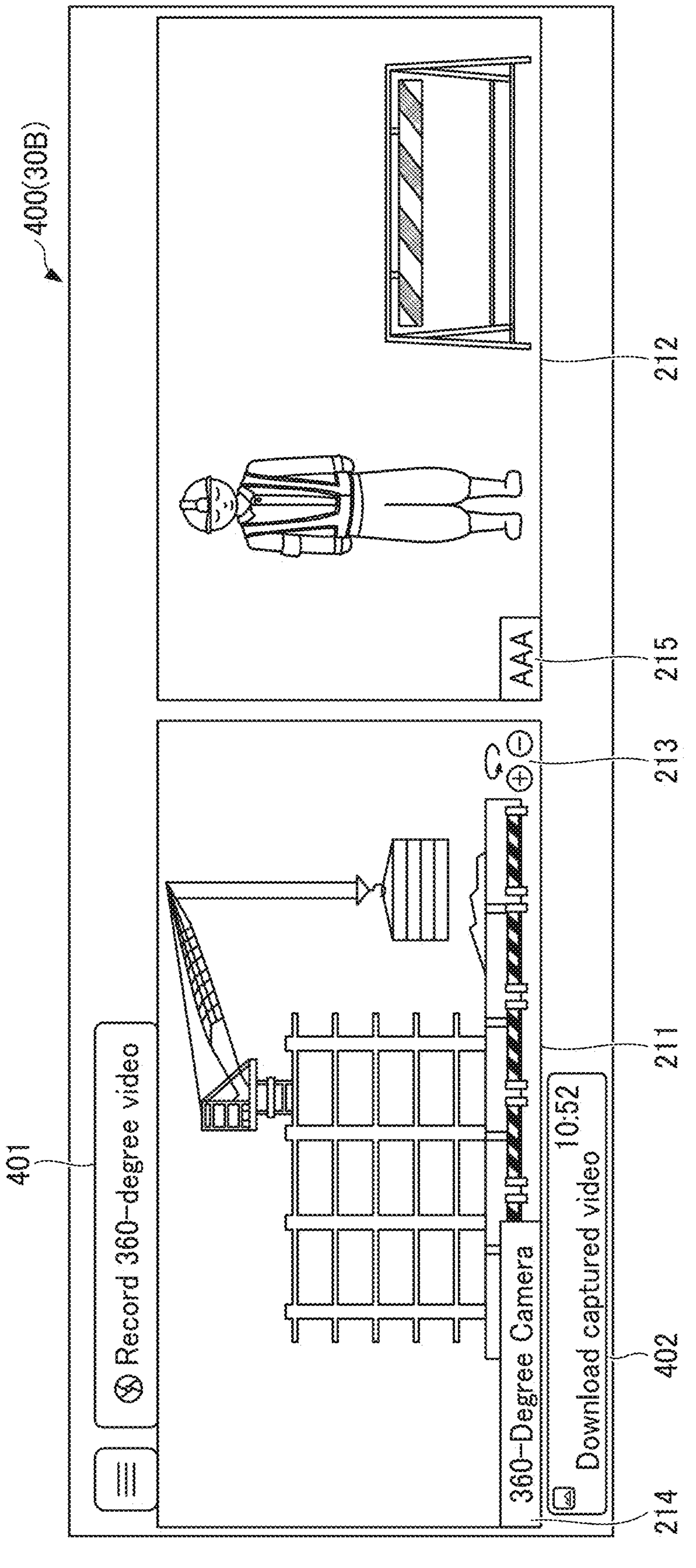
FIG. 30 is a view illustrating an example of the image viewing screen on which a download button is displayed in response to the pressing of an image capturing button on the communication terminal.

FIG. 30 illustrates the image viewing screen 400 on which a download button 402 is displayed in response to the pressing of the recording button 401 on the communication terminal 30B. In FIG. 30, the download button 402 (an example of a display component) is displayed below the first image field 211. The download button 402 displays the message "Download captured video". The download button 402 has embedded therein storage location information (e.g., URL) of a storage location to which the wide-view image recorded by the image capturing apparatus 10 in accordance with the recording request transmitted in response to the pressing of the recording button 401 is uploaded. In response to the user b pressing the download button 402, the communication terminal 30B connects to the URL and can download the recorded wide-view image. Since the wide-view image is associated with the point-of-view information, the communication terminal 30B displays the downloaded wide-view image by setting and displaying a virtual point of view such that a predetermined area identified by the point-of-view information and included in the wide-view image matches the center of the first image field 211. In an example, the downloaded wide-view image is associated with items of point-of-view information of a plurality of sites. The user inputs selection of one of options on the screen to determine which of the items of point-of-view information of the plurality of sites to use to display a predetermined area. In response to receipt of the input from the user, the predetermined area based on the selected point-of-view information may be displayed. It should be noted that the point of view is not necessarily made to completely match the center of the image field. In an example, the point of view may be set and displayed so as to be included in a range near the center of the first image field 211. In the illustrated example, the downloaded wide-view image is displayed in the first image field 211 in which the video including the wide-view image distributed in real time is displayed. In another example, a new image field is added to the image viewing screen 400, and the downloaded wide-view image is displayed in the new image field while the video including the wide-view image distributed in real time is continuously displayed in the first image field 211 as it is. This allows the user b to view a change in the on-site situation from the video including the wide-view image video distributed in real time and to also view a wide-view image of a specific part of the on-site situation at the same time.

The form of the download button 402 is an example. The download button 402 may display a message such as "spherical image URL". The download button 402 may display, instead of a button, a link corresponding to the storage location information (e.g., URL). The user b may download the wide-view image by clicking on the link.

In another example, the communication terminal 30B does not display the download button 402, and automatically receives and displays the stored wide-view image and the associated point-of-view information.

The image viewing screen 400 illustrated in FIG. 30 is displayed on the communication terminal 30B from which the recording request is transmitted. The download button 402 may be displayed on the image viewing screen 400 displayed on the communication terminal 30A on which the video including the wide-view image distributed in real time is being displayed. In an embodiment, in response to the user b giving an instruction to share a wide-view image captured in accordance with a recording request, the download button 402 is displayed on the communication terminal 30A of a participant who is in the same virtual room. Accordingly, an imaging operator who has given a recording instruction (i.e., the user b) can view a recorded image at hand and then share the recorded image with other participants. As a result, a wide-view image recorded in error or a wide-view image not to be shared can be prevented from being shared. All of the communication terminals 30 that have entered the virtual room may automatically display the download button 402 in response to the storage of a wide-view image.

Figure 31A:
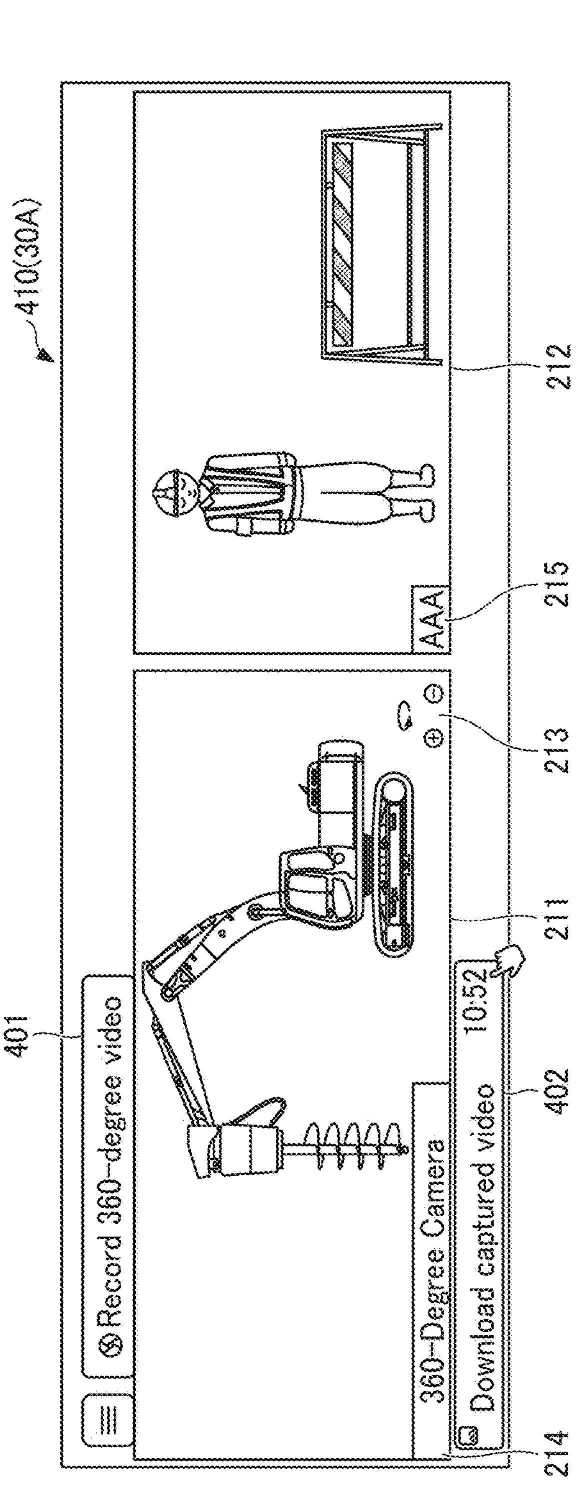
FIG. 31A is a view illustrating an example of an image viewing screen displayed before the user presses the download button.
Figure 31B:
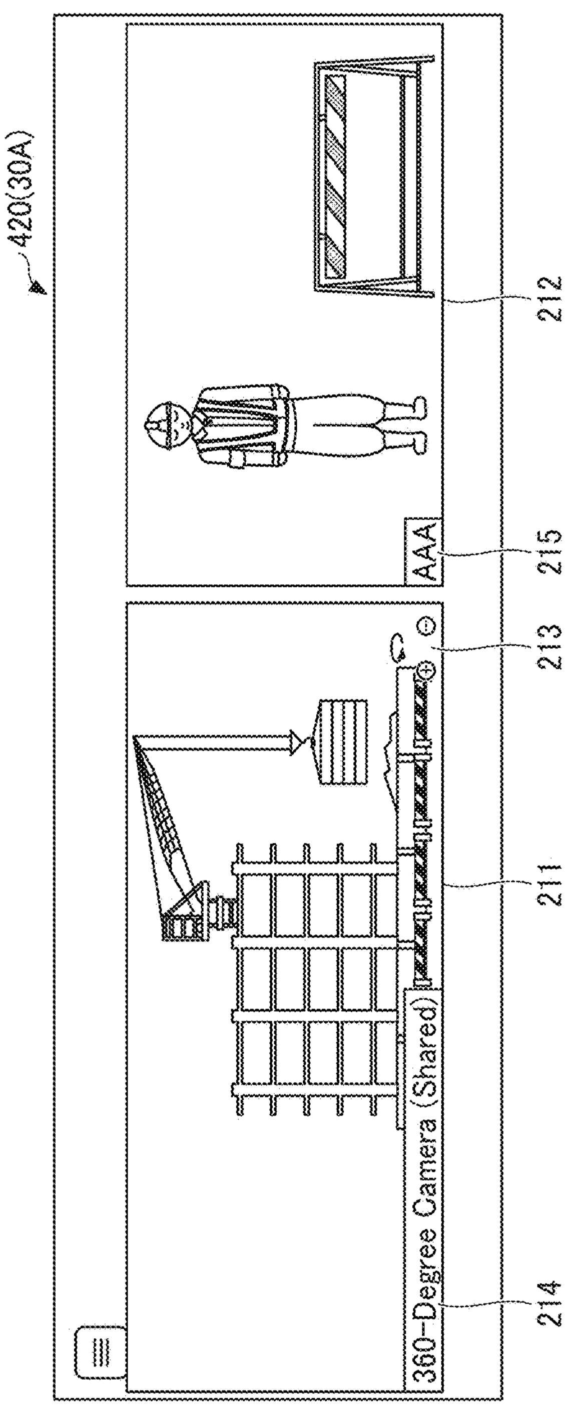
FIG. 31B is a view illustrating an example of an image viewing screen displayed after the user presses the download button.

Referring to FIGS. 31A and 31B, in the following description, the communication terminal 30A displays the download button 402. FIG. 31A illustrates an example of an image viewing screen 410 displayed before the user a presses the download button 402. Before the user a presses the download button 402, the communication terminal 30A displays, in the first image field 211, a wide-view image captured at an angle of view such that the wide-view image includes, for example, a working machine with a drill, as a virtual point of view designated by the user a. During the display of the wide-view image, the user a presses the download button 402.

FIG. 31B illustrates an example of an image viewing screen 420 displayed on the user a side after the user b presses the download button 402. The wide-view image associated with the point-of-view information obtained when the user b presses the recording button 401 is displayed in the first image field 211 illustrated in FIG. 29. Thus, as illustrated in FIG. 31B, a downloaded recorded wide-view image with the same point of view as that in the first image field 211 illustrated in FIG. 29 is displayed in the first image field 211 on the communication terminal 30A. Accordingly, a recorded wide-view image captured at an angle of view such that a scene of a crane on the rooftop of a building lifting up building material is visible is displayed instead of the wide-view image including the working machine with the drill. The user a can also change, as desired, the virtual point of view for the downloaded wide-view image displayed in the first image field 211 illustrated in FIG. 31B in a manner similar to that for the video including the wide-view image distributed in real time. As a result, the wide-view image of a specific scene can also reflect, as an initial value, the point of view of the user who has made the recording request. In addition, a specific scene of the on-site situation that is difficult to view at a normal angle of view is also visible.

As described above, users at different sites can share a virtual point of view for a recorded wide-view image of a specific scene at a later time. The wide-view image stored in response to a storage request may be displayed as a pop-up, instead of being displayed in the first image field 211 illustrated in FIG. 31B, or may be displayed in a separate window. This allows the users to view the on-site situation, which changes over time, by using the video including the wide-view image video distributed in real time and also to efficiently communicate with each other by using the recorded wide-view image of the specific scene.

As illustrated in FIG. 31B, the recording button 401 is not displayed during the display of the wide-view image downloaded by the communication terminal 30A. This is because no real-time wide-view image is displayed in the first image field 211. The device name 214 in the first image field 211 indicates the name of the image capturing apparatus 10 and also indicates a shared image. The device name 214 may be identified by the information on the tenant-registered device stored in the tenant information storage unit 5003. In an example, the device name 214 is a device ID.

The users a and b can delete the download button 402, as desired, after the download button 402 is displayed on the communication terminals 30A and 30B, respectively.

Figure 32:
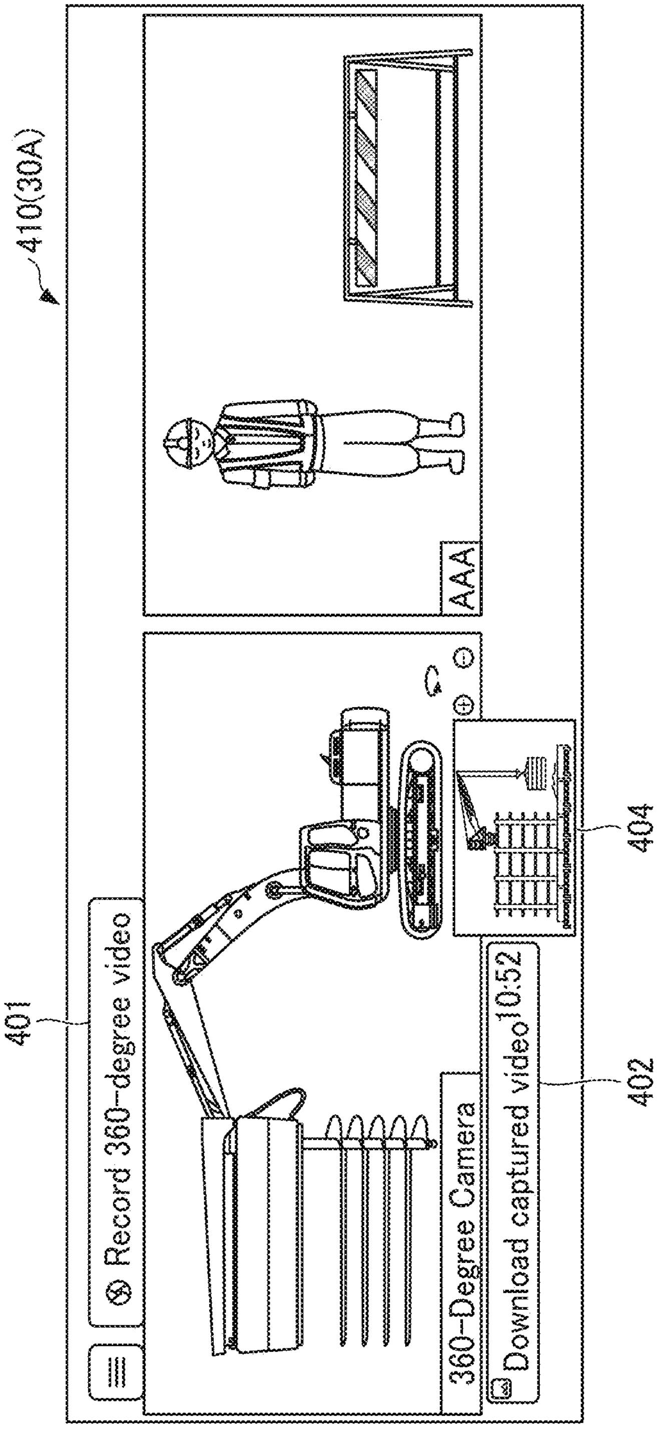
FIG. 32 is a view illustrating an example of the image viewing screen on which a thumbnail image is displayed.

As illustrated in FIG. 32, the communication terminals 30A and 30B may further display a thumbnail image 404 of the wide-view image in addition to (or in place of) the download button 402. The thumbnail image 404 may be created by the information processing system 50 or the communication terminal 30. The point of view for the thumbnail image 404 is defined by the point-of-view information.

Each of the users a and b preferably can set a data name for a wide-view image recorded in response to a recording request. The data name is registered in the image management information storage unit 3001 of each communication terminal 30.

Figure 33:
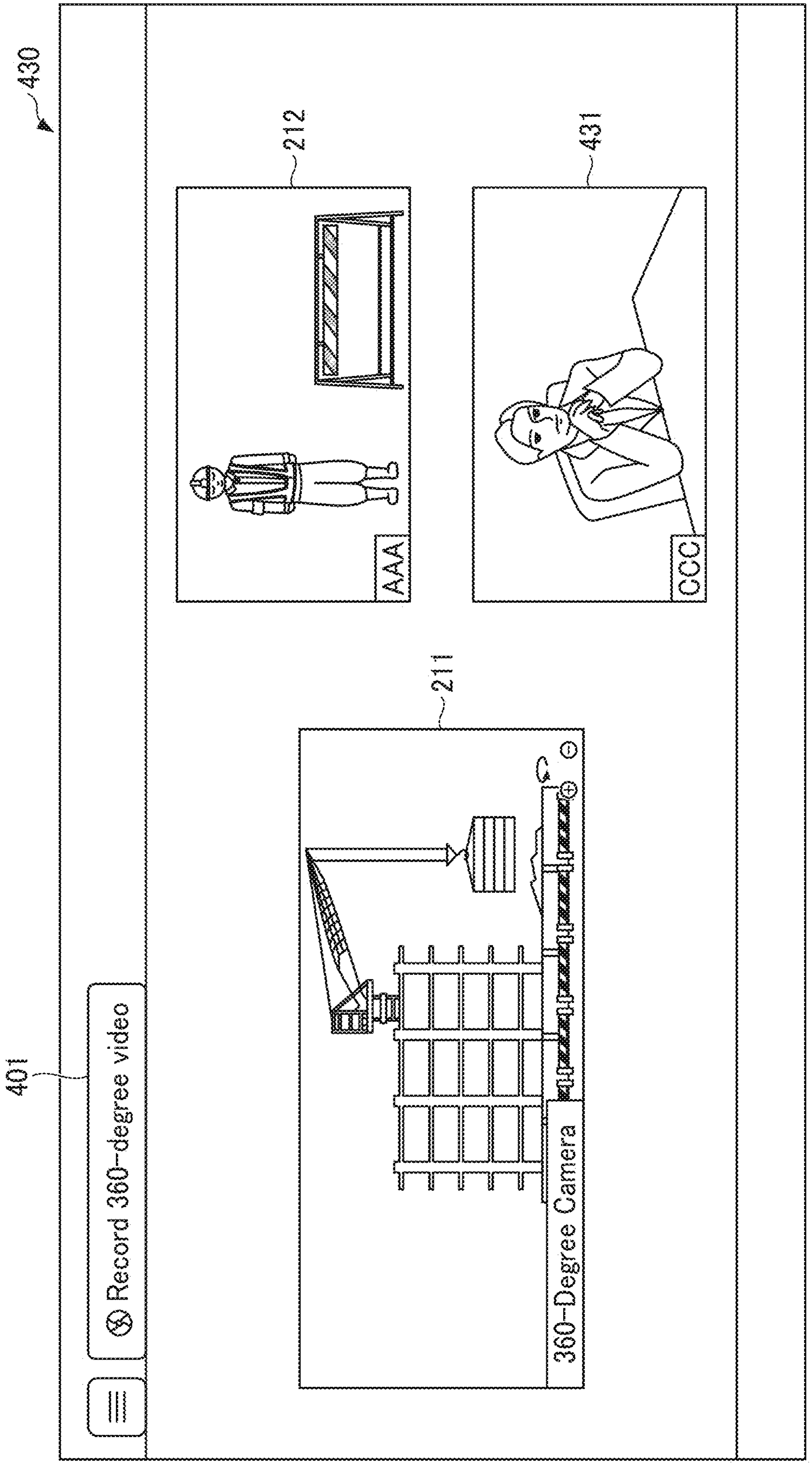
FIG. 33 is a view illustrating an example of an image viewing screen including three image fields.

FIG. 33 illustrates an example of an image viewing screen 430 including three image fields. The image viewing screen 430 illustrated in FIG. 33 includes a first image field 211, a second image field 212, and a third image field 431. In an example, the first image field 211 is for displaying a wide-view image captured by the image capturing apparatus 10, the second image field 212 is for displaying an image having a normal angle of view captured by the camera 9 of the communication terminal 30A, and the third image field 431 is for displaying an image having a normal angle of view captured by the camera 8 of the communication terminal 30C. Any one of the users a, b, and c can press the recording button 401, and the users a, b, and c can share a wide-view image from the same point of view at the respective sites.

Figure 28:
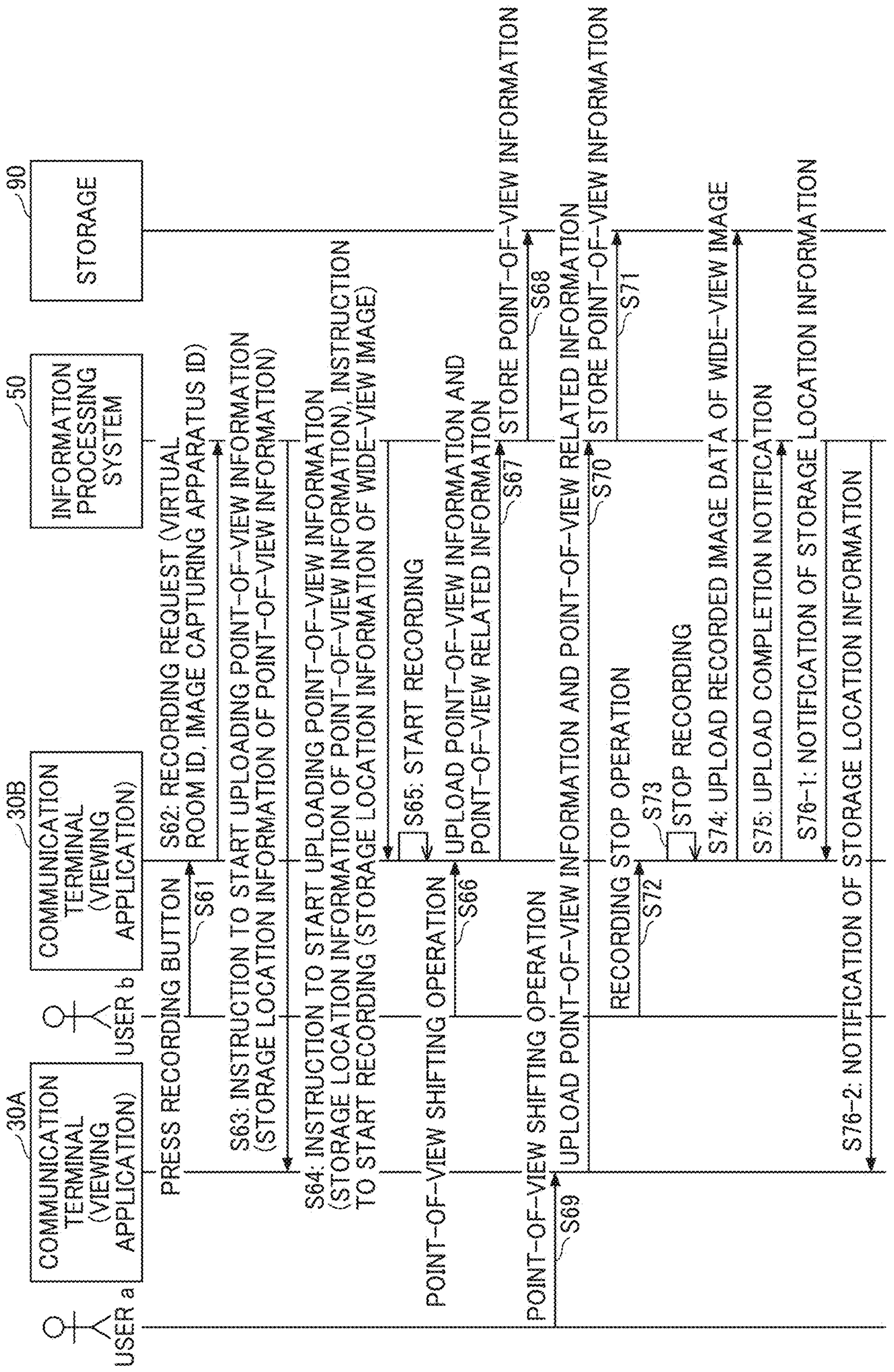
FIG. 28 is a sequence diagram illustrating an example process in which the user uses the communication terminal to give an image capturing request to the image capturing apparatus in the sharing of a wide-view image.

Operation or Process in Response to Recording Request in Sharing of Wide-View Image Next, an operation or process of the communication system 1*a* in response to a recording request in the sharing of a wide-view image will be described with reference to FIG. 28. FIG. 28 is a sequence diagram illustrating an example process in which the user b uses the communication terminal 30B to give a recording request in the sharing of a wide-view image. In FIG. 28, the communication terminals 30A and 30B have entered the virtual room by executing the room entry process described with reference to FIG. 18. In the example illustrated in FIG. 28, the user b presses the recording button 401 to share the point-of-view information with the user a. In another example, the user a presses the recording button 401 to share the point-of-view information with the user b. In FIG. 28, the image capturing apparatus 10 has already connected to the same virtual room in accordance with the registration procedure illustrated in FIG. 26. In FIG. 28, in an embodiment, each communication terminal 30 has installed therein a viewing application having a function related to display of a predetermined-area image and transmission of point-of-view information. In an example, the viewing application is not installed in advance, and the communication terminal 30 may have an equivalent function in advance. In another example, the communication terminal 30 may receive a program having a function equivalent to that of a viewing application from the information processing system 50 or any other server at the time of entry into the virtual room and perform the processes of the communication terminals 30A and 30B illustrated in FIG. 28. The viewing application of the communication terminal 30 may be implemented by a web browser.

S61: The user b inputs an operation of pressing the recording button 401 illustrated in FIG. 29. The acceptance unit 32 of the communication terminal 30B accepts the input operation of pressing the recording button 401. The pressing of the recording button 401 is an example of an operation input method for transmitting a recording request. In another example, a recording request is transmitted in response to an input to another user interface. Examples of the user interface include a GUI, a voice-based interface, and a gesture-based interface.

S62: In response to receipt of an operation input for transmitting a recording request, the communication unit 31 of the communication terminal 30B transmits a recording request to the information processing system 50. The recording request includes a virtual room ID for identifying a virtual room that is currently being used, and an image capturing apparatus ID for identifying an image capturing apparatus from which the video is distributed. Then, the communication unit 51 of the information processing system 50 receives the recording request. While both an image and audio are recorded, recording of an image will be described below for simplicity. In this embodiment, audio is also recorded in a manner similar to that of an image, and audio data is also communicated in a manner that of image data.

S63: In response to the communication unit 51 of the information processing system 50 receiving the recording request, the association processing unit 53 refers to the virtual room information storage unit 5002 to create storage location information (e.g., URL) of the wide-view image recorded based on the virtual room ID. Further, the association processing unit 53 identifies the communication terminal 30A in the virtual room and creates storage location information (e.g., URL) of point-of-view information for the storage 90 set in the same virtual room. Then, the communication unit 51 transmits an instruction to start uploading the point-of-view information to the communication terminal 30A. The instruction to start uploading the point-of-view information includes a point-of-view information storage URL dedicated to the communication terminal 30A. Then, the communication unit 31 of the communication terminal 30A receives the instruction. In response to the instruction, the display control unit 33 displays the download button 402.

S64: The communication unit 51 of the information processing system 50 transmits, to the communication terminal 30B from which the recording request is transmitted, an instruction to start uploading the point-of-view information (including storage location information of the point-of-view information), as in the transmission to the communication terminal 30A, and transmits a recording start instruction as a response to the recording request. The recording start instruction includes storage location information of the recorded wide-view image.

S65: The recording unit 35 of the communication terminal 30B starts recording a wide-view image (see step S46) in a moving image distributed from the image capturing apparatus 10 and recording audio. The recorded image data is temporarily stored in the storage unit 3000 from the recording unit 35 via the storing/reading unit 19. In an example, the image data includes audio data. The recording unit 35 also records audio.

S66: The user b uses the pointing device 312, an external mouse, or the like to input an operation of shifting (changing) the virtual point of view from a default predetermined-area image displayed on the communication terminal 30B. Then, the acceptance unit 32 accepts the operation of shifting the point of view. The display control unit 33 displays, on the display 306 of the communication terminal 30B, a predetermined-area image corresponding to a new point of view after changing. In an example, the predetermined-area image displayed by default is illustrated in FIG. 10B. The point of view of the virtual camera IC is shifted in the manner as illustrated in FIG. 10C in response to an operation by the user b. As a result, the predetermined-area image illustrated in FIG. 10D is displayed on the display 306. In an example, the virtual point of view may be shifted by an input to a user interface with the pointing device 312. In another example, the virtual point of view may be shifted by an audio input or a gesture input.

S67: The communication unit 31 of the communication terminal 30A uploads the point-of-view information and point-of-view related information to the information processing system 50 in accordance with the point-of-view shifting operation. The point-of-view information is information for identifying a predetermined area in the wide-view image to which the virtual point of view is shifted. The point-of-view related information includes, as illustrated in FIG. 16, the data ID of the wide-view image to be recorded, the user ID of the user b, who is a participant, viewing start date and time information indicating the date and time when the virtual point of view was shifted and the viewing of the new predetermined-area image was started, and the storage location information of the point-of-view information acquired in step S64. Then, the communication unit 51 of the information processing system 50 receives the point-of-view related information. The storing/reading unit 59 stores the point-of-view related information in the point-of-view related information storage unit 5004 as one record.

S68: The communication unit 51 of the information processing system 50 stores the point-of-view information received in step S67 in the storage location (such as URL) specified in the storage location information of the point-of-view information received in step S67. In an example, the information processing system 50 does not store the point-of-view information in the storage 90. The information processing system 50 may store the point-of-view information in the point-of-view related information storage unit 5004 illustrated in FIG. 16 instead of the "storage location information of the point-of-view information" in the point-of-view related information.

S69: The user a performs an operation similar to that of the user b in step S66.

S70: As in step S67, the communication unit 31 of the communication terminal 30A uploads the point-of-view information and the point-of-view related information to the information processing system 50.

S71: As in step S68, the communication unit 51 of the information processing system 50 stores the point-of-view information received in step S70 in the storage location (such as URL) specified in the storage location information of the point-of-view information received in step S70.

S72: In response to the user b inputting an operation of stopping the recording using the mouse or the like, the acceptance unit 32 accepts the recording stop operation.

S73: In response to receipt of the input of the recording stop operation, the recording unit 35 stops the recording operation.

S74: In the communication terminal 30B, the storing/reading unit 39 reads the recorded image data stored in the storage unit 3000. The communication unit 31 uploads and stores the recorded image data of the wide-view image of the moving image to the storage location in the storage 90 specified in the storage location information of the wide-view image acquired in step S64. In step S74, the recorded data may be uploaded to and stored in the storage location in the storage 90 via the information processing system 50.

S75: If the upload is completed in step S74, the communication unit 31 of the communication terminal 30B notifies the information processing system 50 of the completion of the upload of the recorded image data.

S76-1 and S76-2: In response to receipt of the notification indicating that the upload is completed, the communication unit 51 of the information processing system 50 notifies the communication terminal 30A and the communication terminal 30B, which are in the virtual room, of the storage location information (such as URL) of the wide-view image. Upon receipt of the notification, the display control units 33 of the communication terminals 30A and 30B can display the download button 402, which has been described with reference to FIGS. 30 and 31A. In response to the acceptance unit 32 accepting an operation input corresponding to the pressing of the download button 402, the communication unit 31 of each of the communication terminals 30A and 30B requests the storage 90 for the recorded image data stored in the storage location in the storage 90 specified in the storage location information and downloads the recorded image data from the storage 90 to share the recorded image data. The communication unit 31 of each of the communication terminals 30A and 30B may transmit a request for the recorded image data to the storage 90 via the information processing system 50. The communication unit 31 of each of the communication terminals 30A and 30B may download the recorded image data from the storage 90 via the information processing system 50.

Then, the process illustrated in FIG. 28 ends.

When the communication terminal 30 is implemented as the smart glasses 88 or the VR goggles 89, the process illustrated in FIG. 28 is executed in a similar way.

Figure 34:
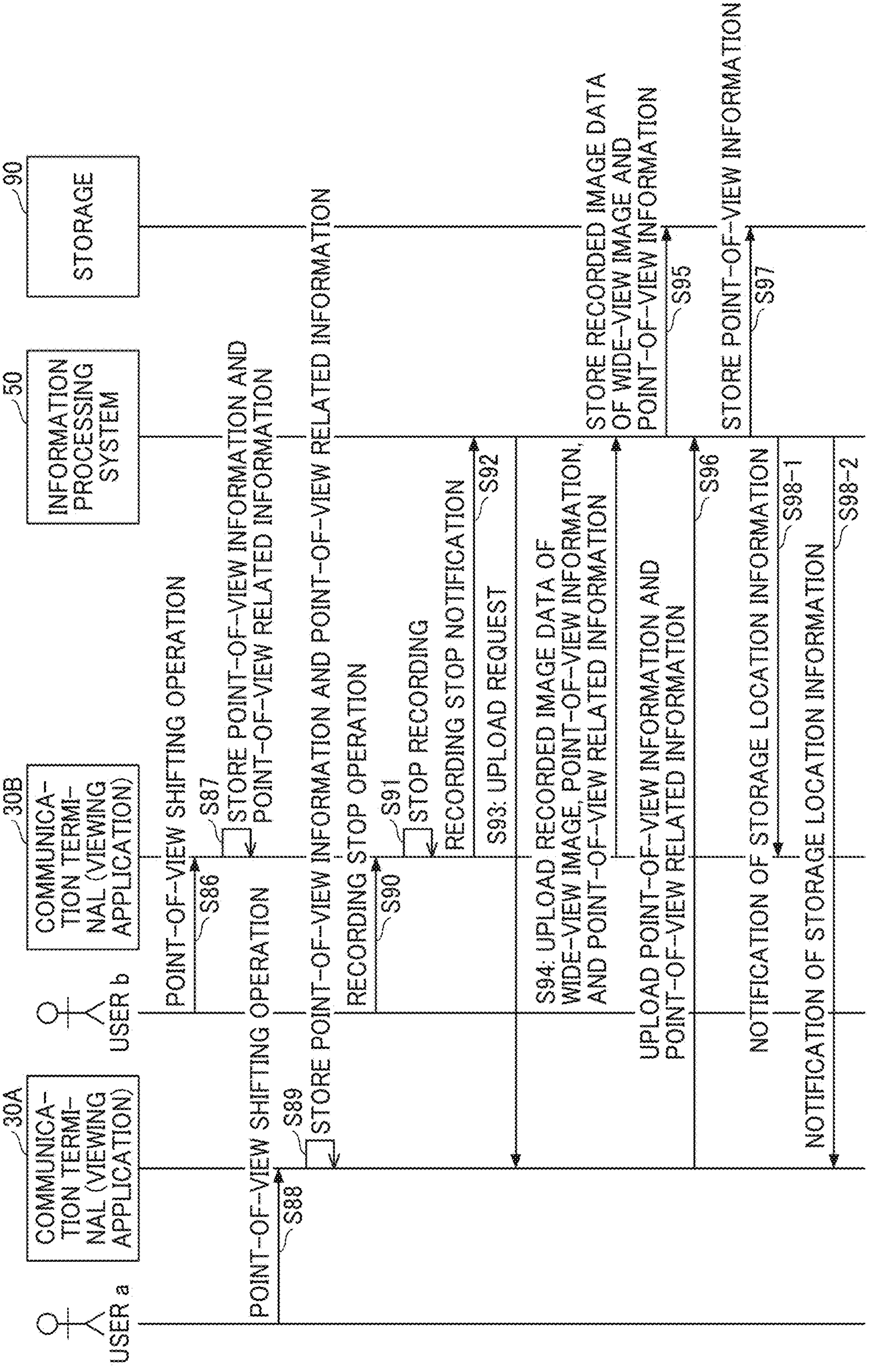
FIG. 34 is a sequence diagram illustrating a modification of the process in which the user uses the communication terminal to give an image capturing request to the image capturing apparatus in the sharing of a wide-view image.

FIG. 34 illustrates a modification of the process illustrated in FIG. 28. FIG. 34 is a sequence diagram illustrating another process for uploading the point-of-view information and the wide-view image. Also in the modification, since processing similar to that in steps S61 to S65 in FIG. 28 is performed, the description thereof will be omitted. The processing after recording is started in the communication terminal 30B will be described from step S86.

S86: As in step S66 described above, the user b uses the pointing device 312, an external mouse, or the like to input an operation of shifting (changing) the virtual point of view from a default predetermined-area image displayed on the communication terminal 30B. Then, the acceptance unit 32 of the communication terminal 30B accepts the operation of shifting the point of view. The display control unit 33 displays, on the display 306 of the communication terminal 30B, a predetermined-area image corresponding to a new point of view after changing.

S87: In the communication terminal 30B, the storing/reading unit 39 stores, in the storage unit 3000, point-of-view information for specifying a predetermined area after the virtual point of view is shifted in step S86, and point-of-view related information related to the point-of-view information.

S88: As in step S86, the user a also uses the pointing device 312, an external mouse, or the like to input an operation of shifting (changing) the virtual point of view from a default predetermined-area image displayed on the communication terminal 30A. Then, the acceptance unit 32 of the communication terminal 30A accepts the operation of shifting the point of view. The display control unit 33 displays, on the display 306 of the communication terminal 30A, a predetermined-area image corresponding to a new point of view after changing.

S89: Also in the communication terminal 30A, as in step S87, the storing/reading unit 39 stores, in the storage unit 3000, point-of-view information for specifying a predetermined area after the virtual point of view is shifted in step S88, and point-of-view related information related to the point-of-view information.

S90: In response to the user b stopping recording using the mouse or the like, as in step S72, the acceptance unit 32 accepts the recording stop operation.

S91: The recording unit 35 stops the recording operation.

S92: The communication unit 31 of the communication terminal 30B transmits, to the information processing system 50, a recording stop notification indicating that the recording has been stopped. Then, the communication unit 51 of the information processing system 50 receives the recording stop notification.

S93: The communication unit 51 of the information processing system 50 transmits an upload request to the communication terminal 30A, which has not performed the recording process, to upload the point-of-view information and the point-of-view related information. Then, the communication unit 31 of the communication terminal 30A receives the upload request.

S94: In the communication terminal 30B, the storing/reading unit 39 reads the recorded image data of the wide-view image, the point-of-view information, and the point-of-view related information, which are stored in the storage unit 3000. The communication unit 31 uploads the recorded image data of the wide-view image, the point-of-view information, and the point-of-view related information to the information processing system 50. As described above, the point-of-view related information includes storage location information of the point-of-view information. Then, the communication unit 51 of the information processing system 50 receives the recorded image data of the wide-view image, the point-of-view information, and the point-of-view related information.

S95: The communication unit 51 of the information processing system 50 stores the point-of-view information received in step S94 in the storage location (such as URL) specified in the storage location information of the point-of-view information received in step S94. Further, the communication unit 51 of the information processing system 50 stores the recorded image data of the wide-view image received in step S94 in the storage location (such as URL) in the storage 90 specified in the storage location information of the wide-view image stored in the image management information storage unit 5001 (see FIG. 14A or 14B). If the communication terminal 30B can identify the storage location, the communication terminal 30B may store the recorded image data of the wide-view image and the point-of-view information directly in the storage 90 without the intervention of the information processing system 50.

S96: In the communication terminal 30A, the storing/reading unit 39 reads the point-of-view information and the point-of-view related information, which are stored in the storage unit 3000. The communication unit 31 transmits the point-of-view information and the point-of-view related information to the information processing system 50. As described above, the point-of-view related information includes storage location information of the point-of-view information. Then, the communication unit 51 of the information processing system 50 receives the point-of-view information and the point-of-view related information.

S97: The communication unit 51 of the information processing system 50 stores the point-of-view information received in step S96 in the storage location (such as URL) in the storage 90 specified in the storage location information of the point-of-view information received in step S96. Further, the communication unit 51 of the information processing system 50 stores the recorded image data of the wide-view image received in step S96 in the storage location (such as URL) in the storage 90 specified in the storage location information of the wide-view image stored in the image management information storage unit 5001 (see FIG. 14A or 14B). If the communication terminal 30A can identify the storage location, the communication terminal 30A may store the point-of-view information directly in the storage 90 without the intervention of the information processing system 50.

S98-1 and S98-2: Upon completion of the storage of the recorded image data and the point-of-view information in the storage 90 as a result of execution of the processing described in steps S95 and S97, the communication unit 51 of the information processing system 50 notifies the communication terminal 30A and the communication terminal 30B, which are in the virtual room, of the storage location information (such as URL) of the wide-view image. Upon receipt of the notification, the display control units 33 of the communication terminals 30A and 30B can display the download button 402, which has been described with reference to FIGS. 30 and 31A. In response to the acceptance unit 32 accepting an operation input corresponding to the pressing of the download button 402, the communication unit 31 of each of the communication terminals 30A and 30B requests the storage 90 for the recorded image data stored in the storage location in the storage 90 specified in the storage location information and downloads the recorded image data from the storage 90 to share the recorded image data. The communication unit 31 of each of the communication terminals 30A and 30B may transmit a request for the recorded image data to the storage 90 via the information processing system 50. The communication unit 31 of each of the communication terminals 30A and 30B may download the recorded image data from the storage 90 via the information processing system 50.

Then, the process illustrated in FIG. 34 ends.

In the examples illustrated in FIGS. 28 and 34, the communication terminal 30 starts and stops recording. As described with reference to FIG. 27, the information processing system 50 also receives the wide-view image captured by the image capturing apparatus 10 in a manner similar to that of the communication terminal 30. In an example, the information processing system 50 includes a recording unit that is similar to the recording unit 35 of the communication terminal 30. The recording unit of the information processing system 50 may start and stop recording the wide-view image. In this case, a server such as a cloud server records the wide-view image. This configuration has the advantage of no processing load on the communication terminal 30 operated by the user for recording. In this modification, the communication terminal 30 uploads the recorded image data in step S74, and the recorded image data is stored in the storage 90 by the information processing system 50.

In an example, the image capturing apparatus 10 has the function of the recording unit 35. The image capturing apparatus 10 may record a wide-view image. This configuration has the advantage of no processing load on the information processing system 50 or the communication terminal 30 for recording. In this modification, in response to the information processing system 50 receiving a recording request in step S62, the information processing system 50 transmits the recording request to the image capturing apparatus 10 corresponding to the image capturing apparatus ID. Accordingly, the image capturing apparatus 10 starts recording. In response to receipt of an input of a recording stop operation in step S72, the communication terminal 30 transmits a recording stop request to the information processing system 50. The information processing system 50 further transmits, to the image capturing apparatus 10, a recording stop request including the storage location information. Accordingly, the image capturing apparatus 10 can stop the recording. After the recording is stopped, as in step S74, the image capturing apparatus 10, rather than the communication terminal 30, uploads the recorded image data to the storage 90 (or via the information processing system 50) in accordance with the storage location information.

In the examples illustrated in FIGS. 28 and 34, the communication terminal 30 that has transmitted a recording request among the communication terminals 30 performs recording. In an example, in response to receipt of an instruction to start uploading point-of-view information, all of the communication terminals 30 in the virtual room may perform control to start or stop recording of the wide-view image being distributed, in a manner similar to that of the communication terminal 30 that has transmitted the recording request, and may upload recorded image data of the wide-view image.

In the examples illustrated in FIGS. 28 and 34, in an example, the point-of-view information is in a data format in which the point-of-view information is embedded in the recorded image data. The point-of-view information may be transmitted to the information processing system 50 or the storage 90 by transmission of the recorded image data including the point-of-view information.

Viewing of Wide-View Image Registered in Storage

Figure 35:
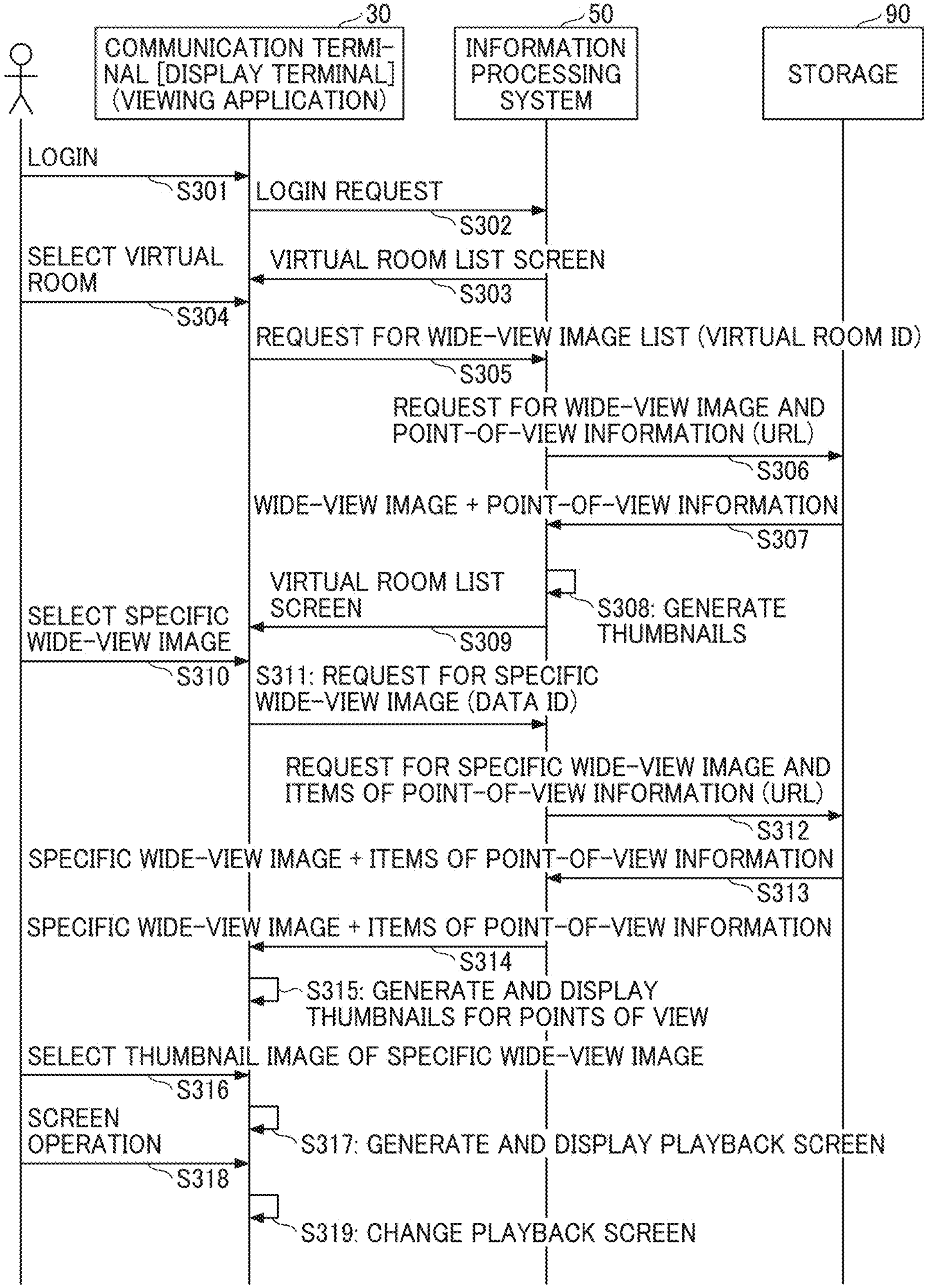
FIG. 35 is a sequence diagram illustrating a process in which the user views a wide-view image stored in a storage according to an embodiment of the present disclosure.
Figure 36:
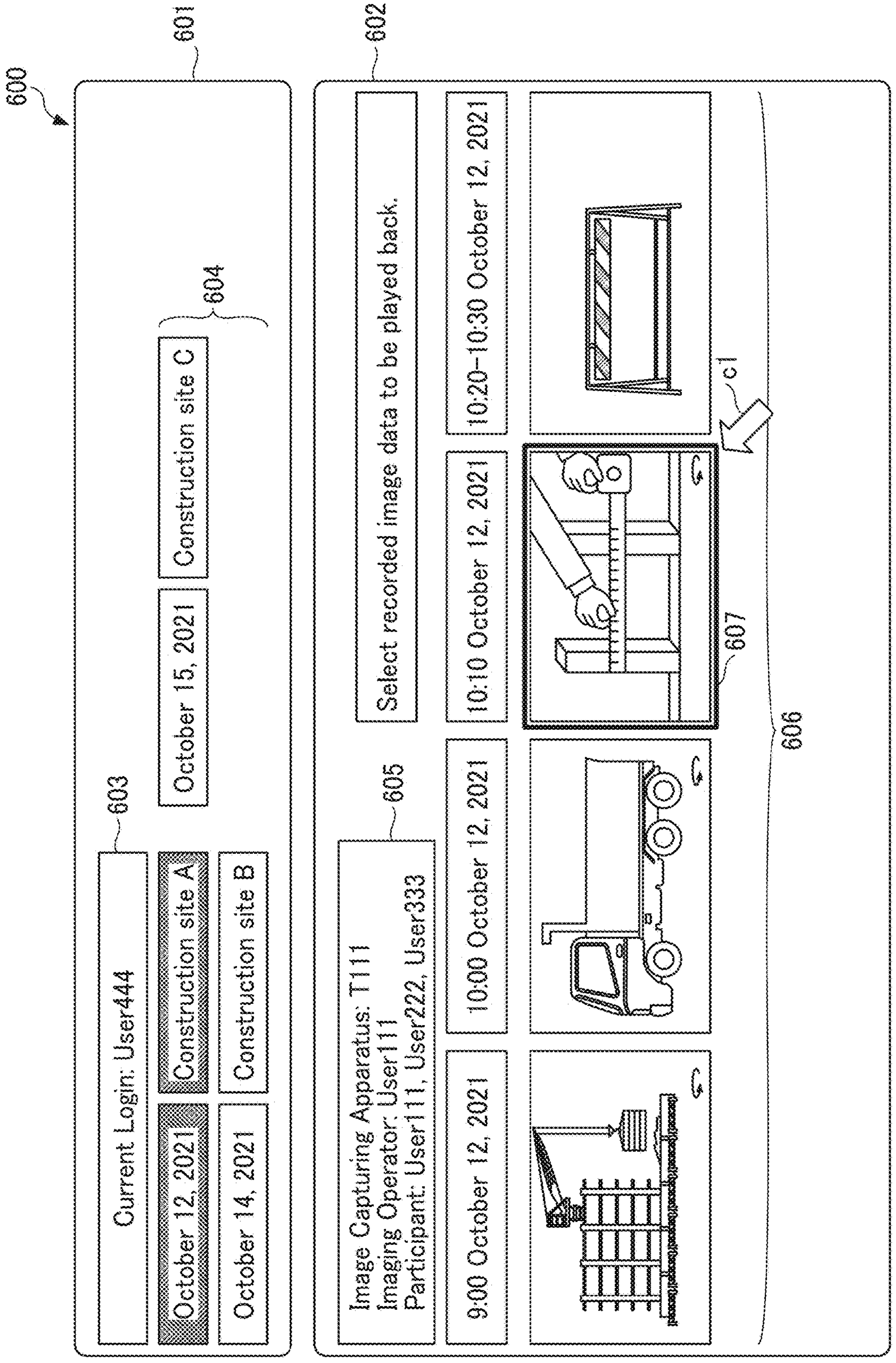
FIG. 36 is a view illustrating an example of a virtual room list screen displayed in response to any user connecting the communication terminal to the information processing system.
Figure 37:
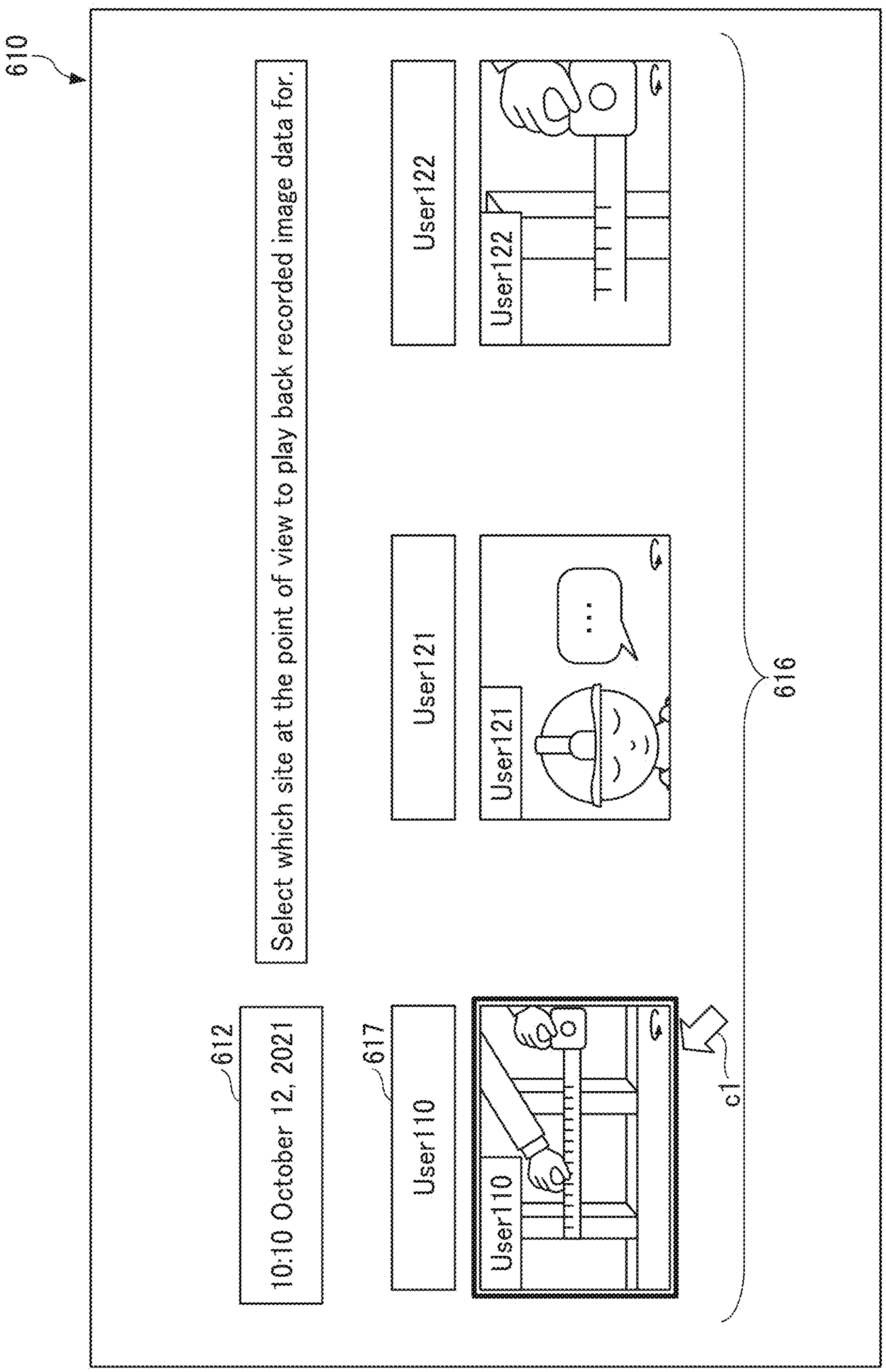
FIG. 37 is a view illustrating an example of a site display image selection screen for selecting a thumbnail of a display image at each site.

Next, the viewing of information stored in the storage 90, including a recorded wide-view image, will be described with reference to FIGS. 35 to 40B. FIG. 35 is a sequence diagram illustrating a process in which the user views a wide-view image stored in the storage 90. FIG. 36 is a view illustrating an example of a virtual room list screen 600 displayed in response to any user connecting the communication terminal 30 to the information processing system 50. FIG. 37 is a view illustrating an example of a site display image selection screen for selecting a thumbnail of a display image at each site.

S301: While the user accesses the information processing system 50 by using the communication terminal 30 (an example of a display terminal), the communication terminal 30 accepts input of authentication information (such as a user ID and a password) from the user and also accepts operation input of a request for a login to the tenant to which the user belongs. The acceptance unit 32 of the communication terminal 30 accepts the operation inputs described above.

S302: The communication unit 31 of the communication terminal 30 designates the authentication information and transmits a login request to the information processing system 50. The communication unit 51 of the information processing system 50 receives the login request, and the authentication unit 55 performs authentication based on the designated authentication information. It is assumed that the authentication is successful.

S303: The screen generation unit 52 of the information processing system 50 generates the virtual room list screen 600 on which wide-view images are classified by a predetermined category, and the communication unit 51 transmits screen information of the generated virtual room list screen 600 to the communication terminal 30. Specifically, the screen generation unit 52 generates the virtual room list screen 600 such that a list of categories based on the image management information stored in the image management information storage unit 5001 illustrated in FIG. 14A or 14B and the information registered in the virtual room information storage unit 5002, the tenant information storage unit 5003, and the like illustrated in FIGS. 15A and 15B is displayed as candidates for selection. In the example illustrated in FIG. 36, the virtual room list screen 600 is generated. In an example of the classification of virtual rooms, the virtual room list screen 600 includes a list (a category list 604) classified by the virtual room with which data including a wide-view image stored in the storage 90 is associated.

S304: The communication unit 31 of the communication terminal 30 receives the screen information of the virtual room list screen 600, and the display control unit 33 displays the virtual room list screen 600 on the display 306 of the communication terminal 30. Specifically, a header field 601 illustrated in FIG. 36 displays selectable categories (in the illustrated example, virtual rooms associated with dates). The communication terminal 30 accepts an operation input corresponding to selection of a category associated with a wide-view image to be viewed (in the illustrated example, a virtual room associated with a specific date) from the user. The acceptance unit 32 accepts the operation input.

The virtual room list screen 600 will now be described in detail.

The virtual room list screen 600 is created from the image management information stored in the image management information storage unit 5001 illustrated in FIG. 14A or 14B and the information stored in the virtual room information storage unit 5002 and the tenant information storage unit 5003 illustrated in FIGS. 15A and 15B, and the point-of-view related information storage unit 5004 illustrated in FIG. 16. Upon the user logging into a tenant, a selection screen for a category classified by information associated with the tenant is displayed. The login to the tenant is optional. In an example, the user logs in as a user account that is not associated with the tenant. In this case, a selection screen to be displayed may be classified based on data that the login user is privileged to access in the image management information stored in the image management information storage unit 5001. The privilege given to the user to access the image management information may be updated by connecting a predetermined communication terminal 30 to the information processing system 50 and transmitting an instruction for updating the access privilege from the communication terminal 30 to the information processing system 50. Various selectable categories are applicable. In FIG. 36, a selection screen for a category classified based on the imaging-time virtual room ID, which is stored in the image management information storage unit 5001, is illustrated as an example of the classification.

The virtual room list screen 600 includes the header field 601 and an image selection field 602.

The header field 601 displays a login user name 603 and a category list 604. The login user name 603 is information that identifies a user logging into the tenant, and includes the name of the user and a user ID of the user. The category list 604 is a list of categories based on the information stored in the image management information storage unit 5001. In an example, classification is made based on a virtual room with which recorded image data of a recorded wide-view image stored in the storage 90 is associated. For example, in the classification of wide-view images, a virtual room in which remote communication took place when each wide-view image included in recorded image data was captured can be identified by an imaging-time virtual room ID stored in the image management information storage unit 5001. The term "imaging-time", as used here, may also be referred to as "recording-time" since recording is also performed in parallel. In the category list 604 illustrated in FIG. 36, the names of virtual rooms in which remote communication took place, and dates when the remote communication took place (corresponding to information on the dates and times when the images were captured) are displayed in association with each other. The example illustrated in FIG. 36 indicates that, for example, remote communication took place in a virtual room with the virtual room name "Construction site A" on the date "Oct. 12, 2021", and an image captured during the remote communication is stored as a category corresponding to the date "Oct. 12, 2021" and the virtual room name "Construction site A". In a case where information on an image captured in the virtual room with the virtual room name "Construction site A" on a date other than the date "Oct. 12, 2021" is stored in the image management information storage unit 5001, the category list 604 displays an option of a category corresponding to the virtual room name "Construction site A" and a date other than the date "Oct. 12, 2021" (e.g., "Oct. 13, 2021"). The user accesses the virtual room information storage unit 5002 of the information processing system 50 by using the communication terminal 30 and can edit the virtual room name. The virtual room name is set upon the creation of the virtual room and is stored in the virtual room information storage unit 5002. The virtual room information storage unit 5002 is referred to, based on the imaging-time virtual room ID stored in the image management information storage unit 5001, to identify the corresponding virtual room name. The date can be identified from the imaging date and time (or the first imaging date and time of a plurality of imaging dates and times, if any) in the image management information stored in the image management information storage unit 5001. In FIG. 36, images are classified by virtual room. In another example, images are classified by date, date and time, imaging operator information, image capturing apparatus information, data name, or any other category. In another example, images may be classified by a combination of two or more of the categories described above.

The image selection field 602 includes image management information 605 and thumbnail images 606. In response to the user selecting any category (in the illustrated example, virtual room) from the category list 604, the thumbnail images 606 are displayed in the image selection field 602 as information on a wide-view image recorded in the selected virtual room during remote communication. In the example illustrated in FIG. 36, the categories of the date "Oct. 12, 2021" and the virtual room name "Construction site A" are selected. In the example illustrated in FIG. 36, images are classified by a combination of categories of the virtual room and the date when remote communication took place in the virtual room. The category list 604 may be created using the category of the virtual room regardless of the date, or may be created using the category of the date. The thumbnail images 606 may represent wide-view images recorded at any times from the start to the end of recording.

Each of the thumbnail images 606 is displayed such that a point of view identified by the point-of-view information for the wide-view image matches the center of the thumbnail image 606. Thus, a user viewing the virtual room list screen 600 can view a thumbnail image using point-of-view information that the imaging operator desires to share. It should be noted that the point of view is not necessarily made to match the center. In the display, the point of view may be included in a range near the center.

The virtual room list screen 600 is created by the following process.

First, the tenant ID of the tenant to which the user having the user ID authenticated in step S302 belongs is identified with reference to the tenant information storage unit 5003 illustrated in FIG. 15B. In the tenant information storage unit 5003, a virtual room is registered in each tenant. A wide-view image captured and stored by an image capturing apparatus associated with a virtual room in response to a request from a participant during remote communication performed in the virtual room is stored in the image management information storage unit 5001 in association with the virtual room ID of the virtual room in which the remote communication is performed, an imaging operator (participant) who has given a recording request, an imaging date and time, the image capturing apparatus, point-of-view information, a storage location, and the like.

The term "imaging operator", as used here, may also be referred to as a "person who performs recording" because the person performs recording in parallel with image capturing. Accordingly, the screen generation unit 52 refers to the tenant information storage unit 5003 to identify a virtual room ID associated with the tenant ID of the tenant to which the login user belongs and the corresponding virtual room name. In the way described above, the virtual room names to be displayed in the category list 604 illustrated in FIG. 36 can be identified.

In a case where the category of the virtual room associated with the data stored in the manner illustrated in FIG. 36 is displayed in combination with the date when the image was captured, the screen generation unit 52 refers to the image management information storage unit 5001 to identify the data ID associated with each identified virtual room ID.

The screen generation unit 52 further refers to the image management information storage unit 5001 to identify the information on the imaging date and time associated with the identified data ID. Since a date can be identified from the information on an imaging date and time identified in the way described above, the screen generation unit 52 can generate the virtual room list screen 600 on which, as illustrated in FIG. 36, the identified dates are displayed in association with the virtual rooms displayed in the category list 604. As described above, with the use of the virtual room in combination of the date, for example, if a plurality of wide-view images captured in a virtual room with the name "Construction site A" are stored, wide-view images captured on different dates among the plurality of wide-view images can be displayed as different categories in the category list.

Such display is useful for, for example, narrowing down selectable candidate wide-view images by date of work from wide-view images captured in the same on-site location because the work may differ from day to day.

Instead of the date, information on the imaging operator, the image capturing apparatus, or the storage location may be displayed in combination with the category of the virtual room with reference to the image management information storage unit 5001. Such display is useful for, for example, narrowing down selectable candidate wide-view images by a condition such as the imaging operator, the image capturing apparatus, or the storage location from wide-view images captured in the same on-site location. In an example, the category list 604 may be generated such that conditions for such categories are classified as individual conditions. In another example, as illustrated in FIG. 36, the category list 604 may be generated such that two or more conditions are combined for classification. In the illustrated example, the screen generation unit 52 generates the virtual room list screen 600 (the category list 604). In another example, the screen generation unit 52 may transmit information on categories to be displayed in the category list 604 (in the illustrated example, a virtual room name and a date satisfying conditions for categories) to the communication terminal 30 via the communication unit 51 such that the communication terminal 30 generates the virtual room list screen 600 on which the category list 604 is arranged based on the information on the categories.

Accordingly, the screen information to be transmitted in step S303 may include the virtual room list screen 600 generated by the screen generation unit 52. In another example, the screen information does not include the generated virtual room list screen, but includes information on the categories to be displayed in the category list 604. In another example, the screen information may include both the generated virtual room list screen 600 and the information on the categories to be displayed in the category list 604.

Referring back to step S305, the description will be continued.

S305: The communication unit 31 of the communication terminal 30 designates identification information that identifies the category selected by the user (in the illustrated example, information on the virtual room ID of the selected virtual room and the date) as a condition and transmits a request for a wide-view image list to the information processing system 50. In another example, the conditions such as the virtual room ID and the date are not designated simultaneously. The conditions may be designated separately, and then the request may be transmitted.

S306 and S307: The communication unit 51 of the information processing system 50 receives the request for the wide-view image list. The screen generation unit 52 identifies, from the image management information storage unit 5001, data IDs associated with the virtual room ID included in the conditions designated in the request. In the illustrated example, the date is also designated as a condition in the received request. Thus, among the identified data IDs, data IDs associated with an imaging date that matches the designated date in the image management information storage unit 5001 are identified. For each of the data IDs that match the designated condition, information on the storage location of the associated data in the image management information storage unit 5001 is acquired. The screen generation unit 52 accesses the respective storage locations in the storage 90 via the communication unit 51 by using the acquired information on the storage locations, and acquires the wide-view images and the point-of-view information from the storage 90. The screen generation unit 52 may acquire and use the point-of-view information stored in the image management information storage unit 5001.

S308: The screen generation unit 52 of the information processing system 50 creates thumbnail images by using the wide-view images and the point-of-view information acquired in steps S306 and S307. Further, the screen generation unit 52 acquires image information related to data IDs that satisfy the condition designated in step S305 (information such as image capturing apparatuses, imaging operators, and participants in the virtual room) from the image management information storage unit 5001. Then, the screen generation unit 52 generates, based on the acquired image information and the created thumbnail images, the virtual room list screen 600 on which the thumbnail images and the image information are arranged. In the illustrated example, the screen generation unit 52 generates the virtual room list screen 600. In another example, the screen generation unit 52 may transmit the thumbnail images and the image information to the communication terminal 30 via the communication unit 51 such that the communication terminal 30 generates the virtual room list screen 600 based on the thumbnail images and the image information.

S309: The communication unit 51 transmits the screen information of the virtual room list screen 600 to the communication terminal 30. In an example, the screen information is the virtual room list screen 600 generated in step S303. In another example, the screen information is information to be used by the communication terminal 30 to generate the virtual room list screen 600, such as the thumbnail images generated or the image information acquired by the processing of steps S306 to S308. The screen information also includes identification information designated in steps S306 and S307 (in the illustrated example, data IDs) for identifying data corresponding to each of the created thumbnail images.

S310: The communication unit 31 of the communication terminal 30 receives the screen information of the virtual room list screen 600, and the display control unit 33 displays the virtual room list screen 600 that is updated based on the received screen information. In a case where the received screen information is information to be used by the communication terminal 30 to generate the virtual room list screen 600, a screen update process is performed to update the virtual room list screen 600 displayed on the communication terminal 30, based on the received screen information. Specifically, the image information and the thumbnail images in the image selection field 602 illustrated in FIG. 36 are updated to image information and thumbnail images associated with the selected categories. The communication terminal 30 accepts, from the user, an operation input for selecting a thumbnail image of a specific wide-view image to be viewed through playback and display in the updated image selection field 602. The acceptance unit 32 accepts the operation input.

S311: The communication unit 31 of the communication terminal 30 identifies the data ID of the wide-view image corresponding to the thumbnail image of the specific wide-view image selected by the user, based on the operation input accepted in step S310, designates the identified data ID of the wide-view image, and transmits a request for the wide-view image to the information processing system 50.

S312 and S313: The communication unit 51 of the information processing system 50 receives the request for the wide-view image. The screen generation unit 52 acquires, from the image management information storage unit 5001, information (e.g., URL) on the storage location of the data associated with the data ID of the wide-view image designated in the request, and acquires a viewing start date and time and participant IDs. Further, the screen generation unit 52 acquires, based on the data ID of the wide-view image, the viewing start date and time, and the participant IDs, information on storage locations of corresponding items of point-of-view information from the point-of-view related information storage unit 5004. The screen generation unit 52 acquires, via the communication unit 51, the wide-view image and the items of point-of-view information from the storage 90 by using the information on the storage locations.

S314: The communication unit 51 transmits the data of the specific wide-view image and the items of point-of-view information, which are acquired in step S313, to the communication terminal 30.

S315: In the communication terminal 30, the screen generation unit 37 generates (creates) thumbnail images of predetermined areas identified by the items of point-of-view information among areas in the specific wide-view image to generate a site display image selection screen 610 illustrated in FIG. 37. The display control unit 33 causes the display 306 of the communication terminal 30 to display the site display image selection screen 610. The thumbnail images of the predetermined areas may be generated by the information processing system 50 instead of the communication terminal 30 and transmitted to the communication terminal 30 in step S314.

The site display image selection screen 610 includes recording (distribution) date and time information 612 of a wide-view image, and thumbnail images 616 of predetermined-area images displayed at respective sites. Each of the thumbnail images 616 is associated with a user ID 617 or the like of a user viewing a predetermined-area image in the wide-view image at each site when the wide-view image was recorded. The user ID 617 is displayed above the corresponding thumbnail image 616. Accordingly, a user viewing the site display image selection screen 610 at the time of playback can identify users who have displayed predetermined-area images from which the thumbnail images 616 are generated. The thumbnail images 616 may be each an image in which a virtual point of view can be shifted (changed).

S316: The user inputs an operation of selecting a thumbnail image based on specific point-of-view information by using, for example, a cursor c1. Then, the acceptance unit 32 accepts the input of the selection operation.

Figure 39A:
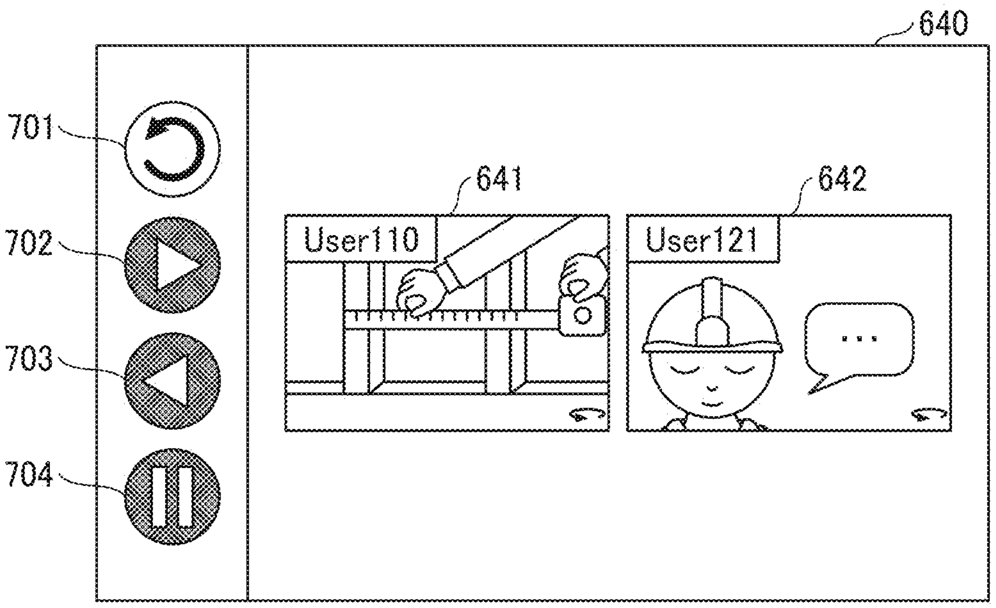
FIG. 39A is a view illustrating an example of the playback screen.
Figure 39B:
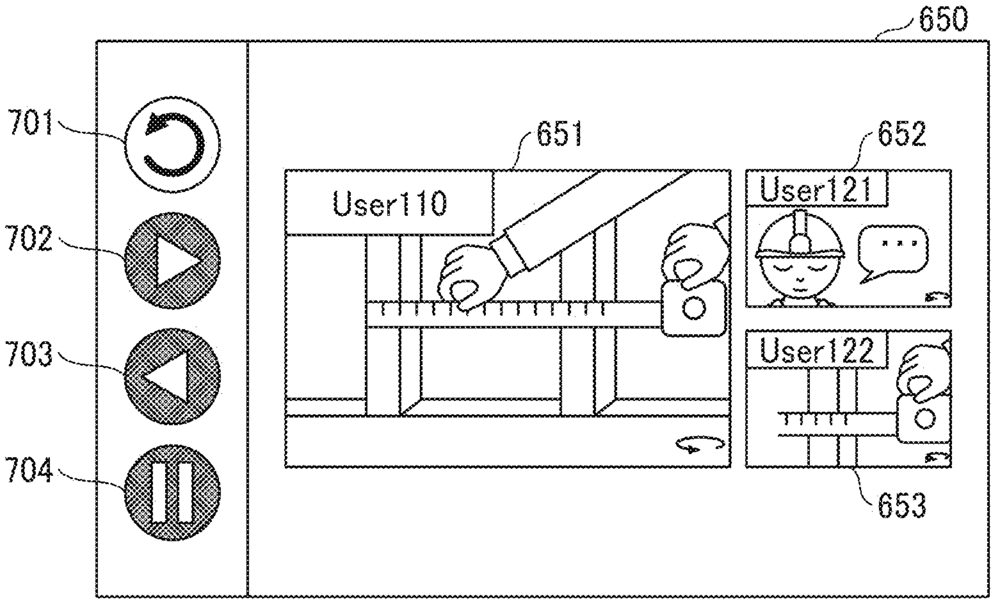
FIG. 39B is a view illustrating another example of the playback screen.

S317: The screen generation unit 37 generates a playback screen 640 illustrated in FIG. 39A or a playback screen 650 illustrated in FIG. 39B. FIG. 39A is a view illustrating an example of a playback screen. FIG. 39B is a view illustrating another example of the playback screen. The playback screen 640 includes various buttons 701 to 704. The playback screen 640 further includes predetermined-area images 641 and 642 in a specific wide-view image, based on all of the thumbnail images selected in step S316.

The predetermined-area images 641 and 642 are both played back and displayed on the playback screen 640, which is a single screen. The predetermined-area images 641 and 642 are images at the same elapsed time for playback of the same wide-view image. The imaging start date and time information is managed in the image management information illustrated in FIG. 14A or 14B, and the viewing start date and time information is managed in the point-of-view related information illustrated in FIG. 16. Thus, the screen generation unit 37 can generate a generation screen on which images at the same elapsed playback time can be displayed.

In an example, two thumbnail images are selected on the site display image selection screen 610 illustrated in FIG. 37. The predetermined-area images 641 and 642 illustrated in FIG. 39A are images for which the virtual point of view can be changed.

The buttons 701 to 704 are used for simultaneously performing the same display process on the predetermined-area images 641 and 642 illustrated in FIG. 39A. The button 701 is a button for playing back and displaying, by batch, the default (original) predetermined-area images indicated by the respective items of point-of-view information. The button 702 is a button for playing back and displaying images by batch. The button 703 is a button for playing back and displaying images in reverse by batch. The button 704 is a button for pausing the playback and display of images by batch. In response to the acceptance unit 32 accepting pressing of any of the buttons 701 to 704 from the user, the display control unit 33 executes the corresponding display process.

In an example, three thumbnail images are selected in FIG. 37. As illustrated in FIG. 39B, the screen generation unit 37 generates the playback screen 650. The playback screen 650 includes three predetermined-area images 651 to 653.

The predetermined-area images 651 to 653 are played back and displayed on the playback screen 650, which is a single screen. The predetermined-area images 651 to 653 are also images at the same elapsed time for playback of the same wide-view image. In an example, the predetermined-area image 651 corresponding to the user (User110), who is the host, is displayed in a larger size than the other predetermined-area images 652 and 653.

S318: In response to the user inputting a screen operation on the playback screen 640 or 650 illustrated in FIG. 39A or 39B using the mouse or the like, the acceptance unit 32 accepts the input of the screen operation.

Figure 38:
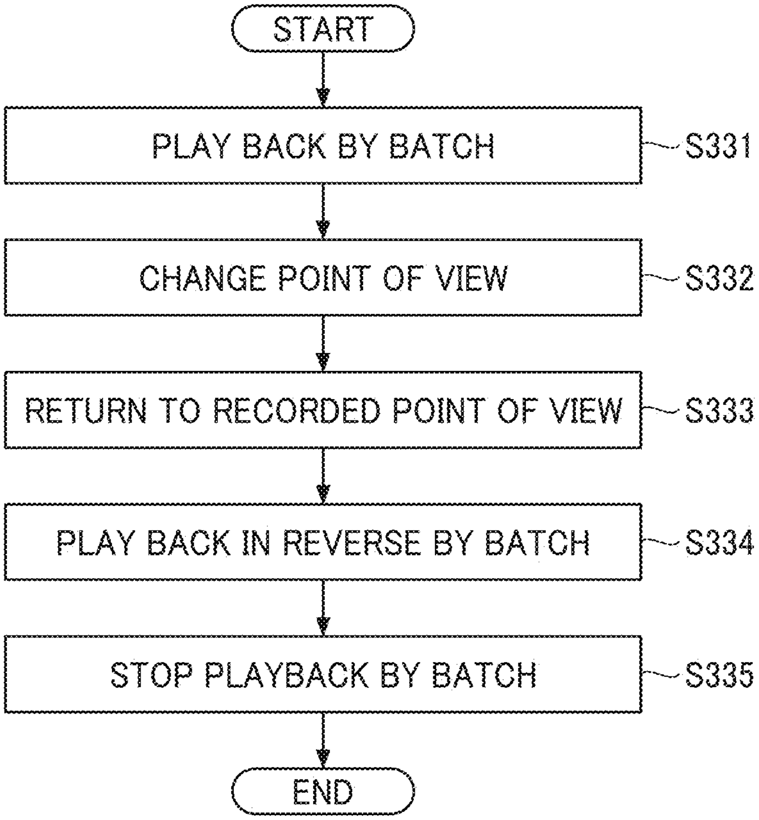
FIG. 38 is a flowchart illustrating a process for changing a playback screen according to an embodiment of the present disclosure.
Figure 40A:
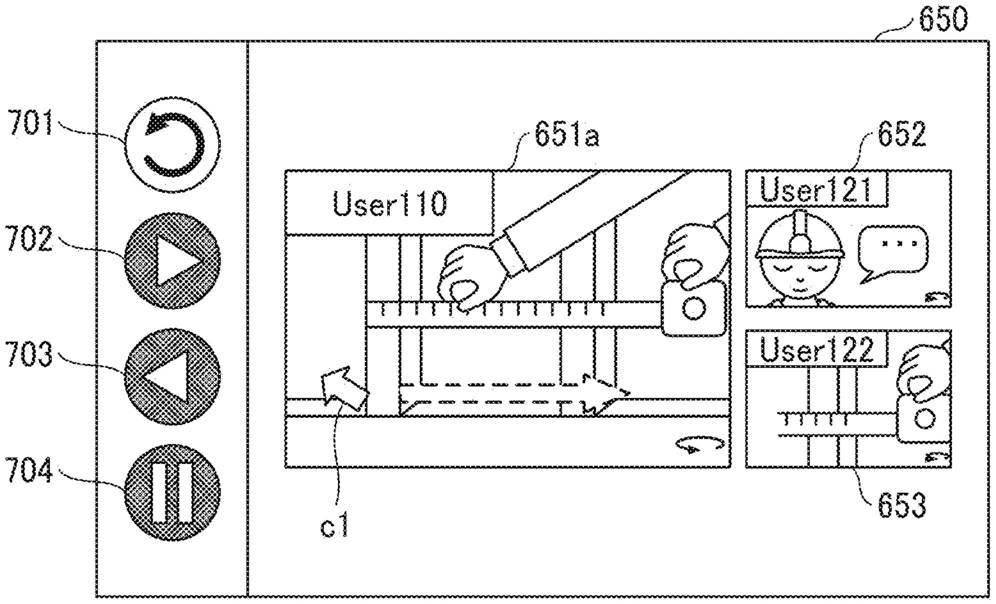
FIGS. 40A and 40B are views illustrating examples of how the playback screen is changed.
Figure 40B:
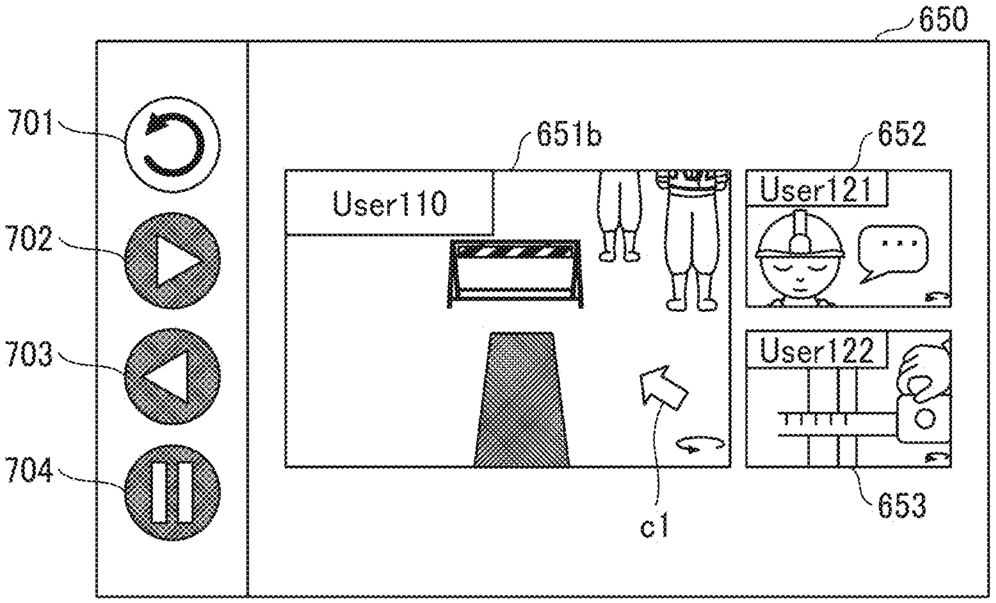

S319: The display control unit 33 changes the display of the playback screen 640 or 650 in accordance with the input of the screen operation accepted by the acceptance unit 32. An example of the screen operation (that is, operation via a screen) will be described in detail with reference to FIGS. 38 to 40B. FIG. 38 is a flowchart illustrating a process for changing a playback screen. FIG. 40 illustrates an example of how the playback screen is changed. The operations of the flowchart illustrated in FIG. 38 may be performed in any order.

S331: For example, the user presses the button 702 on the playback screen 650 illustrated in FIG. 39B to input a playback operation. The acceptance unit 32 accepts the input of the operation of playing back images by batch. In response to the accepted operation input, the display control unit 33 simultaneously plays back and displays the predetermined-area images to be played back, by batch, based on the recorded wide-view image. In the example illustrated in FIG. 39B, the three predetermined-area images 651 to 653 are simultaneously played back and displayed by batch.

S332: During playback and display by the processing of step S331, for example, the user places the cursor c1 on the predetermined-area image 651 illustrated in FIG. 39B by using the mouse or the like to obtain a predetermined-area image 651*a* illustrated in FIG. 40A. Further, the user inputs the operation of moving the cursor c1 horizontally to the right. In response to the input of the operation, the acceptance unit 32 accepts the input of the operation of shifting (changing) the virtual point of view. In response to the accepted operation input, the display control unit 33 displays a predetermined-area image 651*b* illustrated in FIG. 40B.

S333: For example, the user presses the button 701 on the playback screen 650 illustrated in FIG. 40B. In response to the input of the operation of pressing the button 701 on the playback screen 650, the acceptance unit 32 accepts the input of the operation of returning to the recorded point of view. In response to the accepted operation input, the display control unit 33 returns the predetermined-area image 651*b* illustrated in FIG. 40B to the predetermined-area image 651*a* illustrated in FIG. 40A and displays the predetermined-area image 651*a* again. If the virtual points of view for the predetermined-area images 652 and 653 have also been shifted, the display control unit 33 simultaneously returns the display of the predetermined-area images corresponding to the current virtual points of view to the display of the predetermined-area images corresponding to the original points of view by batch. S334: For example, the user presses the button 703 on the playback screen 650 illustrated in FIG. 39B to input a reverse playback operation. The acceptance unit 32 accepts the input of the operation of playing back images in reverse by batch. In response to the accepted operation input, the display control unit 33 simultaneously plays back the predetermined-area images to be played back, in reverse by batch. In the example illustrated in FIG. 39B, the three predetermined-area images 651 to 653 are simultaneously played back in reverse by batch.

S335: For example, the user presses the button 704 on the playback screen 650 illustrated in FIG. 39B to input a pause operation. The acceptance unit 32 accepts the input of the operation of pausing playback by batch. In response to the accepted operation input, the display control unit 33 simultaneously pause playback of the predetermined-area images to be played back, by batch. In the example illustrated in FIG. 39B, the playback of the three predetermined-area images 651 to 653 is simultaneously paused by batch.

Then, the process illustrated in FIG. 38 ends.

Application Example of Communication System in Telemedicine

Figure 41:
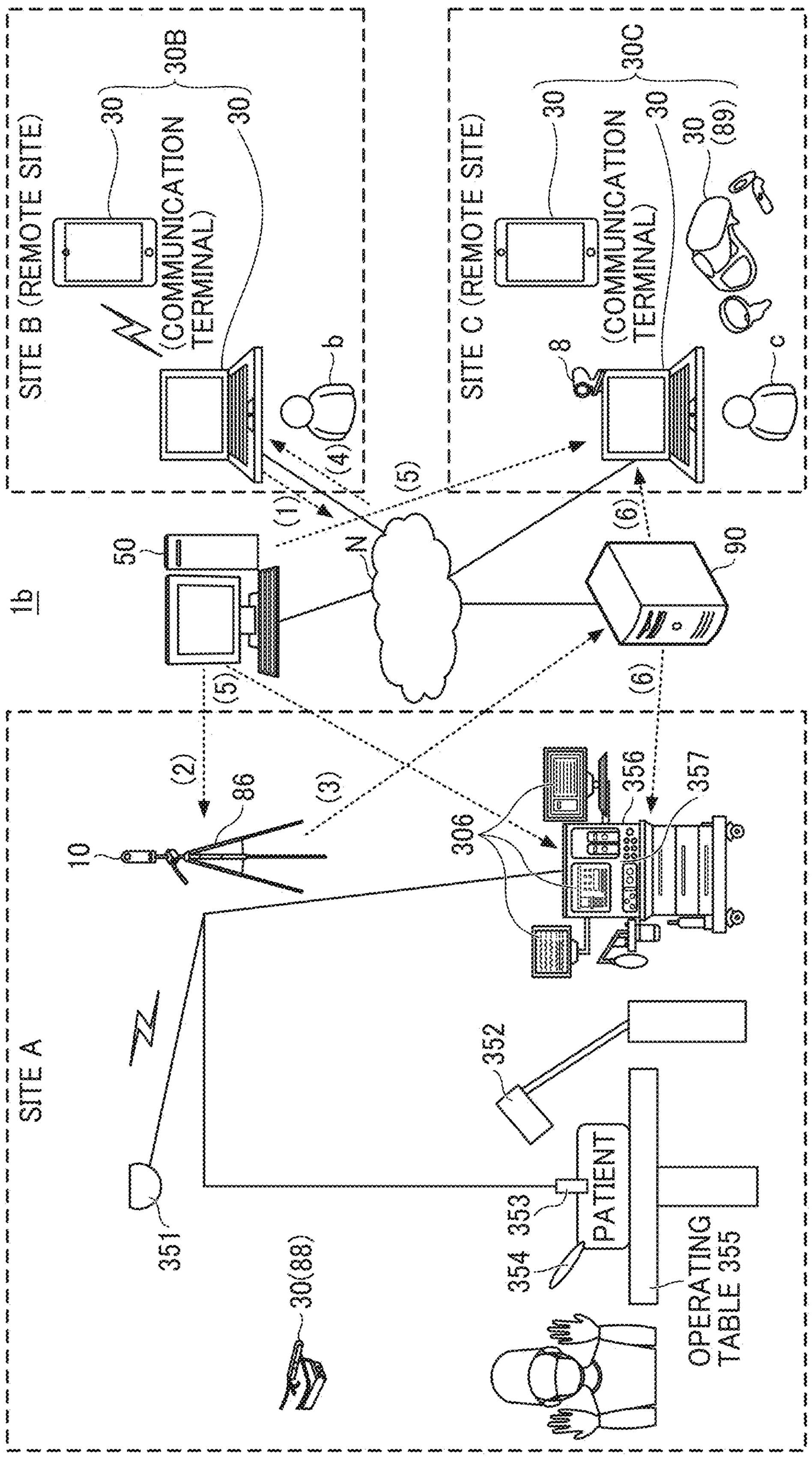
FIG. 41 is a diagram illustrating an example of remote communication using the communication system in telemedicine.
Figure 42:
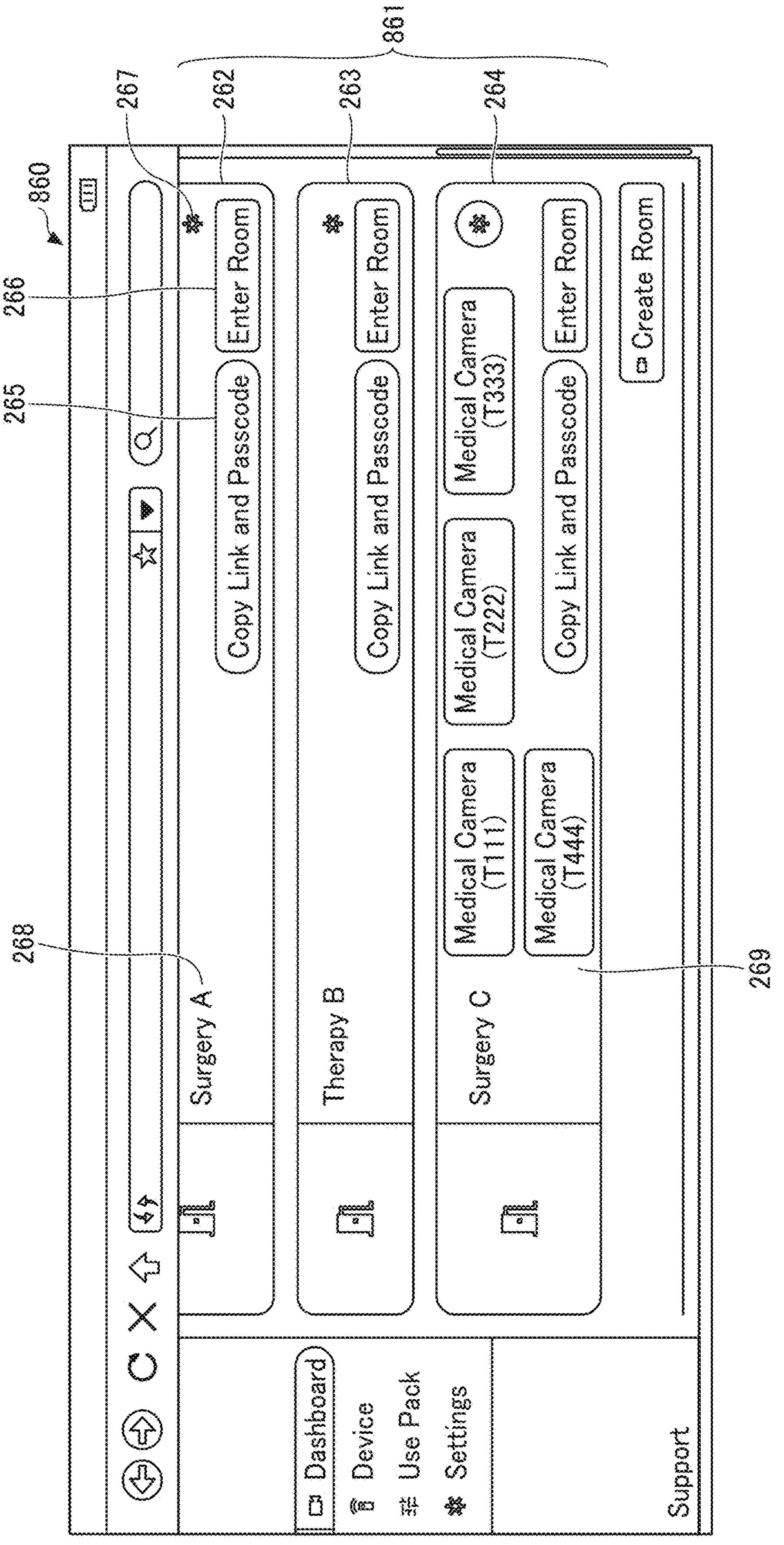
FIG. 42 is a view illustrating an example of a virtual room association screen for associating an image capturing apparatus with a virtual room for telemedicine.
Figure 43:
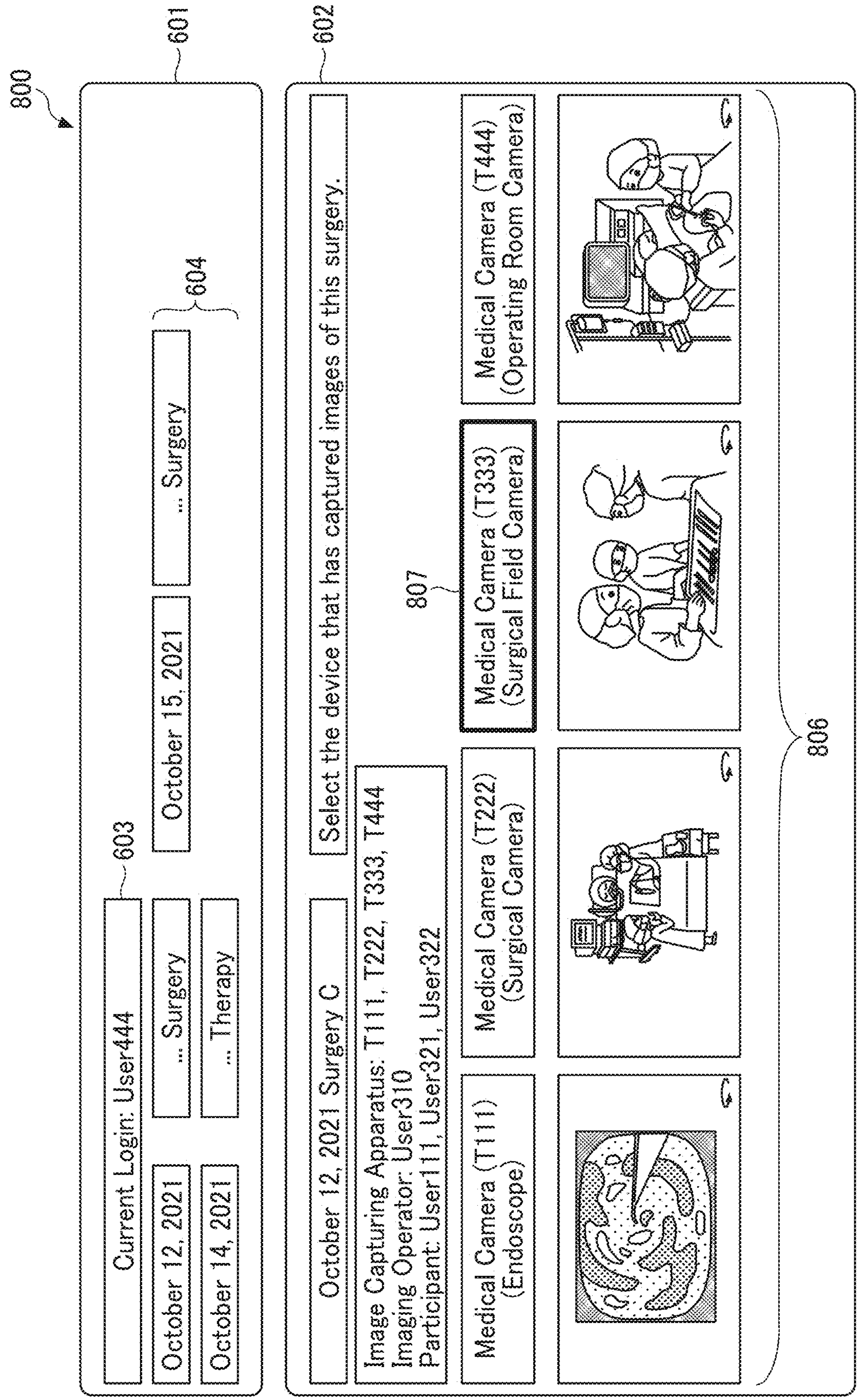
FIG. 43 is a view illustrating an example of a virtual room list screen displayed in response to any user connecting the communication terminal to the information processing system.
Figure 44:
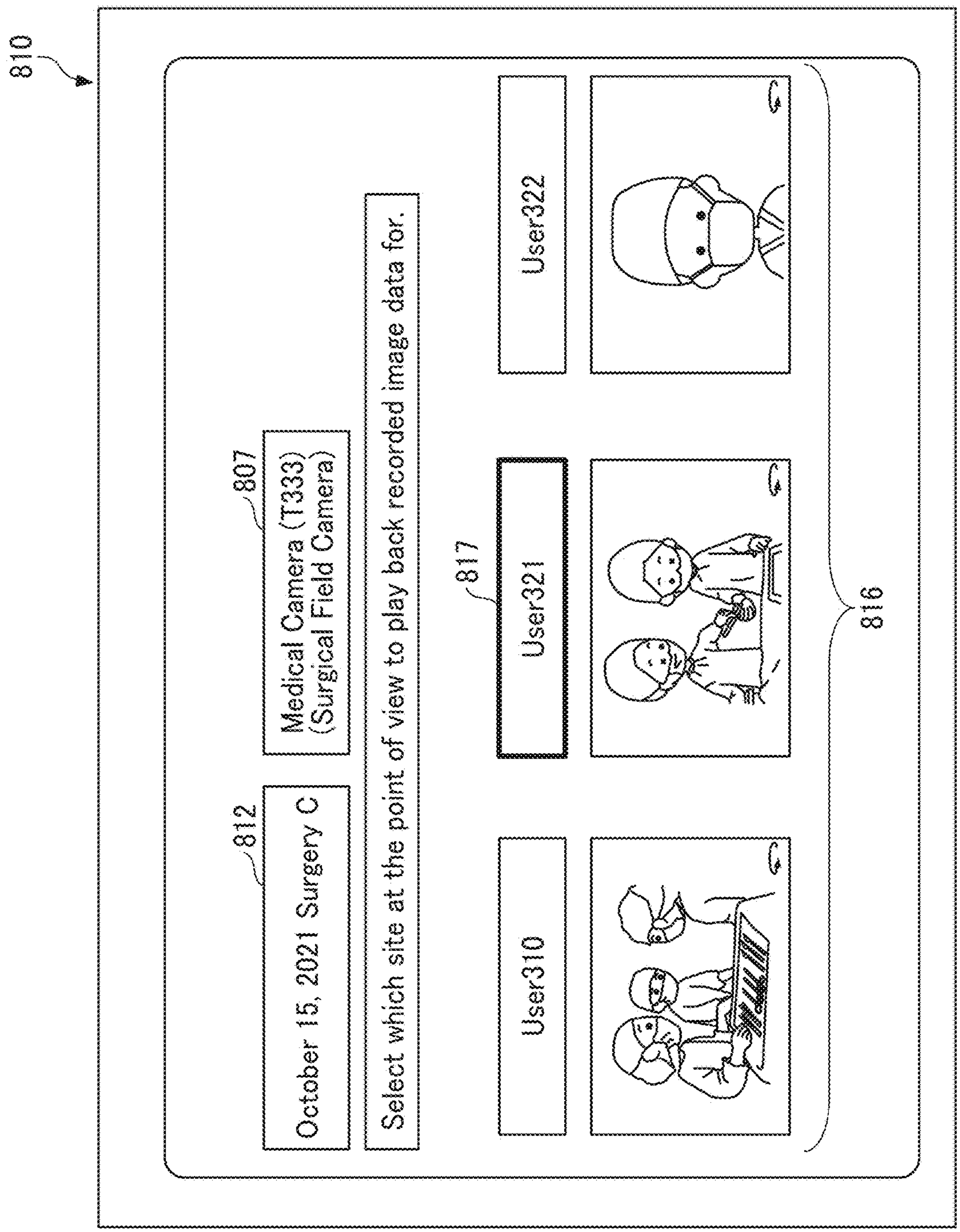
FIG. 44 is a view illustrating an example of a site display image selection screen for selecting a thumbnail of a display image at each site.

FIG. 41 is a diagram illustrating an example of remote communication in which a communication system according to an embodiment of the present disclosure is used in telemedicine. FIG. 42 is a view illustrating an example of a virtual room association screen for associating an image capturing apparatus with a virtual room for telemedicine. FIG. 43 is a view illustrating an example of a virtual room list screen displayed in response to any user connecting the communication terminal 30 to the information processing system 50. FIG. 44 is a view illustrating an example of a site display image selection screen for selecting a thumbnail of a display image at each site.

A communication system 1*b* according to an embodiment of the present disclosure will be described with reference to FIG. 41, with focus on differences from FIG. 1. In FIG. 41, the site A is an operating room. The processing steps (1) to (6) in FIG. 41 are similar to those in FIG. 1. In FIG. 41, a patient is placed on an operating table 355 and is subjected to surgery by a medical professional such as a surgeon. The medical professional (corresponding to the user) operates on the patient with various surgical tools 354 such as forceps and a scalpel. The medical professional may wear the smart glasses 88 and transmit an image of the surgical field for surgery performed by the medical professional to the communication network N. Various cameras are placed in the operating room as image capturing apparatuses similar to the image capturing apparatus 10. The cameras include a surgical camera 351, a surgical field camera 352, and an endoscope 353. The image capturing apparatuses may have a function of capturing an image for generating a wide-view image. In an example, all of the image capturing apparatuses in the operating room and the smart glasses 88 are associated with a virtual room.

A main unit 356 is installed in the operating room. The main unit 356 monitors the vitals of a patient, the operating state of medical devices, and the like. The main unit 356 corresponds to the communication terminal 30 according to this embodiment. The communication terminal 30 (i.e., the main unit 356) in the operating room may have a function of receiving video from the endoscope 353 or the surgical field camera 352 in addition to the functions illustrated in FIG. 1. The communication terminal 30 can display the received video, including a wide-view image, on displays 306 and transmit the received video to the information processing system 50 as video of the site at which the communication terminal 30 is located. An operation panel 357 is an input interface that accepts various operations. In an example, a medical professional can operate a device in the operating room via the operation panel 357. The endoscope 353, the surgical camera 351, and the surgical field camera 352 may communicate with the information processing system 50 directly without the intervention of the communication terminal 30. As described above, since a plurality of image capturing apparatuses can be associated with the same virtual room, a user at a remote site can give a request to record wide-view images of various on-site scenes at the site A. In an example, a user who desires to record captured video of the inside of the patient's body transmits a request to an image capturing apparatus corresponding to the endoscope 353 to record an image captured by the image capturing apparatus. In another example, a user who desires to record an image of the entire operating room transmits a request to an image capturing apparatus corresponding to the surgical camera 351 to record an image captured by the image capturing apparatus.

The communication terminal 30 may have the function of an electronic medical record system or the function of communicating with an electronic medical record system. The communication terminal 30 may display information on an electronic medical record on the display 306. The storage 90 may be an electronic medical record system. In this case, recorded image data of a wide-view image recorded in response to a recording request (and point-of-view information associated with the wide-view image) may be stored by the association processing unit 53 in association with the electronic medical record of the patient. Folders indicated by storage locations of the storage 90 may be classified according to patient or surgery. The virtual room information storage unit 5002 may store information indicating a patient or the details of surgery in association with each other. As a result, information related to the patient or the surgery can be continuously displayed on a viewing screen of the communication terminal 30.

FIG. 42 is a view illustrating an example of a virtual room association screen 860 for associating an image capturing apparatus with a virtual room for telemedicine. In the description of FIG. 42, differences from FIG. 22 will mainly be described.

In telemedicine, in an example, the virtual room association screen 860 displays a list of virtual rooms 861 associated with remote surgery or medical therapy. The site A is associated with a medical camera including the image capturing apparatus 10, which is a spherical camera. Examples of the medical camera include an endoscope (T111), a surgical field camera for use in capturing a surgical field image in an operating room, and a camera that captures a microscopic image.

As described above, at a medical site, a plurality of cameras are used. As illustrated in FIG. 42, any one of a plurality of surgeries is selected, and buttons are displayed to select a specific camera among a plurality of cameras (T111, T222, T333, and T444) used in each of the plurality of surgeries.

A virtual room list screen 800 illustrated in FIG. 43 corresponds to the virtual room list screen 600 illustrated in FIG. 36. The virtual room list screen 800 displays thumbnail images 806 for the respective cameras. A site display image selection screen 810 illustrated in FIG. 44 corresponds to the site display image selection screen 610 illustrated in FIG. 37. The site display image selection screen 810 displays information (such as a camera name) 807 that identifies the selected camera, and information (such as a surgery name) 812 that identifies the date and time when an image captured by the selected camera was recorded. In FIG. 44, as in FIG. 37, thumbnail images 816 corresponding to predetermined-area images displayed at the respective sites are displayed. Each of the thumbnail images 816 is associated with a user ID 817 or the like of a user viewing a predetermined-area image in the image at a corresponding one of the sites when the image was recorded. The user ID 817 is displayed above the corresponding thumbnail image 816.

As described above, in one or more embodiments, the communication system stores point-of-view information in association with a wide-view image in a moving image at the time of recording. When playing back and displaying the wide-view image after recording, the communication system can play back and display a predetermined area in the wide-view image that was being displayed on a predetermined communication terminal at the time of recording. In other words, a user viewing the wide-view image at the time of playback can identify, at a later time, a predetermined area in the wide-view image that the user was viewing at the time of recording. Accordingly, a user viewing a recorded wide-view image grasps which predetermined area in the wide-view image was being displayed on a predetermined communication terminal at a predetermined site at the time of recording. The user who grasps such a predetermined area can grasp which predetermined area in the wide-view image has attracted attention at the predetermined site, and can make decisions or take actions based on the information provided.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

In the example configurations illustrated in FIG. 13 and the like, the information processing system 50, the image capturing apparatus 10, and the communication terminal 30 are each divided according to main functions to facilitate understanding of the processes performed by the information processing system 50, the image capturing apparatus 10, and the communication terminal 30. No limitation is intended by how the functions are divided by process or by the name of the functions. The processing of the information processing system 50, the image capturing apparatus 10, and the communication terminal 30 may be divided into more units of processing in accordance with the content of the processing. Further, the division may be made such that each unit of processing includes more processing operations.

Any one of the above-described operations may be performed in various other ways, for example, in an order different from the one described above.

Each of the functions in the above-described embodiments may be implemented by one or more processing circuits or circuitry. As used herein, the term "processing circuit or circuitry" includes a processor programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

The apparatuses or devices described in one or more embodiments are just one example of plural computing environments that implement the one or more embodiments disclosed herein. In some embodiments, the information processing system 50 includes multiple computing devices, such as a server cluster. The multiple computing devices are configured to communicate with one another through any type of communication link, including a network, a shared memory, etc., and perform processes disclosed herein.

Further, the information processing system 50 can be configured to share the processing steps disclosed herein, for example, the processing steps illustrated in FIGS. 26, 27, 28, 34, and so on in various combinations. For example, a process executed by a predetermined unit may be executed by a plurality of information processing apparatuses included in the information processing system 50. The components of the information processing system 50 may be integrated into one server apparatus or divided into a plurality of apparatuses.

According to Aspect 1, a display terminal for playing back and displaying a moving image recorded in distribution of the moving image to a communication terminal includes an acceptance unit and a display control unit. The acceptance unit receives an instruction to play back and display a wide-view image included in the recorded moving image and having a viewing angle in a wide range. In response to the acceptance unit receiving the instruction, the display control unit causes a display unit to play back and display a predetermined-area image, based on point-of-view information for specifying a predetermined area in the wide-view image being displayed by a predetermined communication terminal during distribution of the moving image, the predetermined-area image being the predetermined area in the wide-view image.

According to Aspect 2, in the display terminal of Aspect 1, the display control unit plays back and displays the predetermined-area image, based on the point-of-view information transmitted from the predetermined communication terminal.

According to Aspect 3, in the display terminal of Aspect 1 or Aspect 2, the acceptance unit accepts a screen operation on the predetermined-area image being played back and displayed. The display control unit shifts a virtual point of view for the wide-view image in response to the screen operation accepted by the acceptance unit to change the predetermined-area image to another predetermined-area image based on changed point-of-view information corresponding to a point of view obtained by shifting the virtual point of view and to display said another predetermined-area image.

According to Aspect 4, in the display terminal of Aspect 3, the display control unit plays back and displays a first predetermined-area image and a second predetermined-area image on a single screen. The first predetermined-area image and the second predetermined-area image are included in the wide-view image. The first predetermined-area image is a first predetermined area in the wide-view image displayed by the first communication terminal. The second predetermined-area image is a second predetermined area in the wide-view image displayed by the second communication terminal.

According to Aspect 5, in the display terminal of Aspect 4, the display control unit plays back and displays the first predetermined-area image and the second predetermined-area image that are at the same elapsed time for playback of the wide-view image included in the moving image.

According to Aspect 6, in the display terminal of Aspect 4, the display control unit displays one of the first predetermined-area image and the second predetermined-area image in a larger size than the other of the first predetermined-area image and the second predetermined-area image.

According to Aspect 7, in the display terminal of Aspect 4, the display control unit returns, by batch, the first predetermined-area image and the second predetermined-area image to an original predetermined-area image indicated by the point-of-view information and executes an operation of playing back and displaying the original predetermined-area image, an operation of playing back and displaying the original predetermined-area image in reverse, or an operation of pausing playback and display of the original predetermined-area image in accordance with the screen operation received by the acceptance unit.

According to Aspect 8, in the display terminal of Aspect 3, the display control unit displays thumbnails of a plurality of predetermined-area images in the wide-view image. Each of the plurality of predetermined-area images is a predetermined area in the wide-view image displayed by a corresponding one of the plurality of communication terminals. The acceptance unit accepts at least one thumbnail selected from among the thumbnails of the plurality of predetermined-area images. The display control unit plays back and displays at least one predetermined-area image corresponding to the at least one thumbnail accepted by the acceptance unit as the predetermined-area image that is a predetermined area in the wide-view image.

According to Aspect 9, in the display terminal of any one of Aspect 1 to Aspect 8, the wide-view image has a viewing angle in a wider range than a display range that is displayable on the display unit at a time.

According to Aspect 10, in the display terminal of Aspect 9, the wide-view image includes a spherical image in equirectangular projection format, an omnidirectional image, a hemispherical image, a three-dimensional panoramic image, a two-dimensional panoramic image, or a virtual reality (VR) image.

According to Aspect 11, an information processing system includes a distribution unit, a reception unit, and a transmission unit. The distribution unit distributes a moving image to a predetermined communication terminal. The reception unit receives point-of-view information transmitted from the predetermined communication terminal. The point-of-view information is for identifying a predetermined area in a wide-view image having a viewing angle in a wide range and included in the moving image that is recorded in distribution of the moving image from the information processing system. The point-of-view information is transmitted in response to the predetermined communication terminal displaying a predetermined-area image that is the predetermined area in the wide-view image. The transmission unit transmits the point-of-view information and the wide-view image included in the moving image to a display terminal that plays back and displays a predetermined-area image in the wide-view image on a display unit, based on the point-of-view information. The predetermined-area image is a predetermined area in the wide-view image being displayed by the predetermined communication terminal during distribution of the moving image.

According to Aspect 12, a communication system includes an information processing system that distributes a moving image, a communication terminal that receives and displays the distributed moving image, and a display terminal that plays back and displays the moving image that is recorded in distribution of the moving image. The communication terminal receives the moving image that is recorded in distribution of the moving image from the information processing system, displays a predetermined-area image that is a predetermined area in a wide-view image included in the moving image and having a viewing angle in a wide range, and transmits point-of-view information for specifying the predetermined area to the information processing system. The information processing system transmits the point-of-view information to the display terminal. The display terminal plays back and displays a predetermined-area image in the wide-view image included in the recorded moving image on a display unit, based on the point-of-view information. The predetermined-area image is a predetermined area in the wide-view image being displayed by a predetermined communication terminal during distribution of the moving image.

According to Aspect 13, a display method is performed by a display terminal for playing back and displaying a moving image recorded in distribution of the moving image to a communication terminal. The display method includes, by the display terminal, receiving an instruction to play back and display a wide-view image included in the recorded moving image and having a viewing angle in a wide range; and in response to receipt of the instruction, causing a display unit to play back and display a predetermined-area image, based on point-of-view information for specifying a predetermined area in the wide-view image being displayed by a predetermined communication terminal during distribution of the moving image, the predetermined-area image being the predetermined area in the wide-view image.

According to Aspect 14, an information processing method is performed by an information processing system. The information processing method includes, by the information processing system, distributing a moving image to a predetermined communication terminal; receiving point-of-view information transmitted from the predetermined communication terminal, the point-of-view information being for identifying a predetermined area in a wide-view image having a viewing angle in a wide range and included in the moving image recorded in distribution of the moving image from the information processing system, the point-of-view information being transmitted in response to the predetermined communication terminal displaying a predetermined-area image that is the predetermined area in the wide-view image; and transmitting the point-of-view information and the wide-view image included in the moving image to a display terminal that plays back and displays a predetermined-area image in the wide-view image on a display unit, based on the point-of-view information, the predetermined-area image being a predetermined area in the wide-view image being displayed by the predetermined communication terminal during distribution of the moving image.

According to Aspect 15, a communication method is performed by a communication system. The communication system includes an information processing system that distributes a moving image, a communication terminal that receives and displays the distributed moving image, and a display terminal that plays back and displays the moving image that is recorded in distribution of the moving image. The communication method includes receiving, by the communication terminal, the moving image that is recorded in distribution of the moving image from the information processing system; displaying, by the communication terminal, a predetermined-area image that is a predetermined area in a wide-view image included in the moving image and having a viewing angle in a wide range; transmitting, by the communication terminal, point-of-view information for specifying the predetermined area to the information processing system; transmitting, by the information processing system, the point-of-view information to the display terminal; and playing back and displaying, by the display terminal, a predetermined-area image in the wide-view image included in the recorded moving image on a display unit, based on the point-of-view information, the predetermined-area image being a predetermined area in the wide-view image being displayed by a predetermined communication terminal during distribution of the moving image.

According to Aspect 16, a recording medium stores a program for causing a computer for playing back and displaying a moving image recorded in distribution of the moving image to a communication terminal to receive an instruction to play back and display a wide-view image included in the recorded moving image and having a viewing angle in a wide range; and in response to receipt of the instruction, cause a display unit to play back and display a predetermined-area image, based on point-of-view information for specifying a predetermined area in the wide-view image being displayed by a predetermined communication terminal during distribution of the moving image, the predetermined-area image being the predetermined area in the wide-view image.

According to Aspect 17, a recording medium stores a program for causing a computer to distribute a moving image to a predetermined communication terminal; receive point-of-view information transmitted from the predetermined communication terminal, the point-of-view information being for identifying a predetermined area in a wide-view image having a viewing angle in a wide range and included in the moving image recorded in distribution of the moving image from the information processing system, the point-of-view information being transmitted in response to the predetermined communication terminal displaying a predetermined-area image that is the predetermined area in the wide-view image; and transmit the point-of-view information and the wide-view image included in the moving image to a display terminal that plays back and displays a predetermined-area image in the wide-view image on a display unit, based on the point-of-view information, the predetermined-area image being a predetermined area in the wide-view image being displayed by the predetermined communication terminal during distribution of the moving image.

The invention claimed is:

1. A display terminal comprising circuitry configured to:

receive an instruction to play back a wide-view image having a wide angle of view, the wide-view image being a moving image and having been recorded for distribution to a communication terminal, in response to the instruction to play back the wide-view image, control a display to display a predetermined-area image representing a predetermined area of the wide-view image, based on point-of-view information for specifying the predetermined area of the wide-view image having been distributed and displayed at the communication terminal, receive a screen operation on the predetermined-area image being displayed, the screen operation indicating a shift in virtual point of view in the wide-view image, and change display of the predetermined-area image, to another predetermined-area image representing a predetermined area of the wide-view image based on another point-of-view information for specifying the shifted virtual point of view, wherein the communication terminal includes a first communication terminal and a second communication terminal, the predetermined-area image includes:

a first predetermined-area image representing a first predetermined area of the wide-view image being displayed at the first communication terminal; and a second predetermined-area image representing a second predetermined area of the wide-view image being displayed at the second communication terminal, the circuitry is further configured to display the first predetermined-area image and the second predetermined-area image on a single screen, the circuitry is further configured to move, based on a user operation performed on the predetermined-area image being played back and displayed, the virtual point of view with respect to the wide-view image, and to change and display the predetermined-area image based on updated point-of-view information corresponding to the point of view after the movement, and the circuitry is further configured to, in accordance with content of a screen operation performed on a screen on which the first predetermined-area image and the second predetermined-area image are displayed, collectively control the first predetermined-area image and the second predetermined-area image to, after returning to the predetermined-area image corresponding to the point of view before the movement indicated by the point-of-view information, execute one of: playing back and displaying the predetermined-area image; reverse playback of the predetermined-area image; or temporarily pausing playback of the predetermined-area image.

2. The display terminal according to claim 1, wherein the circuitry is further configured to receive the point-of-view information from the communication terminal.

3. The display terminal according to claim 1, wherein the first predetermined-area image and the second predetermined-area image displayed on the single screen have a same elapsed time in playback of the moving image.

4. The display terminal according to claim 1, wherein the circuitry is further configured to display one of the first predetermined-area image and the second predetermined-area image in a larger size than the other of the first predetermined-area image and the second predetermined-area image.

5. The display terminal according to claim 1, wherein the circuitry is further configured to:

display thumbnails of a plurality of predetermined-area images, the plurality of predetermined-area images including the first predetermined-area image and the second predetermined-area image, each predetermined-area image representing a predetermined area of the wide-view image displayed at a corresponding one of the first communication terminal and the second communication terminal, receive at least one thumbnail selected from among the thumbnails of the plurality of predetermined-area images, and display at least one predetermined-area image corresponding to the received at least one thumbnail as the predetermined-area image representing a predetermined area of the wide-view image.

6. The display terminal according to claim 1, wherein the wide-view image has a viewing angle in a wider range than a display range that is displayable on the display at a time.

7. The display terminal according to claim 6, wherein the wide-view image includes a spherical image in equirectangular projection, an omnidirectional image, a hemispherical image, a three-dimensional panoramic image, a two-dimensional panoramic image, or a virtual reality (VR) image.

8. A displaying method comprising:

receiving an instruction to play back a wide-view image having a wide angle of view, the wide-view image being a moving image and having been recorded for distribution to a communication terminal;

in response to the instruction to play back the wide-view image, displaying, on a display, a predetermined-area image representing a predetermined area of the wide-view image, based on point-of-view information for specifying the predetermined area of the wide-view image having been distributed and displayed at the communication terminal;

receiving a screen operation on the predetermined-area image being displayed, the screen operation indicating a shift in virtual point of view in the wide-view image;

changing display of the predetermined-area image, to another predetermined-area image representing a predetermined area of the wide-view image based on another point-of-view information for specifying the shifted virtual point of view, wherein the communication terminal includes a first communication terminal and a second communication terminal, and the predetermined-area image includes:

a first predetermined-area image representing a first predetermined area of the wide-view image being displayed at the first communication terminal; and a second predetermined-area image representing a second predetermined area of the wide-view image being displayed at the second communication terminal;

displaying the first predetermined-area image and the second predetermined-area image on a single screen;

moving, based on a user operation performed on the predetermined-area image being played back and displayed, the virtual point of view with respect to the wide-view image, and changing and displaying the predetermined-area image based on updated point-of-view information corresponding to the point of view after the movement; and in accordance with content of a screen operation performed on a screen on which the first predetermined-area image and the second predetermined-area image are displayed, collectively controlling the first predetermined-area image and the second predetermined-area image to, after returning to the predetermined-area image corresponding to the point of view before the movement indicated by the point-of-view information, execute one of: playing back and displaying the predetermined-area image; reverse playback of the predetermined-area image; or temporarily pausing playback of the predetermined-area image.

9. The displaying method according to claim 8, further comprising receiving the point-of-view information from the communication terminal.

10. The displaying method according to claim 8, wherein the first predetermined-area image and the second predetermined-area image displayed on the single screen have a same elapsed time in playback of the moving image.

11. The displaying method according to claim 8, further comprising displaying one of the first predetermined-area image and the second predetermined-area image in a larger size than the other of the first predetermined-area image and the second predetermined-area image.

12. The displaying method according to claim 8, further comprising:

displaying thumbnails of a plurality of predetermined-area images, the plurality of predetermined-area images including the first predetermined-area image and the second predetermined-area image, each predetermined-area image representing a predetermined area of the wide-view image displayed at a corresponding one of the first communication terminal and the second communication terminal;

receiving at least one thumbnail selected from among the thumbnails of the plurality of predetermined-area images; and displaying at least one predetermined-area image corresponding to the received at least one thumbnail as the predetermined-area image representing a predetermined area of the wide-view image.

13. A non-transitory recording medium storing a plurality of instructions which, when executed by one or more processors, cause the processors to perform a displaying method comprising:

receiving an instruction to play back a wide-view image having a wide angle of view, the wide-view image being a moving image and having been recorded for distribution to a communication terminal;

in response to the instruction to play back the wide-view image, displaying, on a display, a predetermined-area image representing a predetermined area of the wide-view image, based on point-of-view information for specifying the predetermined area of the wide-view image having been distributed and displayed at the communication terminal;

receiving a screen operation on the predetermined-area image being displayed, the screen operation indicating a shift in virtual point of view in the wide-view image;

changing display of the predetermined-area image, to another predetermined-area image representing a predetermined area of the wide-view image based on another point-of-view information for specifying the shifted virtual point of view, wherein the communication terminal includes a first communication terminal and a second communication terminal, and the predetermined-area image includes:

a first predetermined-area image representing a first predetermined area of the wide-view image being displayed at the first communication terminal; and a second predetermined-area image representing a second predetermined area of the wide-view image being displayed at the second communication terminal;

displaying the first predetermined-area image and the second predetermined-area image on a single screen;

moving, based on a user operation performed on the predetermined-area image being played back and displayed, the virtual point of view with respect to the wide-view image, and changing and displaying the predetermined-area image based on updated point-of-view information corresponding to the point of view after the movement; and in accordance with content of a screen operation performed on a screen on which the first predetermined-area image and the second predetermined-area image are displayed, collectively controlling the first predetermined-area image and the second predetermined-area image to, after returning to the predetermined-area image corresponding to the point of view before the movement indicated by the point-of-view information, execute one of: playing back and displaying the predetermined-area image; reverse playback of the predetermined-area image; or temporarily pausing playback of the predetermined-area image.

14. The non-transitory recording medium according to claim 13, wherein the method further comprises receiving the point-of-view information from the communication terminal.

15. The non-transitory recording medium according to claim 13, wherein the first predetermined-area image and the second predetermined-area image displayed on the single screen have a same elapsed time in playback of the moving image.

16. The non-transitory recording medium according to claim 13, wherein the method further comprises displaying one of the first predetermined-area image and the second predetermined-area image in a larger size than the other of the first predetermined-area image and the second predetermined-area image.

17. The non-transitory recording medium according to claim 13, wherein the method further comprises:

displaying thumbnails of a plurality of predetermined-area images, the plurality of predetermined-area images including the first predetermined-area image and the second predetermined-area image, each predetermined-area image representing a predetermined area of the wide-view image displayed at a corresponding one of the first communication terminal and the second communication terminal;

receiving at least one thumbnail selected from among the thumbnails of the plurality of predetermined-area images; and displaying at least one predetermined-area image corresponding to the received at least one thumbnail as the predetermined-area image representing a predetermined area of the wide-view image.

* * * * *